US010802700B2

(12) United States Patent
Ikeda

(10) Patent No.: US 10,802,700 B2
(45) Date of Patent: Oct. 13, 2020

(54) INFORMATION PROCESSING APPARATUS AND INFORMATION PROCESSING METHOD

(71) Applicant: SONY CORPORATION, Tokyo (JP)

(72) Inventor: Tetsuo Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/343,579

(22) PCT Filed: Oct. 5, 2017

(86) PCT No.: PCT/JP2017/036366
§ 371 (c)(1),
(2) Date: Apr. 19, 2019

(87) PCT Pub. No.: WO2018/096804
PCT Pub. Date: May 31, 2018

(65) Prior Publication Data
US 2020/0050336 A1 Feb. 13, 2020

(30) Foreign Application Priority Data
Nov. 25, 2016 (JP) .................................. 2016-228765

(51) Int. Cl.
G06F 3/01 (2006.01)
G06F 3/0488 (2013.01)
(Continued)

(52) U.S. Cl.
CPC .......... G06F 3/0488 (2013.01); G06F 3/011 (2013.01); G06F 3/017 (2013.01); G06F 3/041 (2013.01); G06F 3/0481 (2013.01)

(58) Field of Classification Search
CPC .......... G06F 3/011; G06F 3/017; G06F 3/041; G06F 3/0481; G06F 3/0488;
(Continued)

(56) References Cited

U.S. PATENT DOCUMENTS 10,423,407 B2 * 9/2019 Sauvain ........... G05B 19/41835
2004/0125136 A1 * 7/2004 Wallenius ............... H04L 67/16
715/764
(Continued)

FOREIGN PATENT DOCUMENTS

CN 105074762 A 11/2015
CN 105830005 A 8/2016
(Continued)

OTHER PUBLICATIONS

International Search Report and Written Opinion of PCT Application No. PCT/JP2017/036366, dated Nov. 14, 2017, 08 pages of ISRWO.

*Primary Examiner* — Tony O Davis
(74) *Attorney, Agent, or Firm* — Chip Law Group

(57) ABSTRACT

Provided is an information processing apparatus that includes a processing policy information control unit that controls processing policy information that includes identification information of a user associated with an actual object on a body surface on which a display object is displayed and that indicates a processing policy for the actual object in accordance with a user operation performed on the actual object. The information processing apparatus further includes a display control unit that controls display of the display object on a basis of the processing policy information for the actual object.

20 Claims, 51 Drawing Sheets

(51) Int. Cl.
    *G06F 3/041*           (2006.01)
    *G06F 3/0481*        (2013.01)

(58) Field of Classification Search
    CPC ............ C12Q 1/6883; C12Q 2600/106; C12Q 2600/156; C12Q 2600/172
    USPC .................................................. 345/2.3, 419
    See application file for complete search history.

(56) References Cited

U.S. PATENT DOCUMENTS

| | | | |
|---|---|---|---|
| 2011/0238678 A1* | 9/2011 | Lee | G11B 27/10 |
| | | | 707/755 |
| 2012/0223936 A1* | 9/2012 | Aughey | G06T 19/00 |
| | | | 345/419 |
| 2013/0231161 A1* | 9/2013 | Hsu | G09G 3/3648 |
| | | | 455/566 |
| 2015/0061972 A1* | 3/2015 | Seo | G06F 3/0488 |
| | | | 345/2.3 |
| 2015/0379494 A1 | 12/2015 | Hiroi et al. | |
| 2017/0039030 A1 | 2/2017 | Ikeda et al. | |
| 2017/0109009 A1* | 4/2017 | Meredith | G06F 3/04817 |
| 2018/0005555 A1* | 1/2018 | Funami | G06F 3/0481 |
| 2018/0121727 A1* | 5/2018 | Yin | G06F 3/011 |

FOREIGN PATENT DOCUMENTS

| | | |
|---|---|---|
| JP | 2016-006613 A | 1/2016 |
| KR | 10-2016-0102179 A | 8/2016 |
| WO | 2014/132525 A1 | 9/2014 |
| WO | 2015/098188 A1 | 7/2015 |

\* cited by examiner

FIG. 13
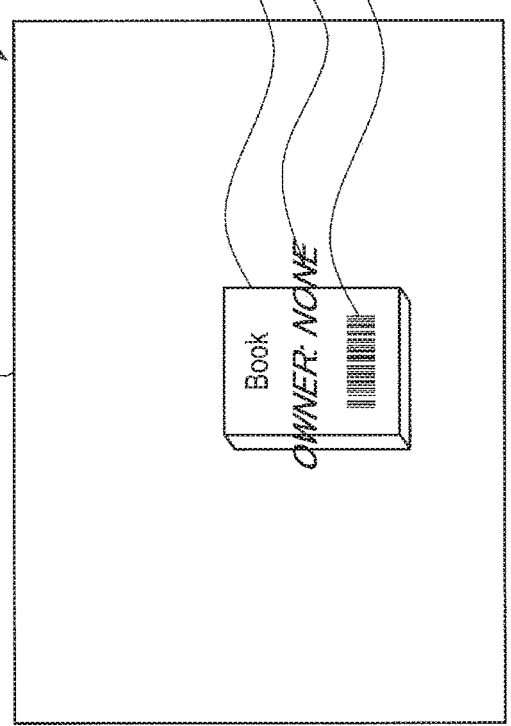
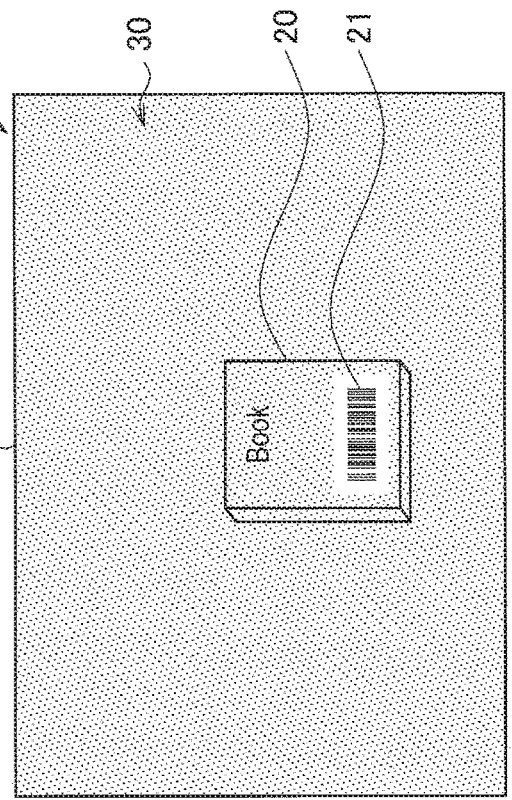
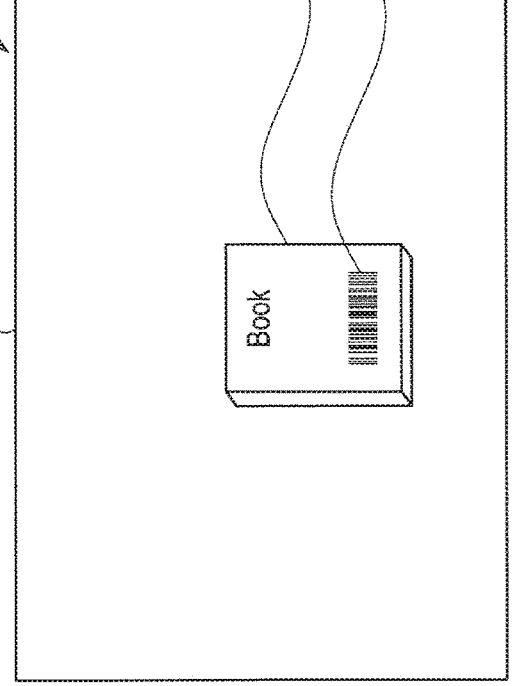
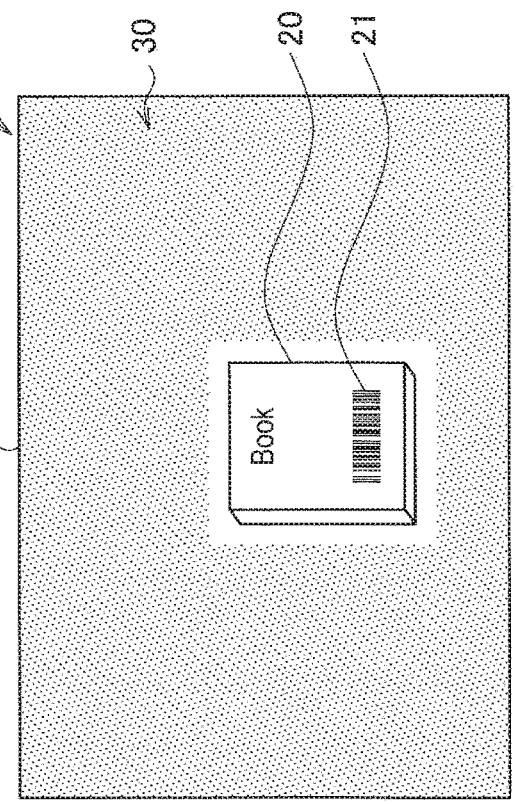

FIG. 14
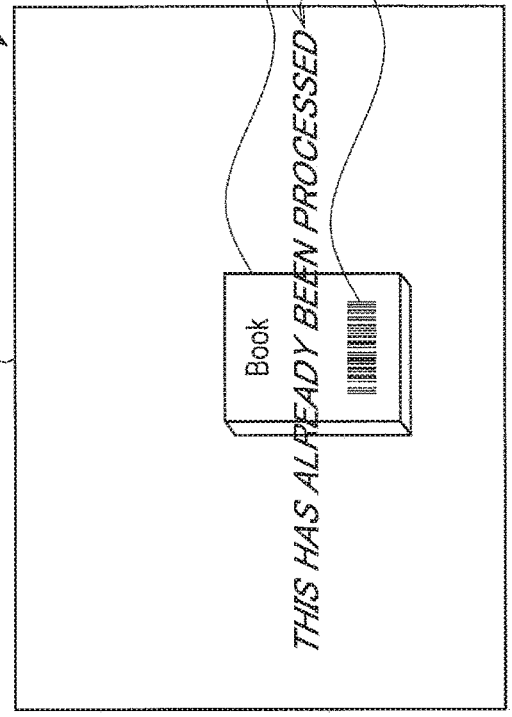
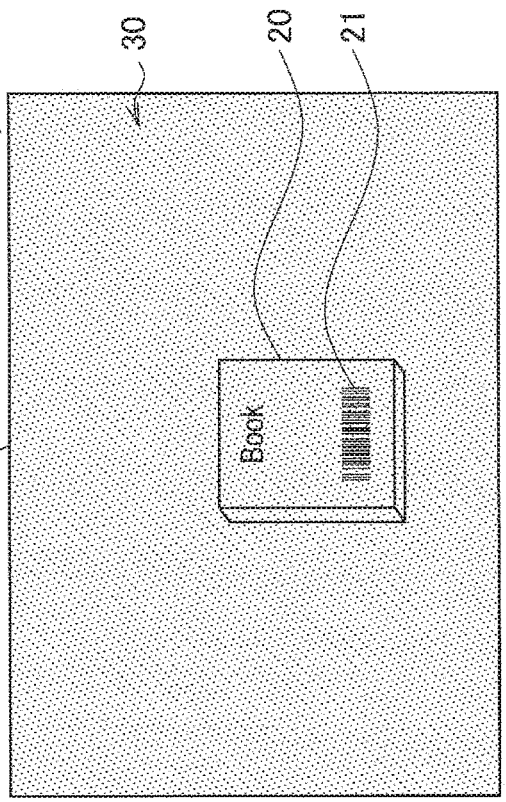
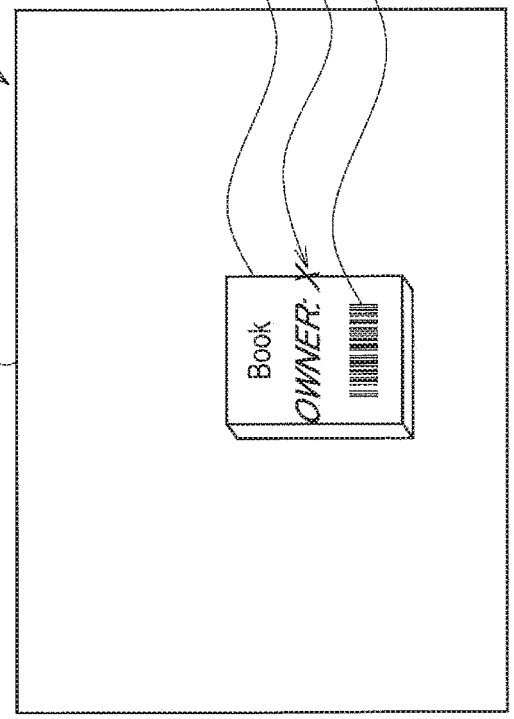
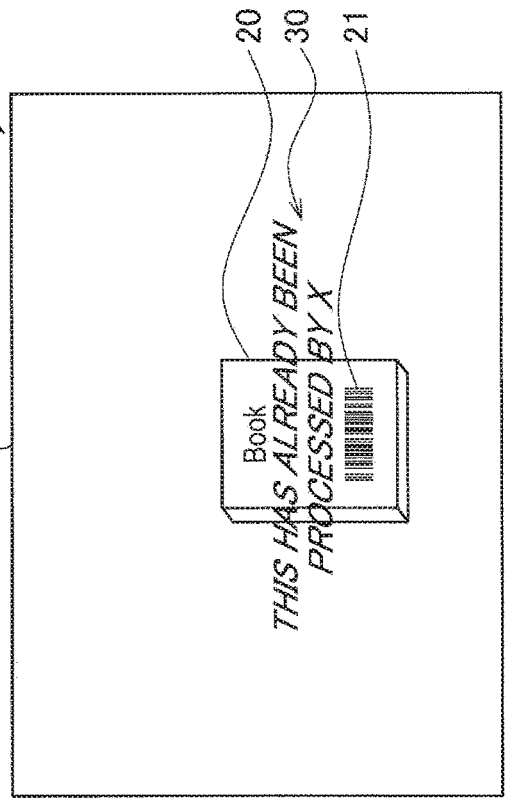

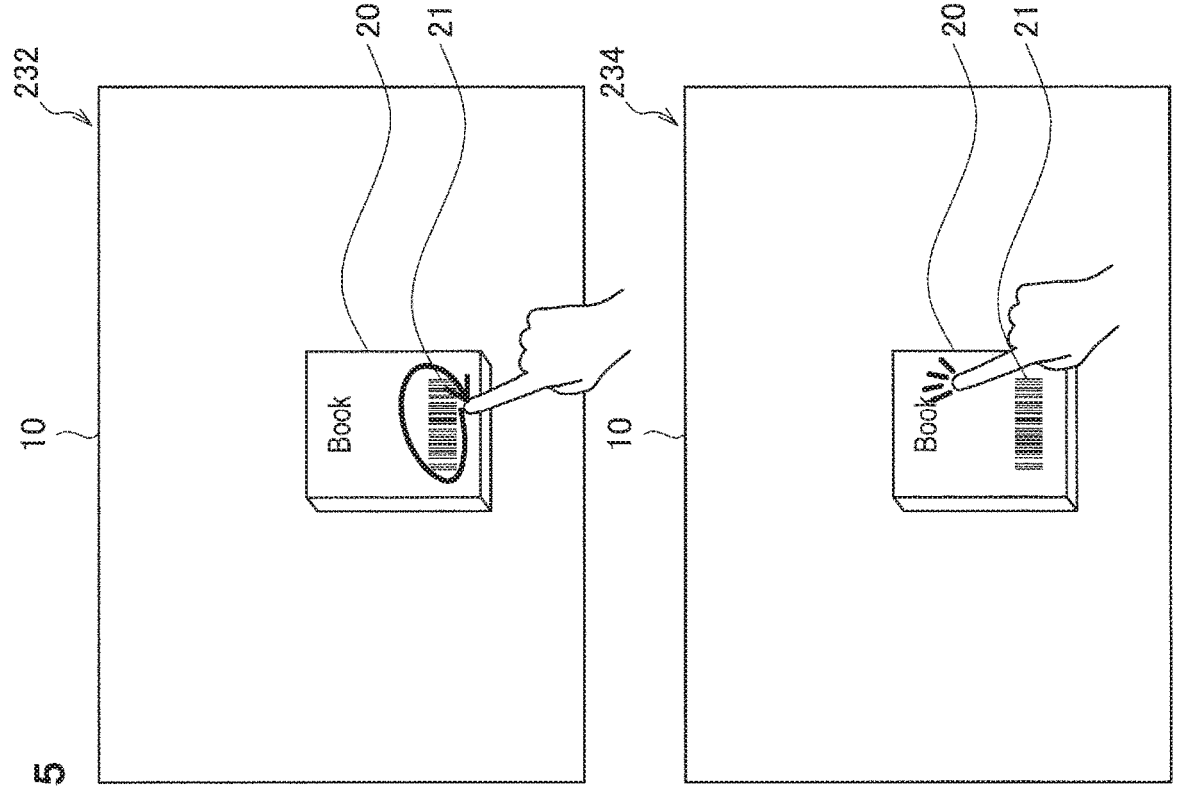
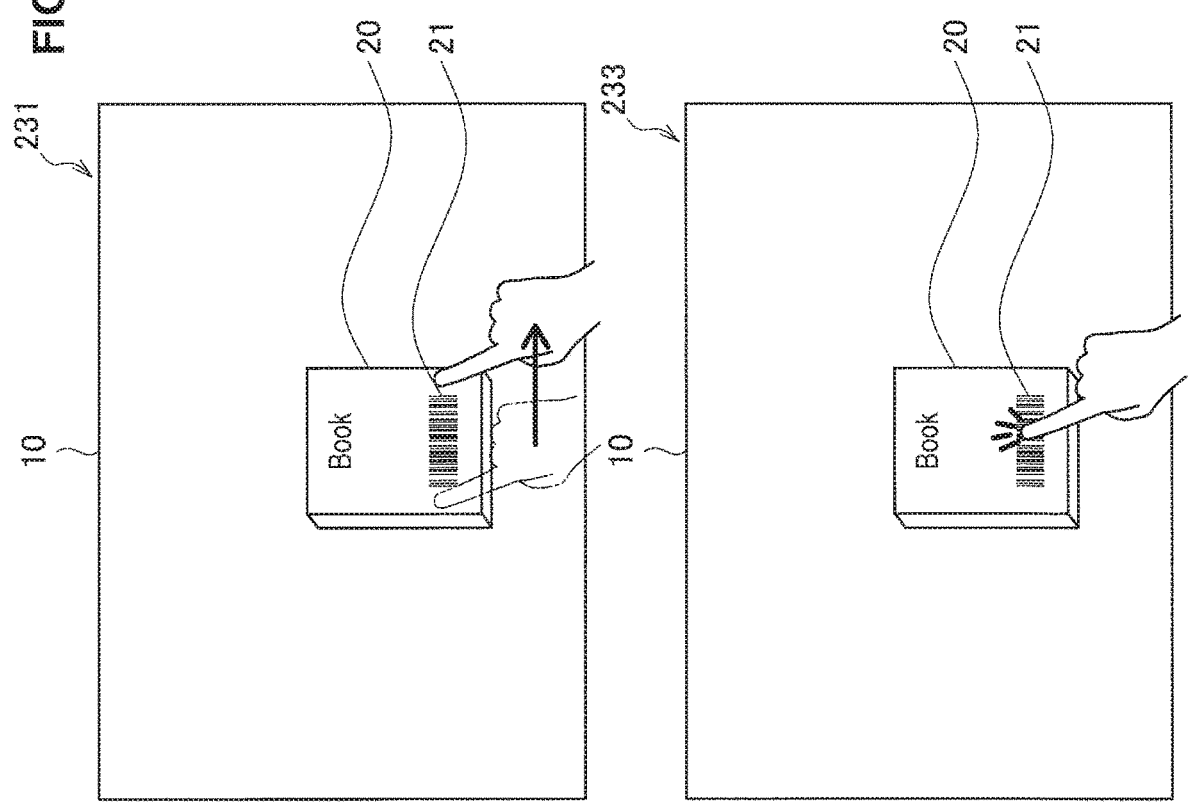
FIG. 15

FIG. 16
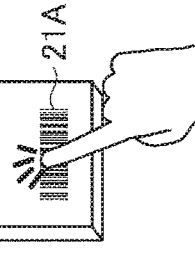
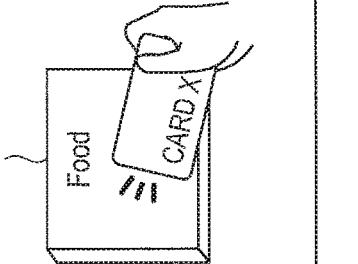
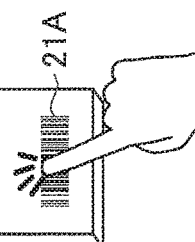
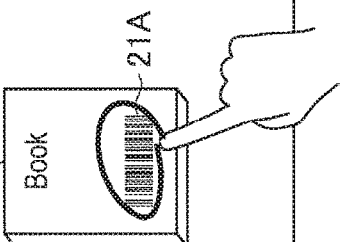

FIG. 18
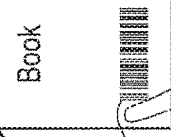
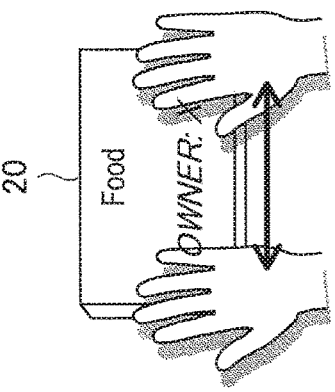

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/036366 filed on Oct. 5, 2017, which claims priority benefit of Japanese Patent Application No. JP 2016-228765 filed in the Japan Patent Office on Nov. 25, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, information processing apparatuses such as smartphones, tablet terminals, and digital signages have become widely distributed, and development related to display objects (that is, user interfaces (UIs)) in such information processing apparatuses capable of performing complicated processing and expression has been conducted from a variety of viewpoints. For example, UIs that users can intuitively operate, UIs that allow complicated operations to be realized simply, UIs that improve usability for users, and the like have been developed. As one of examples thereof, Patent Document 1 discloses a technology of displaying a UI on a table and realizing interaction between such a UI and a user.

CITATION LIST

Patent Literature

Patent Literature 1: JP 2016-6613A

SUMMARY OF INVENTION

Technical Problem

In recent years, there have been more apparatuses that provide various services on the basis of interaction with users, such as the aforementioned various information processing apparatuses. According to such apparatuses, a service for each user is typically provided on the basis of interaction with the user. In relation to extension to a plurality of users, Patent Literature 1 listed above includes reviewing for improving usability for the users by realizing interaction with a plurality of users. Meanwhile, actual objects in relation to the users are not sufficiently reviewed in Patent Literature 1 listed above.

Thus, the present disclosure provides a mechanism that enables interaction among a plurality of users, display objects, and actual objects.

Solution to Problem

According to the present disclosure, there is provided an information processing apparatus including: a processing policy information control unit that controls processing policy information that includes identification information of a user associated with an actual object on a body surface on which a display object is displayed and that indicates a processing policy for the actual object in accordance with a user operation performed on the actual object; and a display control unit that controls display of the display object on a basis of the processing policy information for the actual object.

In addition, according to the present disclosure, there is provided an information processing method that is executed by a processor, including: controlling processing policy information that includes identification information of a user associated with an actual object on a body surface on which a display object is displayed and that indicates a processing policy for the actual object in accordance with a user operation performed on the actual object; and controlling display of the display object on a basis of the processing policy information for the actual object.

In addition, according to the present disclosure, there is provided a program causing a computer to function as: a processing policy information control unit that controls processing policy information that includes identification information of a user associated with an actual object on a body surface on which a display object is displayed and that indicates a processing policy for the actual object in accordance with a user operation performed on the actual object; and a display control unit that controls display of the display object on a basis of the processing policy information for the actual object.

Advantageous Effects of Invention

As described above, the present disclosure provides a mechanism that enables interaction among a plurality of users, display objects, and actual objects. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram for describing processing policy information presenting processing according to the embodiment.

FIG. 14 is a diagram for describing processing policy information presenting processing according to the embodiment.

FIG. 15 is a diagram for describing processing policy information changing operation detection processing according to the embodiment.

FIG. 16 is a diagram for describing processing policy information changing operation detection processing according to the embodiment.

FIG. 18 is a diagram for describing processing policy information changing operation detection processing according to the embodiment.

DESCRIPTION OF EMBODIMENTS

Figure 1:
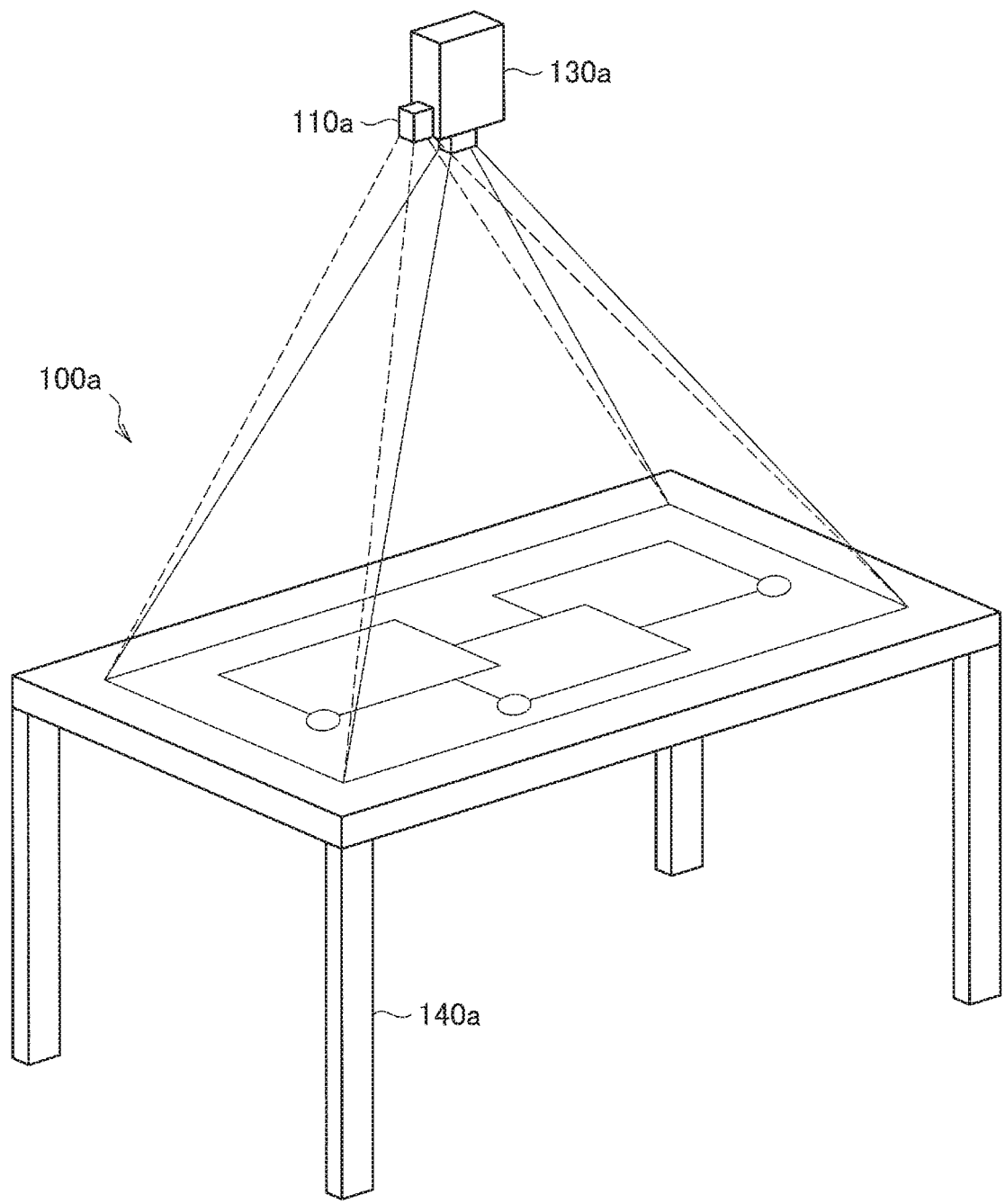
FIG. 1 is a diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, different letters will be added after the same reference numerals for elements with substantially the same functional configurations in some cases to distinguish the elements in the specification and the drawings. For example, a plurality of elements with substantially the same functional configurations may be distinguished as actual objects 20A, 20B, and 20C as needed. However, in a case in which it is not particularly necessary to distinguish each of the plurality of elements with substantially the same functional configurations, only the same reference numeral will be applied. In a case in which it is not particularly necessary to distinguish the actual objects 20A, 20B, and 20C, for example, the objects will simply be referred to as actual objects 20.

Note that description will be given in the following order.
1. Outline of information processing system
2. Functional configuration
3. Flow of processing
4. Details of each processing
4.1. Processing policy information generation processing
4.2. Processing policy information presenting processing
4.3. Processing policy information changing operation detection processing
4.4. Processing policy information change registration processing
4.5. Processing result presenting processing
5. Specific examples
5.1. First specific example
5.2. Second specific example
6. Example of hardware configuration
7. Conclusion <<1. Outline of Information Processing System>>

Referring to FIG. 1, a configuration of an information processing system according to an embodiment of the present disclosure will be described. FIG. 1 is a diagram illustrating a configuration example of an information processing system according to an embodiment of the disclosure. Note that in the specification, the system may mean a configuration that executes predetermined processing, and the entire system can be regarded as one device, or it is also possible to conceive that the system includes a plurality of devices. It is only necessary for the information processing system according to the embodiment illustrated in FIG. 1 to be configured to be able to execute predetermined processing (for example, processing that is realized by the functional configuration illustrated in FIG. 4) as a whole, and which constituent in the information processing system is to be regarded as one device may be arbitrarily decided.

Referring to FIG. 1, an information processing system 100a according to an embodiment of the disclosure includes an input unit 110a and an output unit 130a.

The output unit 130a provides a visual notification of various kinds of information to a user by displaying the information in a table 140a. As the output unit 130a, a projector is used, for example. As illustrated in the drawing, the output unit 130a is disposed above the table 140a at a predetermined distance away from the table 140a in a state in which the output unit 130a is suspended from a ceiling, for example, and projects information on a top surface of the table 140a. Such a scheme of displaying information on the top surface of the table 140a from above is also referred to as a "projection type".

Note that in the following description, an entire region in which the information is displayed by the output unit 130a is also referred to as a display screen. For example, the output unit 130a displays, on the display screen, information to be presented to the user in response to execution of an application by the information processing system 100a. The information to be displayed is, for example, an operation screen for each application. Hereinafter, each display region on the display screen in which such an operation screen for an application is displayed will also be referred to as an display object. The display object may be so-called graphical user interface (GUI) components (widgets).

Here, in a case in which the information processing system 100a is of a projection type, the output unit 130a may include an illumination device. In a case in which an illumination device is included in the output unit 130a, the information processing system 100a may control a state of the illumination device, such as ON and OFF, on the basis of content of information input by the input unit 110a and/or content of information displayed by the output unit 130a Also, the output unit 130a may include a speaker and output various kinds of information as sound. In a case in which the output unit 130a is formed as a speaker, the number of speakers may be one, or a plurality of speakers may be provided. In a case in which the output unit 130a includes a plurality of speakers, the information processing system 100a may limit the speakers that output sound or may adjust a direction in which the sound is output.

The input unit 110a is a device that inputs content of an operation performed by the user who uses the information processing system 100a. In the example illustrated in FIG. 1, the input unit 110a is provided above the table 140a in a state in which the input unit 110a is suspended from the ceiling, for example. In this manner, the input unit 110a is provided away from the table 140a that is a target on which information is displayed. The input unit 110a can include an imaging device capable of imaging the top surface of the table 140a, that is, the display screen. As the input unit 110a, a camera that images the table 140a with one lens, a stereo camera capable of imaging the table 140a with two lenses and recording information in the perspective direction, or the like can be used, for example. In a case in which the input unit 110a is a stereo camera, a visible light camera, an infrared camera, or the like can be used.

In a case in which a camera that images the table 140a with one lens is used as the input unit 110a, the information processing system 100a can detect the position of a physical body (hereinafter, also referred to as an actual object), for example, a user's hand located on the table 140a by analyzing an image (captured image) captured by the camera. Also, in a case in which a stereo camera is used as the input unit 110a, the information processing system 100a can acquire depth information (in other words, three-dimensional information) of a body located on the table 140a in addition to position information of the body by analyzing an image captured by the stereo camera. The information processing system 100a can detect contact or approach of the user's hand relative to the table 140a in a height direction and separation of the hand from the table 140a on the basis of the depth information. Note that in the following description, the user's action of bringing an operation member such as his/her hand into contact with the information on the display screen or causing the operation member to approach the information on the screen will also simply and collectively be referred to as "contact".

In the embodiment, the position of the operation member, for example, the user's hand on the display screen (that is, on the top surface of the table 140a) is detected on the basis of the image captured by the input unit 110a, and various kinds of information are input on the basis of the detected position of the operation member. That is, the user can input various operations by moving the operation member on the display screen. For example, an operation may be input to the display object by contact of the user's hand with the display object being detected. Note that in the following description, although a case in which the user's hand is used as the operation member will be described below as an example, the embodiment is not limited to such an example, and various operation members such as a stylus may be used as the operation member.

Also, in a case in which the input unit 110a includes an imaging device, the input unit 110a may image not only the top surface of the table 140a but also a user who is present in the surroundings of the table 140a. For example, the information processing system 100a can detect the position of a user in the surroundings of the table 140a on the basis of the captured image. Also, the information processing system 100a may perform individual recognition for the user by extracting body features with which individual users can be identified, such as a size of a user's face or body included in the captured image.

Here, the embodiment is not limited to such an example, and the user's operation input may be executed by another method. For example, the input unit 110a may be provided as a touch panel on the top surface of the table 140a, and the user's operation input may be detected by contact of a user's finger or the like with the touch panel. Also, the user's operation input may be detected using a gesture performed with respect to the imaging device that forms the input unit 110a. Alternatively, the input unit 110a may include a sound input device such as a microphone that collects speech that the user generates or ambient sound from the surrounding environment. As the sound input device, a microphone array for collecting sound in a specific direction may suitably be used. In addition, the microphone array may be configured such that the sound collecting direction can be adjusted to an arbitrary direction. In a case in which a sound input device is used as the input unit 110a, an operation may be input through the collected sound. Also, the information processing system 100a may recognize an individual on the basis of the sound by analyzing the collected sound. Alternatively, the input unit 110a may include a remote control device (a so-called remote). The remote may be configured such that a predetermined command is input by operating a predetermined button disposed on the remote, or may be configured such that a predetermined command is input through a user's operation of moving the remote by detecting motion and an attitude of the remote with a sensor such as an acceleration sensor or a gyro sensor mounted on the remote. Further, the information processing system 100a may include other input devices, such as a mouse, a keyboard, a button, a switch, and a lever, which are not illustrated in the drawing, as the input unit 110a, and user's operations may be input through such input devices.

The configuration of the information processing system 100a according to the embodiment has been described above with reference to FIG. 1. Note that although not illustrated in FIG. 1, other devices may be connected to the information processing system 100a. For example, an illumination device for illuminating the table 140a may be connected to the information processing system 100a. The information processing system 100a may control an ON state of the illumination device in accordance with a state of the display screen.

Figure 2:
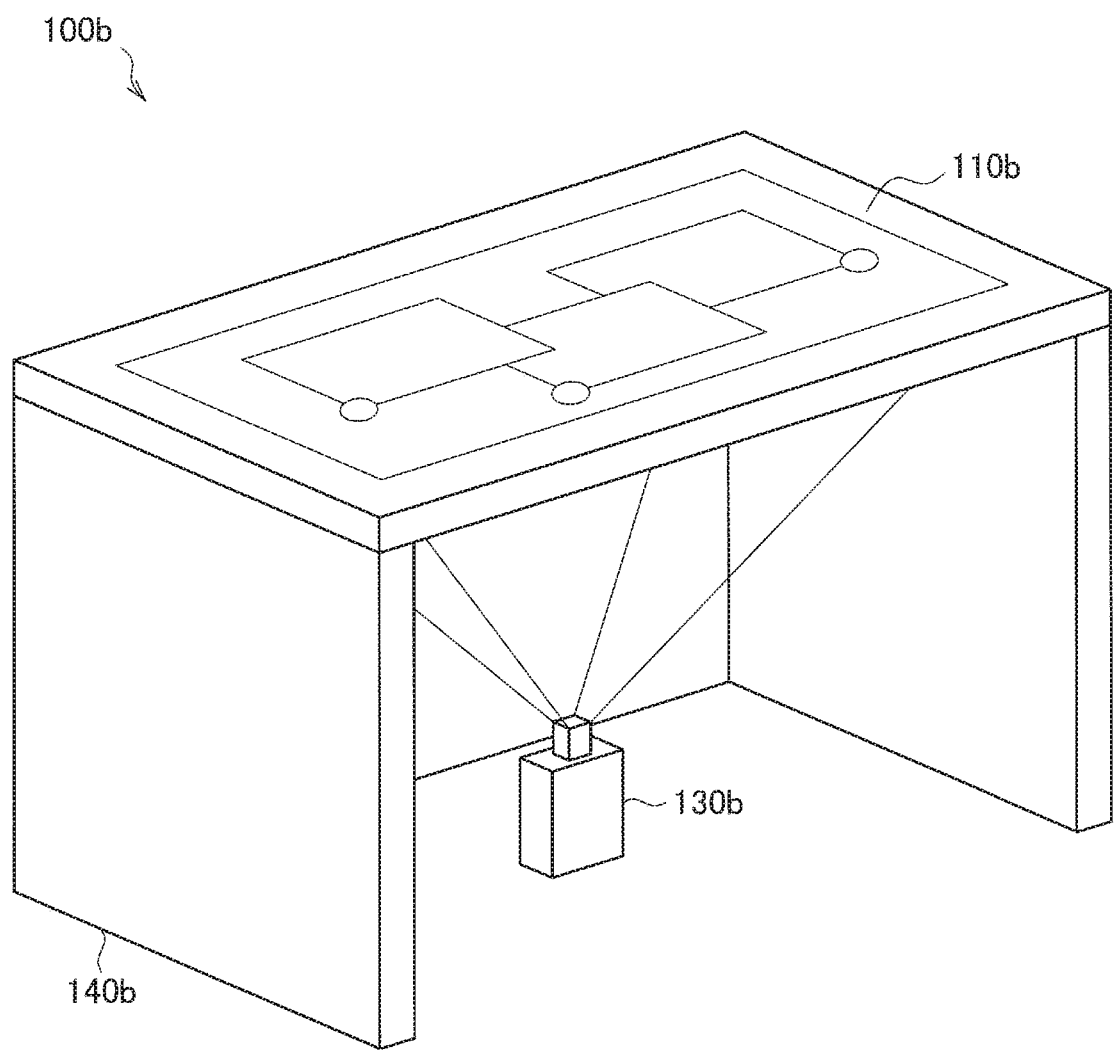
FIG. 2 is a diagram illustrating another configuration example of the information processing system according to the embodiment.
Figure 3:
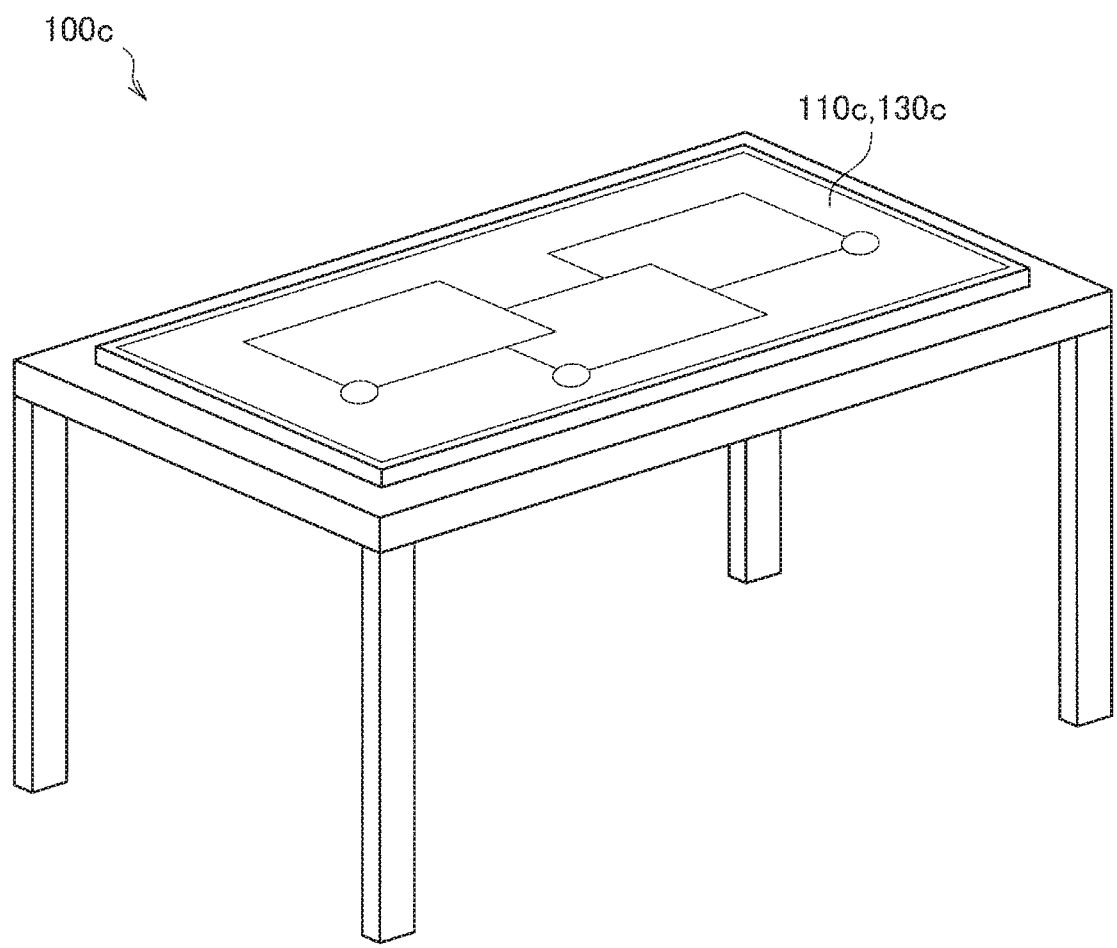
FIG. 3 is a diagram illustrating another configuration example of the information processing system according to the embodiment.

Here, the configuration of the information processing system is not limited to that illustrated in FIG. 1 in the embodiment. It is only necessary for the information processing system according to the embodiment to include the output unit that displays various kinds of information on the display screen and the input unit capable of receiving at least an operation input performed on the displayed information, and a specific configuration thereof is not limited. Referring to FIGS. 2 and 3, other configuration examples of the information processing system according to the embodiment will be described. FIGS. 2 and 3 are diagrams illustrating other configuration examples of the information processing system according to the embodiment.

In an information processing system 100b illustrated in FIG. 2, an output unit 130a is provided below a table 140b. The output unit 130a is a projector, for example, and projects information from the lower side toward the top plate of the table 140b. The top plate of the table 140b includes a transparent material, such as a glass plate or a transparent plastic plate, for example, and information projected by the output unit 130a is displayed on the top surface of the table 140b. Such a scheme of projecting information from the side below the table 140b to the output unit 130a and displaying information on the top surface of the table 140b will also be referred to as a "rear projection type".

In the example illustrated in FIG. 2, an input unit 110b is provided on the top surface (front surface) of the table 140b. The input unit 110b includes a touch panel, for example, and a user inputs an operation by contact of an operation member with the display screen on the top surface of the table 140b being detected by the touch panel. Note that the configuration of the input unit 110b is not limited to such an example, and the input unit 110b may be provided away from the table 140b below the table 140b similarly to the information processing system 100a illustrated in FIG. 1. In this case, the input unit 110b includes an imaging device, for example, and can detect the position of the operation member on the top surface of the table 140b through the top plate including the transparent material.

In the information processing system 100c illustrated in FIG. 3, a touch panel-type display is mounted on the table in a state in which the display screen thereof is directed upward. In the information processing system 100c, the input unit 110c and the output unit 130c may be integrally formed as a display of the touch panel type. That is, the user inputs an operation by various kinds of information being displayed on the display screen of the display and contact of the operation member with the display screen of the display being detected through the touch panel. Note that the imaging device may also be provided as the input unit 110c above the touch panel-type display in the information processing system 100c similarly to the information processing system 100a illustrated in FIG. 1. The position or the like of the user in the surroundings of the table may be detected by the imaging device.

Other configurations of the information processing system according to the embodiment have been described above with reference to FIGS. 2 and 3. As described above, the information processing system according to the embodiment may be realized in a variety of configurations. Here, the embodiment will be described below by exemplifying a configuration of the information processing system 100a in which the input unit 110a and the output unit 130a are provided above the table 140a as illustrated in FIG. 1. However, another configuration capable of realizing the information processing system according to the embodiment, such as the aforementioned configuration illustrated in FIG. 2 or 3, can also realize functions that are similar to those described below. In the following description, the information processing system 100a, the input unit 110a, and the output unit 130*a* will simply be referred to as an information processing system 100, an input unit 110, and an output unit 130 for simplification.

<<2. Functional Configuration>>

Figure 4:
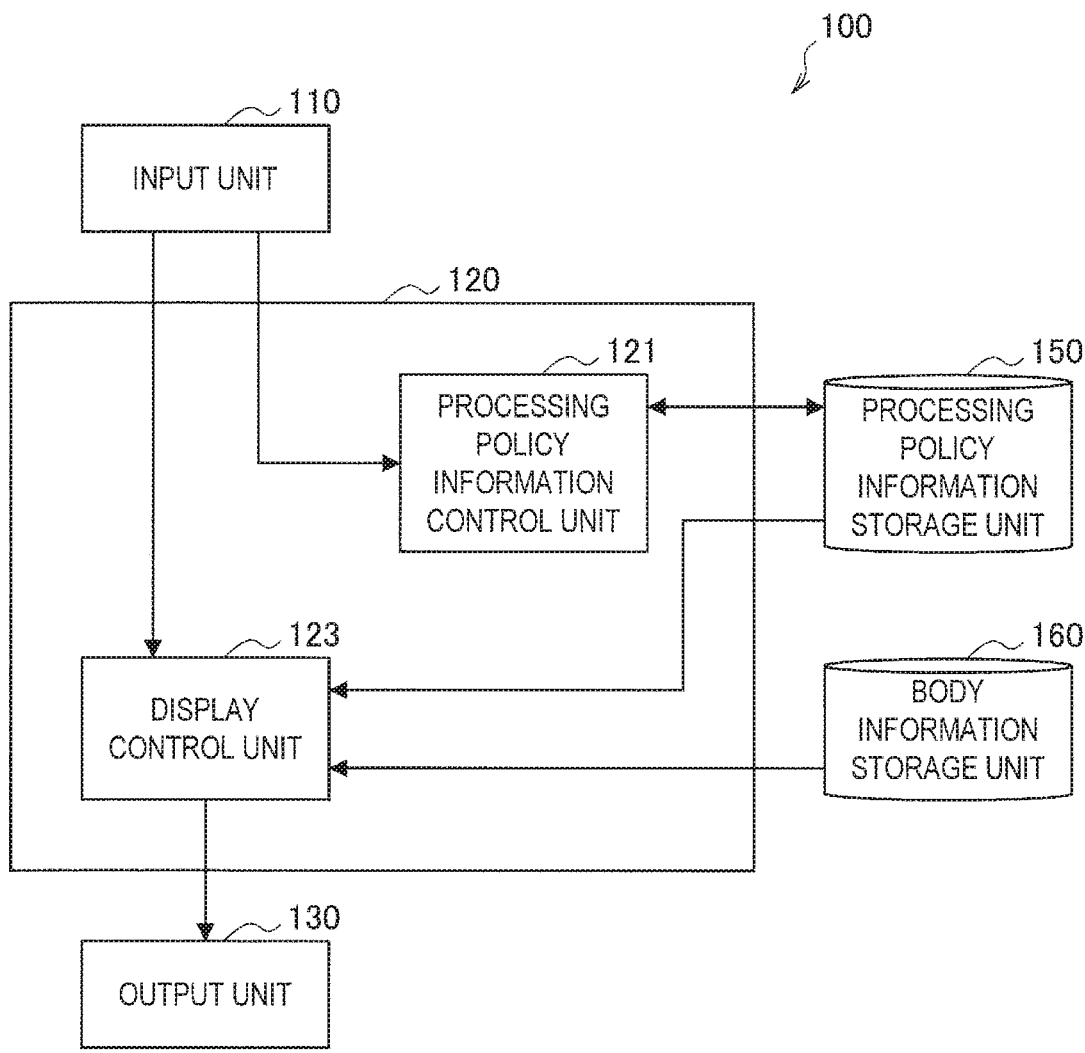
FIG. 4 is a block diagram illustrating an example of a functional configuration of the information processing system according to the embodiment.

Hereinafter, a functional configuration capable of realizing an information processing system 100 according to the embodiment described above will be described with reference to FIG. 4. FIG. 4 is a block diagram illustrating an example of a functional configuration of the information processing system 100 according to the embodiment.

Referring to FIG. 4, the information processing system 100 according to the embodiment includes, as functions, an input unit 110, a control unit 120, an output unit 130, a processing policy information storage unit 150, and a body information storage unit 160.

(1) Input Unit 110

The input unit 110 is an input interface for inputting various kinds of information to the information processing system 100. The user can input various kinds of information to the information processing system 100 via the input unit 110. The input unit 110 corresponds to input units 110*a* to 110*c* illustrated in FIGS. 1 to 3. In the embodiment, the input unit 110 is configured to be able to receive at least a user's operation input to a display object that is displayed by the output unit 130.

For example, the input unit 110 may include an imaging device and capture a captured image including a user's hand on the display screen, a body located on the display screen, and the like. Information input via the input unit 110 (information or the like regarding the captured image, for example) is provided to the control unit 120, which will be described later, and a user's operation input is detected, or the body is detected. The imaging device may be a visible light camera or an infrared camera, for example. Also, the input unit 110 may be formed as an imaging device including a function of a depth sensor capable of acquiring depth information, such as a stereo camera, as described above. Meanwhile, the depth sensor may be formed separately from the imaging device as a sensor based on an arbitrary scheme such as a time-of-flight scheme or a structured light scheme. In addition, the input unit 110 may include a touch sensor. In that case, the touch sensor detects a touch to the display screen. Then, the function of detecting a user's hand above the display screen that is not touching the display screen and a body above the display screen may be secured by the depth sensor and/or an imaging device that images the display screen from above.

For example, the input unit 110 may detect operations such as touching, tapping, and double tapping performed on a display object displayed on the display screen or an actual object. In addition, the input unit 110 may also detect an operation of holding a hand over a display object displayed on the display screen or an actual object. Such an operation is also referred to as hovering. Detection of hovering is effective for detecting a user's intention to perform an operation on the display object or the actual object before an actual operation (for example, before tapping).

(2) Control Unit 120

The control unit 120 includes various processors such as a CPU or a DSP, for example, and controls operations of the information processing system 100 by executing various kinds of arithmetic processing. For example, the control unit 120 operates in accordance with programs stored in the processing policy information storage unit 150, the body information storage unit 160, or another storage device. The control unit 120 can be regarded as an information processing apparatus that processes various kinds of information.

As illustrated in the drawing, the control unit 120 includes, as functions, a processing policy information control unit 121 and a display control unit 123. Note that the control unit 120 may have functions other than these functions. In addition, each of the functions of the control unit 120 is realized by a processor that is included in the control unit 120 operating in accordance with a predetermined program.

(2-1) Processing Policy Information Control Unit 121

The processing policy information control unit 121 has a function of controlling processing policy information that includes identification information of a user who is associated with an actual object on a body surface on which a display object is displayed and that indicates a processing policy for the actual object in accordance with a user operation performed on the actual object. The processing policy information control unit 121 performs processing of associating the user with the actual object as a part of control of the processing policy information. Here, the processing of associating the user with the actual object is processing of linking identification information of the user to identification information of the actual object. Also, the body surface on which the display object is displayed is a surface of a body that serves as a display screen, such as a table 140*a* as described above. The body surface on which the display object is displayed may be neither flat nor continuous, may have a sphere shape, or may be a stepped surface as a combination of a plurality of planes, for example.

The processing policy information is linked to and stored with an actual object. Hereinafter, an example of processing policy information will be described.

The processing policy information includes at least identification information of the user who is associated with the actual object. The user indicated by the identification information that is associated with the actual information may be a person who owns the actual object, a person who will purchase the actual object, a person who will rent the actual object, a person who provides the actual object, or the like, for example. Also, a plurality of users may be associated with one actual object.

The processing policy information may include identification information of a user who has a processing right for the actual object as identification information of the user who is associated with the actual object. In other words, the user who has a processing right for the actual object may be associated with the actual object. The processing right may be a right of performing arbitrary processing on the actual object such as a right of purchasing the actual object, a right of renting the actual object, a right of owning the actual object, a right of booking the actual object, or the like. The processing right may include information indicating a term of validity of the processing right such as a rental term. Hereinafter, a user who has such a processing right will also be referred to as a user to which the actual object belongs. That is, a situation in which the user is associated with the actual object will also be referred to as a situation in which the actual object is caused to belong to the user, a situation in which the actual object belongs to the user, a situation in which the subject to which the actual object belongs is set to the user, or the like. Also, information indicating the user to which the actual object belongs will also be referred to as belonging information.

The processing policy information may include identification information of a user who is waiting for acquisition of a processing right for the actual object as identification information of the user who is associated with the actual object. In other words, the user who is waiting for acquisition of the processing right for the actual object may be associated with the actual object. In this manner, the user can book the processing right (that is, the user can be added to wailing list) in relation to the actual object, the processing right of which has been applied to another user. In a case in which a user who has a right to purchase the actual object (that is, a purchaser) gives up purchasing the actual object, for example, the information processing system 100 can upgrade another user in the first line in the wailing list to a purchaser.

The processing policy information may include information indicating a user operation to be validated or invalidated among user operations performed on the actual object. In a case in which a plurality of users can jointly purchase the actual object, for example, an operation of further associating another user with the actual object, with which a user has already been associated, is validated. Meanwhile, in a case in which only one user can purchase the actual object, the operation of further associating another user with the actual object in relation to the actual object with which a user has already been associated is invalidated. In this manner, it is possible to clearly present an allowable user operation or a prohibited operation to the user by the information indicating the user operations to be validated or invalidated being included in the processing policy information, and usability for the user is improved.

An example of the processing policy information is illustrated in Table 1 below.

TABLE 1

Example of processing policy information

| Actual object | Processing policy information |
|---|---|
| Actual object X | Joint purchase is not allowed<br>User X will purchase it, |
| Actual object Y | User Y will rent it for one week |
| Actual object Z | Joint purchase is allowed<br>User X will purchase it<br>User Y will purchase it |

(2-2) Display Control Unit 123

The display control unit 123 has a function of controlling display on the display screen.

For example, the display control unit 123 generates display information for causing information to be displayed on the display screen and outputs the generated display information to the output unit 130, thereby causing the output unit 130 to output the information. In this manner, the situation in which the information processing system 100 displays the information on the basis of control performed by the display control unit 123 will also simply be referred to as a situation in which the information processing system 100 displays the information or the situation in which the display control unit 123 displays the information. It is considered that the display control unit 123 performs control in various manner.

For example, the display control unit 123 may control the display of the display object on the basis of the processing policy information of the actual object. For example, the display control unit 123 may display the display object including information indicating the processing policy information such as a user to which the actual object belongs, a rental term, and whether or not joint purchase is possible.

For example, the display control unit 123 may control the display of the display object on the basis of body information indicating features of the actual object. The body information is information related to the actual object other than the processing policy information and is information that does not change in response to any user operation. For example, the body information may include information indicating a price, a size, a shape, a weight, an inventory, and the like of the actual object. Also, the body information may include information on a website such as a social networking service (SNS) related to the actual object. For example, the display control unit 123 may combine the processing policy information and the body information, and in a case in which an expensive actual object belongs to the user, the display control unit 123 may display a display object for alerting that a budget is not sufficient.

For example, the display control unit 123 may control display of a display object indicating interaction from an application in response to a user's input. In that case, the display control unit 123 can function as a control layer for a general OS that performs drawing control for multi-content targeted for a window or the like that displays an application and an event delivery such as touching of each item content.

(3) Output Unit 130

The output unit 130 is an output interface for providing a notification of various kinds of information processed by the information processing system 100 to the user. The output unit 130 includes a display device such as a display, a touch panel, or a projector, for example, and displays various kinds of information on the display screen under control from the display control unit 123. The output unit 130 corresponds to output units 130a to 130c illustrated in FIGS. 1 to 3 and displays the display object on the display screen as described above. Note that the embodiment is not limited to such an example, and the output unit 130 may further include a sound output device such as a speaker and may output various kinds of information through sound.

(4) Processing Policy Information Storage Unit 150

The processing policy information storage unit 150 may include various kinds of storage device such as a magnetic storage unit device such as a hard disk drive (HDD), a semiconductor storage device, an optical storage device, or a magneto-optic storage device and stores various kinds of information to be processed by the information processing system 100. Specifically, the processing policy information storage unit 150 stores the processing policy information of the actual object. The information to be stored is as described above with reference to Table 1.

(5) Body Information Storage Unit 160

The body information storage unit 160 includes various kinds of storage device such as a magnetic storage unit device such as an HDD, a semiconductor storage device, an optical storage device, or a magneto-optic storage device, for example, and stores various kinds of information to be processed by the information processing system 100. Specifically, the body information storage unit 160 stores the body information of the actual object.

<<3. Flow of Processing>>

Figure 5:
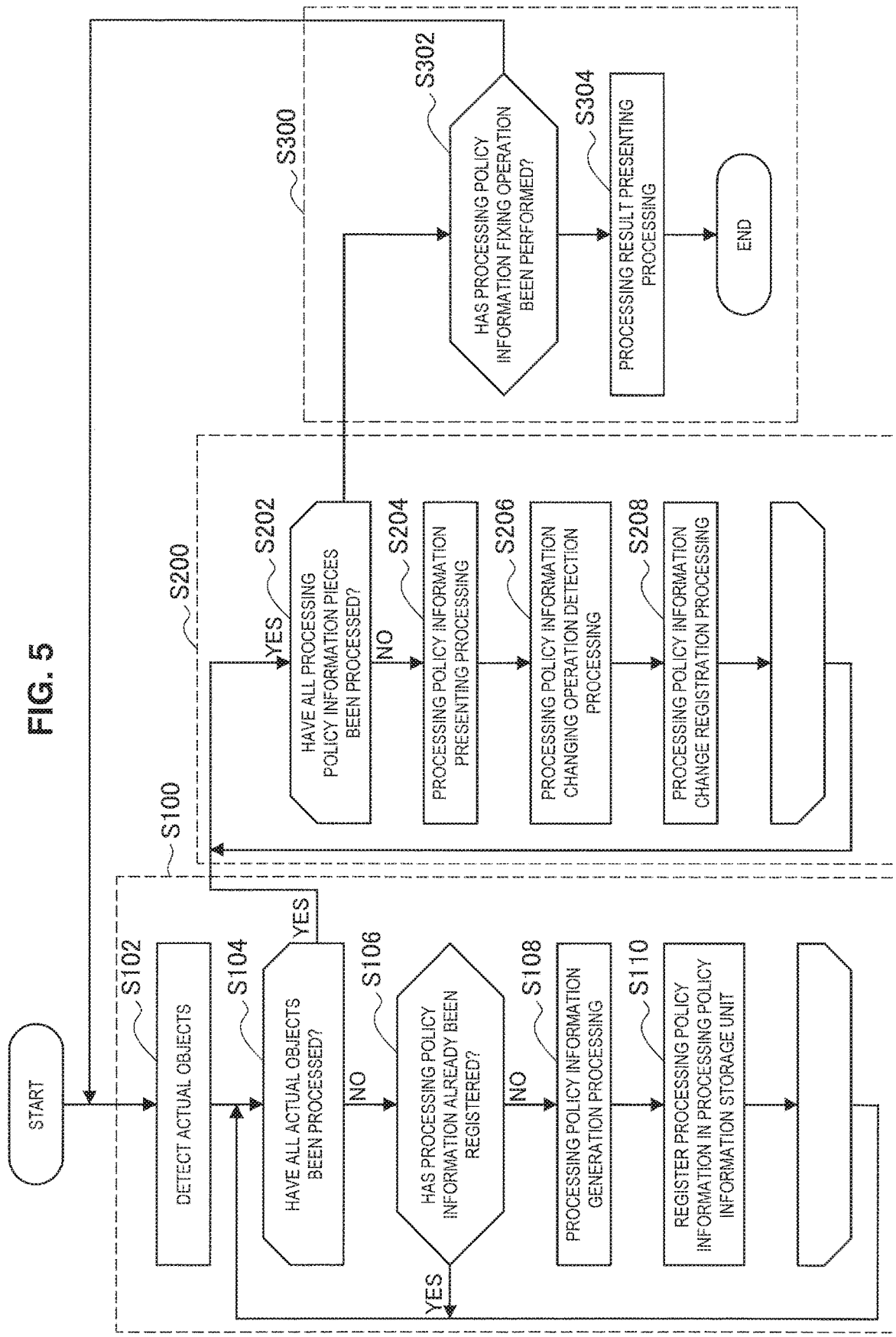
FIG. 5 is a flowchart illustrating an example of a flow of information processing that is executed by the information processing system according to the embodiment.

Hereinafter, a flow of processing performed by the information processing system 100 according to the embodiment will be described with reference to FIG. 5. FIG. 5 is a flowchart illustrating an example of a flow of information processing that is executed by the information processing system 100 according to the embodiment. As illustrated in FIG. 5, information processing according to the embodiment includes a processing policy information generation processing group (Step S100), a processing policy information changing processing group (Step S200), and a processing result presenting processing group (Step S300).

(1) Processing Policy Information Generation Processing Group

First, the information processing system 100 performs various kinds of processing for generating processing policy information of actual objects (Step S100).

Specifically, the information processing system 100 detects actual objects that are present on the display screen first (Step S102). For example, the processing policy information control unit 121 recognizes boundaries between the display screen and the actual objects on the basis of depth information and detects each closed curved surface as one actual object.

The information processing system 100 determines whether or not all detected objects have been processed (Step S104). Processing in Steps S106 to S110 described below is repeatedly performed on each of the detected actual objects as a target until all the actual objects are processed (Step S104/NO). First, the processing policy information control unit 121 determines whether or not processing policy information of a target actual object has already been registered in the processing policy information storage unit 150 (Step S106). In a case in which it is determined that the processing policy information of the target actual object has already been registered, the information processing system 100 changes the target actual object and performs the processing in Steps S106 to S110 thereon again (Step S106/YES). Meanwhile, in a case in which it is determined that the processing policy information of the target actual object has not already been registered (Step S106/NO), the processing policy information control unit 121 performs processing policy information generation processing for generating the processing policy information (Step S108) and registers the processing policy information in the processing policy information storage unit 150 (Step S110). Thereafter, the information processing system 100 changes the target actual object and performs the processing in Steps S106 to S110 thereon again.

(2) Processing Policy Information Changing Processing Group

In a case in which the processing policy information generation processing group has ended (Step S104/YES), the information processing system 100 performs various kinds of processing for changing the processing policy information of the actual objects (Step S200).

Specifically, the processing policy information control unit 121 determines whether or not all the processing policy information pieces that have already been registered has been processed first (Step S202). The following processing in Steps S204 to S208 is repeated on each piece of processing policy information that has already been registered until all the processing policy information is processed (Step S202/NO). First, the display control unit 123 performs processing policy information presenting processing of presenting the processing policy information to the user (Step S204). For example, the display control unit 123 displays a display object indicating the processing policy information of a certain actual object in relation to the actual object. Then, the processing policy information control unit 121 performs processing policy information changing operation detection processing of sequentially monitoring user operations and detecting a user operation of changing the processing policy information (Step S206). Then, in a case in which a user operation of changing the processing policy information has been detected, the processing policy information control unit 121 performs processing policy information change registration processing of registering the change in the processing policy information in accordance with such a user operation (Step S208). Thereafter, the information processing system 100 changes the target processing policy information and performs the processing in Steps S204 to S208 thereon again.

(3) Processing Result Presenting Processing Group

In a case in which the processing policy information changing processing group is ended (Step S202/YES), the information processing system 100 performs various kinds of processing for presenting processing results (Step S300).

Specifically, the display control unit 123 determines whether or not an operation of fixing the processing policy information has been performed first (Step S302). In a case in which it is determined that the operation of fixing the processing policy information has not been performed (Step S302/NO), the processing returns to the processing policy information generation processing group. Meanwhile, in a case in which it is determined that the operation of fixing the processing policy information has been performed (Step S302/YES), processing result presenting processing of displaying the processing result is performed (Step S304).

<<4. Details of Each Processing>>

Hereinafter, details of the aforementioned processing policy information generation processing (Step S108), the processing policy information presenting processing (Step S204), the processing policy information changing operation detection processing (Step S206), the processing policy information change registration processing (Step S208), and the processing result presenting processing (Step 304) will be described.

<4.1. Processing Policy Information Generation Processing>

The information processing system 100 generates processing policy information of an actual object. For example, the information processing system 100 associates a user who has performed a specific operation on an actual object with the actual object. For example, the information processing system 100 generates processing policy information when the user performs an operation of placing the actual object on the display screen or the like and the actual object appears on the display screen for the first time.

Hereinafter, an example of processing policy information generation processing will be described with reference to FIGS. 6 to 12. The information processing system 100 executes processing described below alone or in combination.

Figure 6:
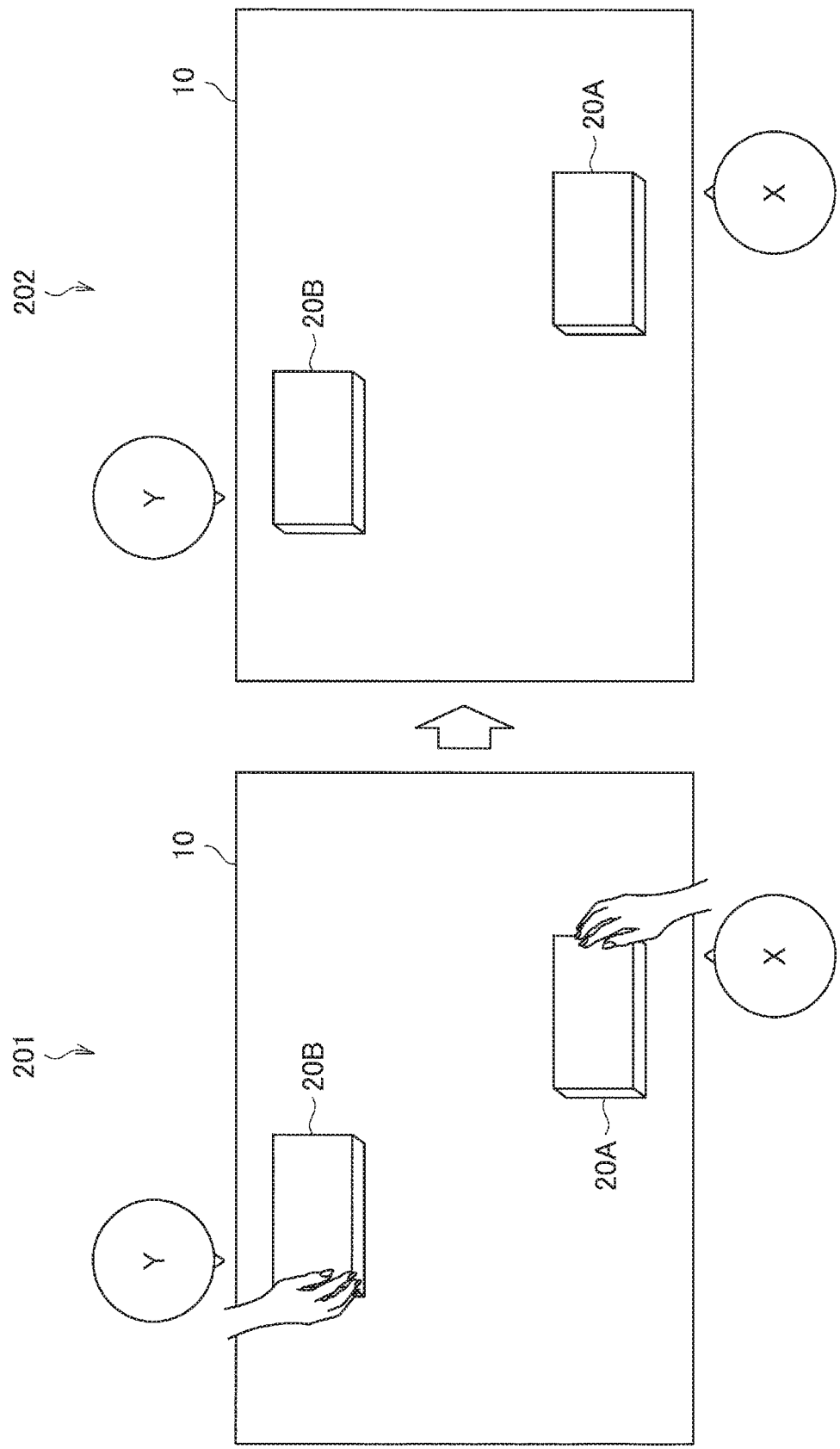
FIG. 6 is a diagram for describing processing policy information generation processing according to the embodiment.

FIG. 6 is a diagram for describing processing policy information generation processing according to the embodiment. As represented with the reference numeral 201, for example, it is assumed that a user X has placed an actual object 20A on the display screen 10 (for example, on the top surface of the table 140a) and a user Y has placed an actual object 20B thereon. In this case, the information processing system 100 may generate processing policy information indicating that no users are associated with the actual objects 20, that is, processing policy information indicating that there is no target of belonging.

Figure 7:
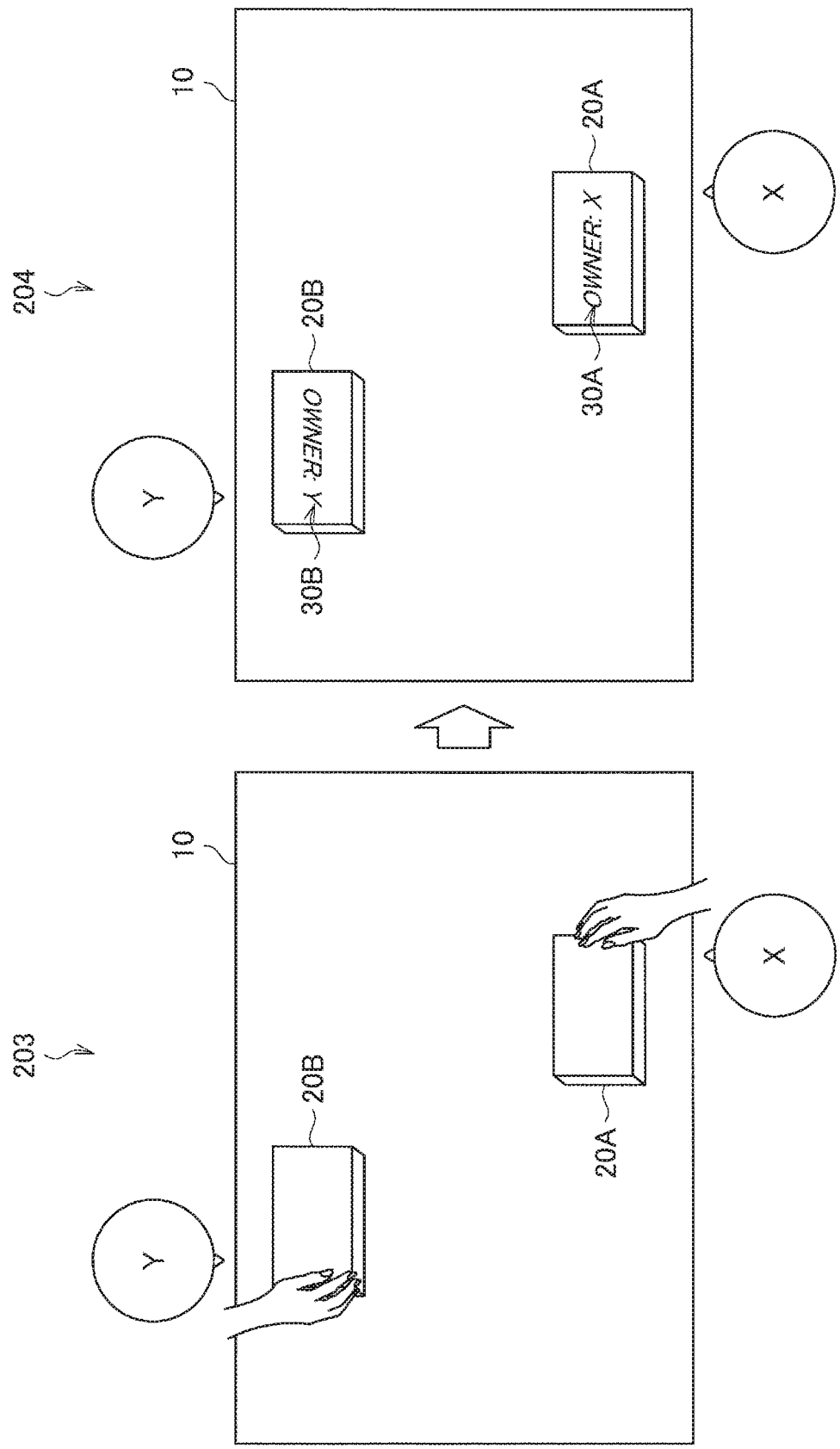
FIG. 7 is a diagram for describing processing policy information generation processing according to the embodiment.

FIG. 7 is a diagram for describing processing policy information generation processing according to the embodiment. As represented with the reference numeral 203, for example, it is assumed that a user X has placed an actual object 20A on the display screen 10 and a user Y has placed an actual object 20B thereon. In this case, the information processing system 100 may associate the users who have placed the actual object with the actual objects 20 as represented with the reference numeral 204. In other words, the information processing system 100 may associate the users who have touched the actual objects with the actual objects 20. For example, the information processing system 100 generates processing policy information that associates the user X with the actual object 20A and indicates that the actual object 20A belongs to the user X. Similarly, the information processing system 100 generates processing policy information that associates the user Y with the actual object 20B and indicates that the actual object 20B belongs to the user Y.

Note that the information processing system 100 can recognize which of the actual objects 20 has been placed by which of the users, by tracing hands with which the actual objects 20 have been placed. Also, the information processing system 100 may recognize and distinguish each of the users through image recognition of the shape of his/her face or a hand or may more simply recognize and distinguish each user on the basis a direction in which the user is present (for example, a direction of his/her arm root) when seen from the display screen 10.

Also, FIG. 7 illustrates an example in which a result of the processing policy information generation processing is presented. Specifically, an "owner: X" is displayed as a display object 30A indicating processing policy information of the actual object 20A, and an "owner: Y" is displayed as a display object 30B indicating processing policy information of the actual object 20B. However, such display may not be displayed in the processing policy information generation processing. The same applies to FIGS. 8 to 12 described below.

Figure 8:
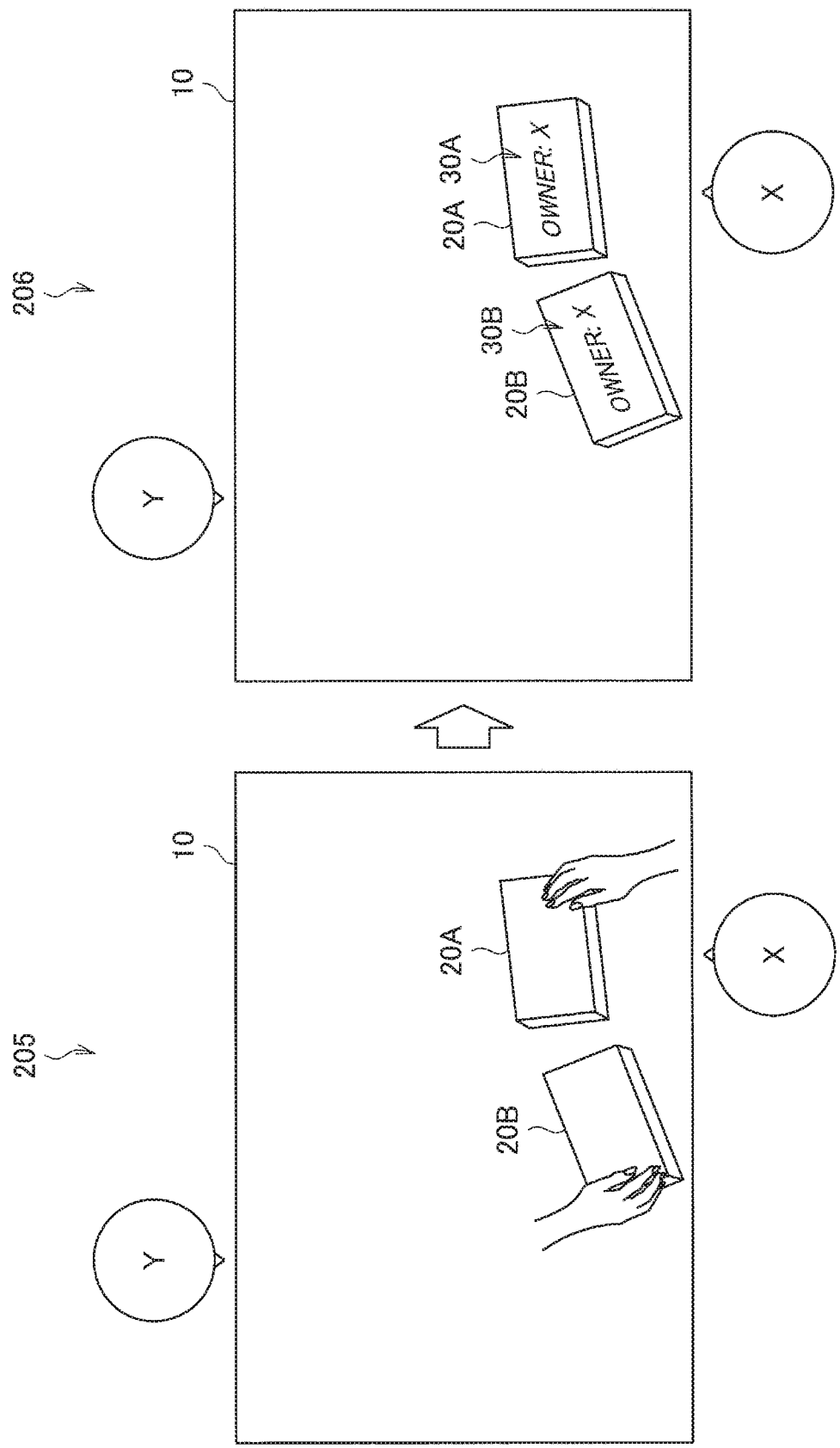
FIG. 8 is a diagram for describing processing policy information generation processing according to the embodiment.

FIG. 8 is a diagram for describing processing policy information generation processing according to the embodiment. As represented with the reference numeral 205, for example, it is assumed that the user X has placed an actual object 20A on the display screen 10 and the user Y has placed an actual object 20B thereon. For example, the information processing system 100 may associate a user who is in a predetermined relationship with the actual objects with the actual objects. The predetermined relationship may be related to a distance. For example, the information processing system 100 associates the user who is located at the shortest distance from the actual objects with the actual objects. Referring to the reference numeral 205, the distances to the actual objects 20A and 20B are shorter from the user X than from the user Y. Thus, the information processing system 100 associates the user X with the actual objects 20A and 20B and displays the display objects 30A and 30B indicating the processing policy information thereof as represented with the reference numeral 206. In the registration processing, it is possible to perform flexible associating regardless of the users who have placed the actual objects. Note that the information processing system 100 may identify the user who is located at the shortest distance from the actual objects by estimating positions at which users are present on the basis of coordinates or the like of arm roots when the users have placed the actual objects and comparing distances from the users' positions and the positions of centers of gravity of the actual objects for the respective user.

Figure 9:
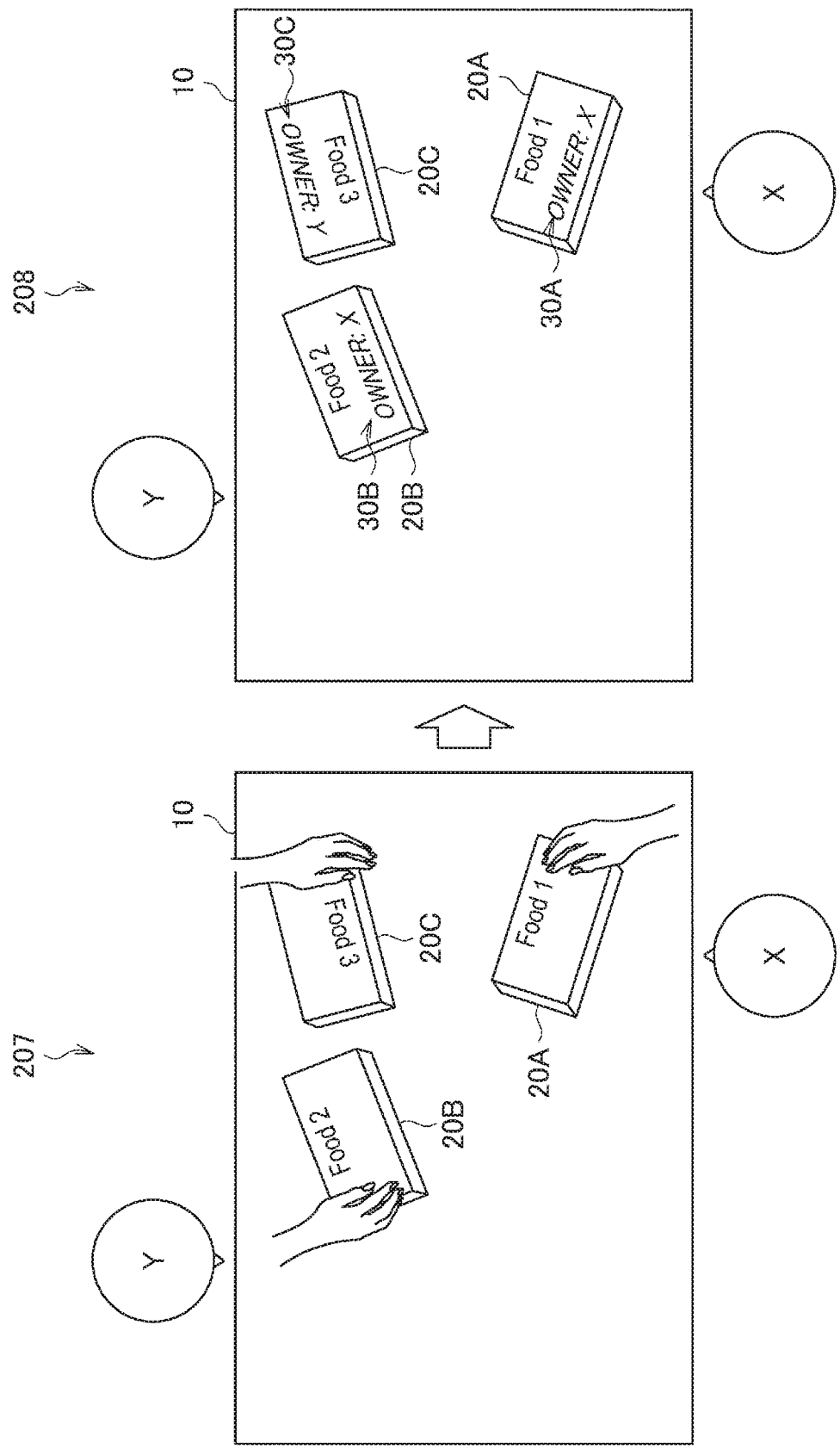
FIG. 9 is a diagram for describing processing policy information generation processing according to the embodiment.

FIG. 9 is a diagram for describing processing policy information generation processing according to the embodiment. As represented with the reference numeral 207, for example, it is assumed that the user X has placed an actual object 20A on the display screen 10 and the user Y has placed actual objects 20B and 20C thereon. For example, the information processing system 100 may associate a user who is in a predetermined relationship with the actual objects with the actual objects. The predetermined relationship may be related to an orientation of the actual objects.

For example, the information processing system 100 associates a user corresponding to orientations of the actual objects with the actual objects. As represented with the reference numeral 208, the information processing system 100 recognizes that the user X is present in a direction in which the actual objects 20A and 20B face, associates the user X with the actual objects 20A and 20B, and displays the display objects 30A and 30B indicating processing policy information thereof. Also, the information processing system 100 recognizes that the user Y is present in a direction in which an actual object 20C faces, associates the user Y with the actual object 20C, and displays a display object 30C indicating processing policy information. Note that the orientations of the actual objects 20 may be recognized on the basis of, for example, orientations of letters printed on the actual objects 20, textures with upward-downward information such as packages, bar codes with concepts of orientations, shapes from which orientations can be distinguished, or the like.

Figure 10:
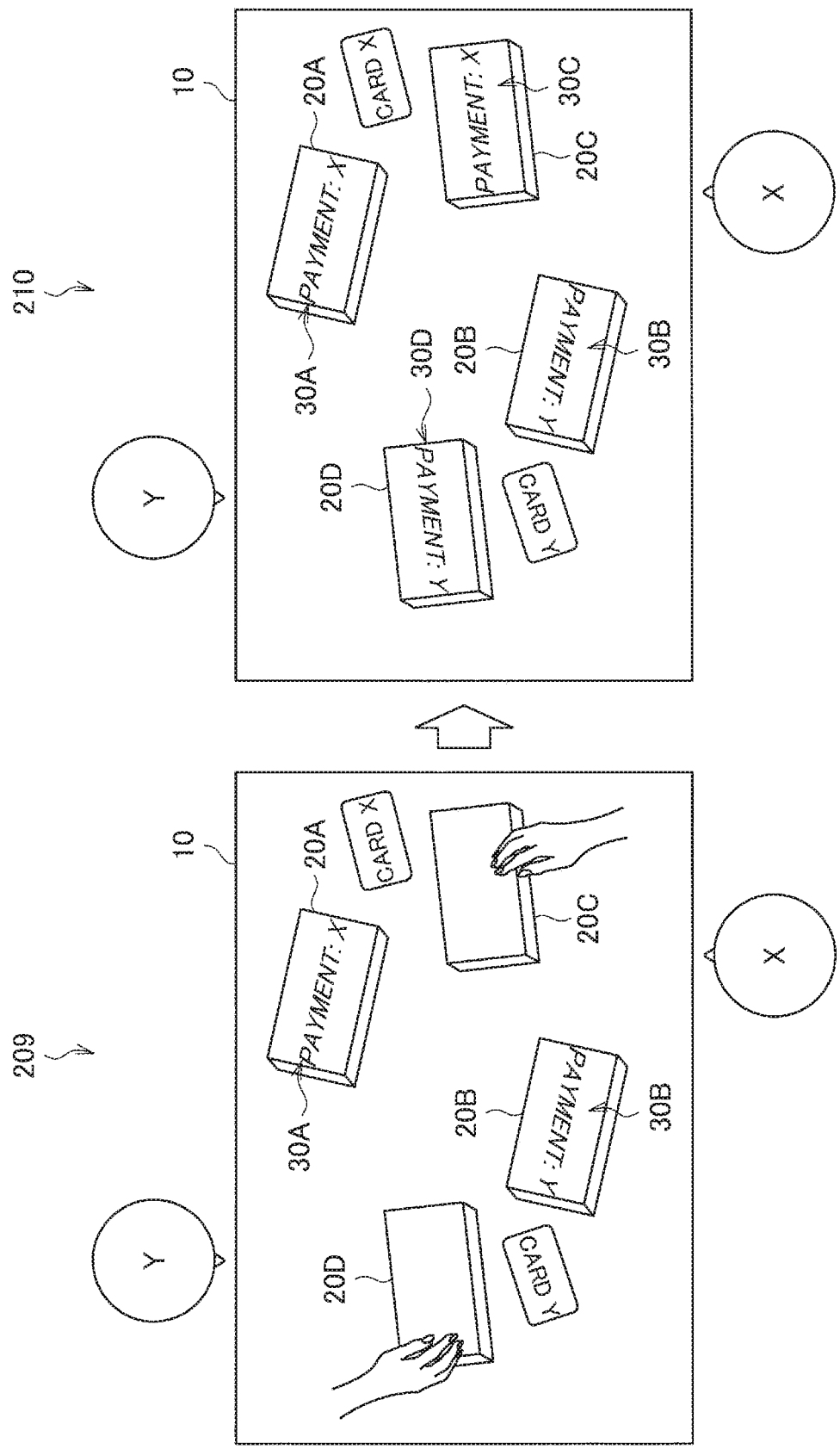
FIG. 10 is a diagram for describing processing policy information generation processing according to the embodiment.

FIG. 10 is a diagram for describing processing policy information generation processing according to the embodiment. As represented with the reference numeral 209, for example, it is assumed that the user X has placed an actual object 20C on the display screen 10 and the user Y has placed an actual object 20D thereon. Referring to the reference numeral 209, the actual object 20C is placed near a credit card X of the user X that has already been present, and the actual object 20D is placed near a credit card Y of the user Y that has already been present. For example, the information processing system 100 may associate, with one of the two actual objects in a predetermined relationship, the other actual object or a user associated with the other object. The predetermined relationship may be related to a distance. As represented with the reference numeral 210, for example, the information processing system 100 may register a credit card that is located at the closest position to the actual object 20C or within a predetermined distance as a target of belonging. As represented with the reference numeral 210, the information processing system 100 associates the credit card X that is located at the closest position to the actual object 20C or within the predetermined distance (or the user X associated with the credit card X). Note that the associating of the user X with the credit card X may be specified on the basis of printed information or the like. Then, the information processing system 100 generates processing policy information indicating that payment will be made with the credit card X (or by the user X) for the actual object 20C and displays the display object 30C with such an indication. Similarly, the information processing system 100 associates the credit card Y that is located at the closest position to the actual object 20D or within the predetermined distance (or the user Y associated with the credit card Y). Then, the information processing system 100 generates processing policy information indicating that payment will be made with the credit card Y (or by the user Y) for the actual object 20D and displays the display object 30D with such an indication. Similar processing has already been performed on the actual object 20A and the display object 30A and the actual object 20B and the display object 30B.

Note that in the drawing illustrating an example of display on the display screen, letters that are actually described on an actual object are expressed with an ordinary font (a font that is not italic) and letters included in the display object are expressed with italic letters. The same applies to the following drawings.

Although the credit cards with which individuals can be specified on the basis of printed information or the like have been described as examples of the actual objects that can be targets of belonging, the example is not limited to such an example. For example, the actual objects that can be targets of belonging may be actual objects with which it is difficult to identify individuals alone such as prepaid cards. Also, the actual objects that can be targets of belonging may be actual objects other than media for payment such as credit cards or prepaid cards. In that case, a user associated with an actual object is associated with another actual object, for example. An example of the case will be described with reference to FIG. 11.

Figure 11:
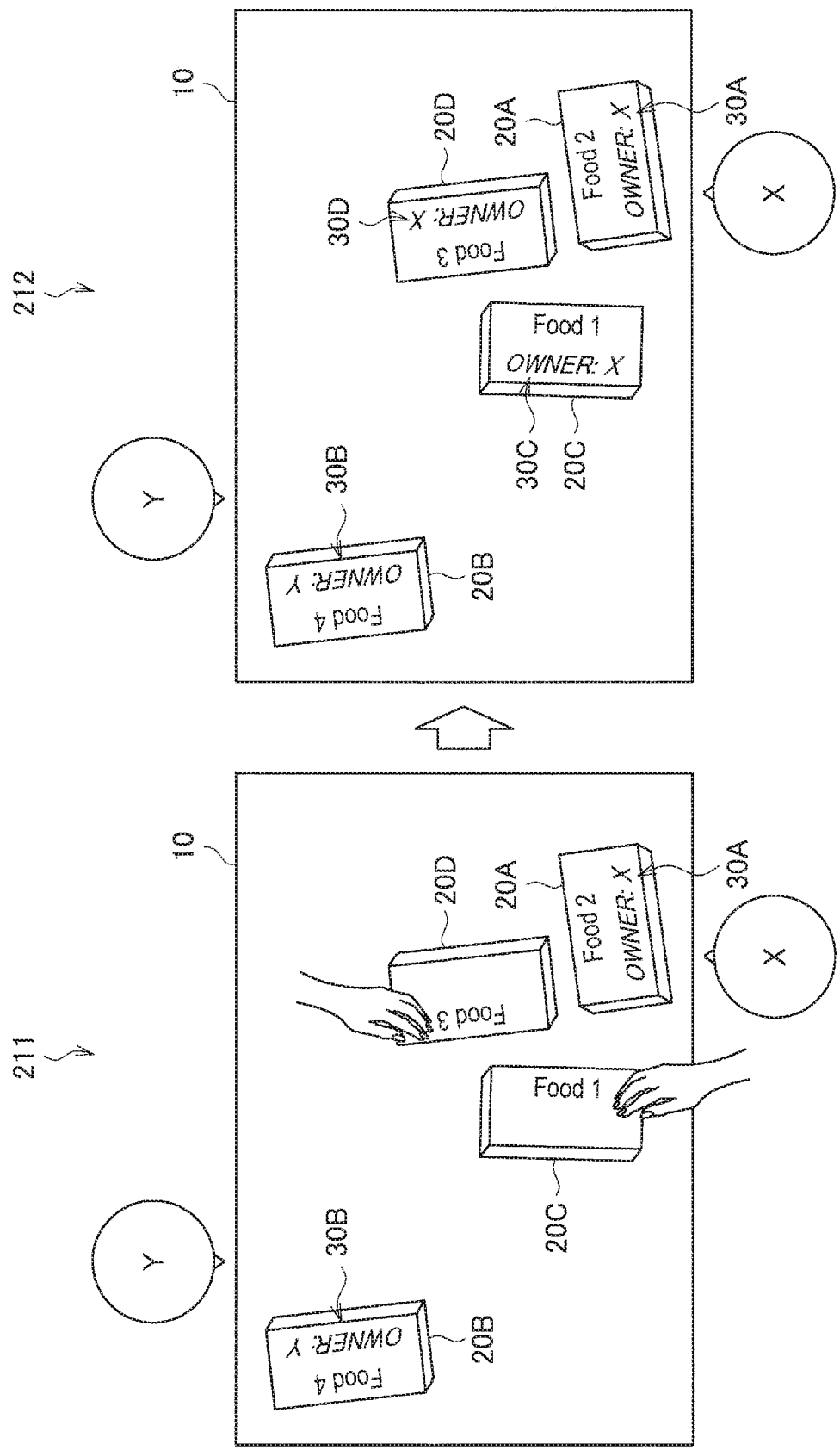
FIG. 11 is a diagram for describing processing policy information generation processing according to the embodiment.

FIG. 11 is a diagram for describing processing policy information generation processing according to the embodiment. As represented with the reference numeral 211, for example, it is assumed that the user X has placed an actual object 20C and the user Y has placed an actual object 20D thereon in a state in which the actual object 20A and the actual object 20B have already been placed on the display screen 10. The actual object 20A is associated with the user X, and the display object 30A with such an indication is displayed. Also, the actual object 20B is associated with the user Y, and the display object 30B with such an indication is displayed. For example, the information processing system 100 may associate, with one of the two actual objects in a predetermined relationship, a user associated with the other object. The predetermined relationship may be related to a distance. As represented with the reference numeral 212, for example, the actual object 20B is present near the actual objects 20C and 20D or within the predetermined distance. Thus, the information processing system 100 associates the user X with the actual objects 20C and 20D and displays the display objects 30C and 30D indicating the processing policy information thereof.

Figure 12:
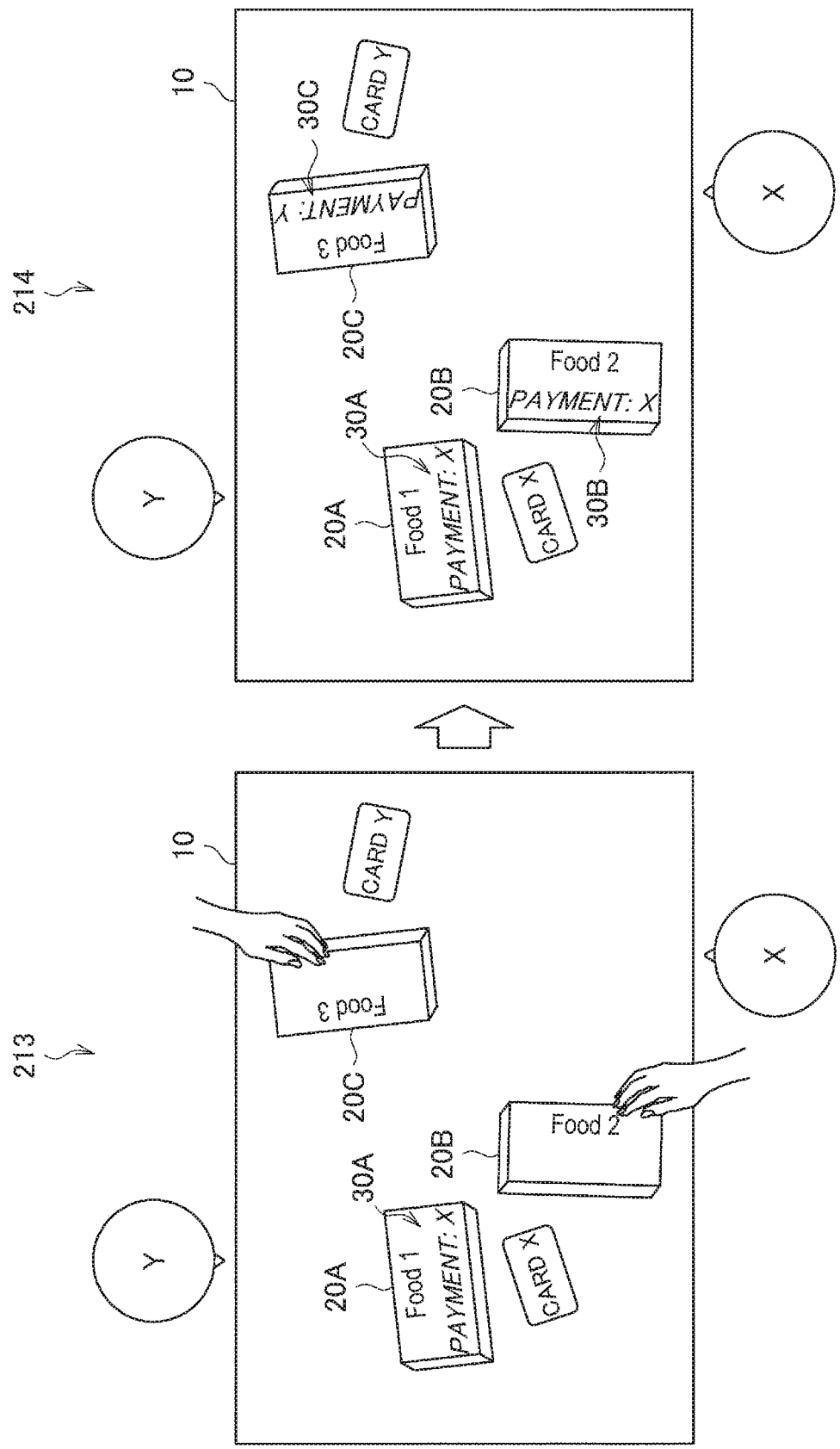
FIG. 12 is a diagram for describing processing policy information generation processing according to the embodiment.

FIG. 12 is a diagram for describing processing policy information generation processing according to the embodiment. As represented with the reference numeral 213, for example, it is assumed that the user X has placed an actual object 20B and the user Y has placed an actual object 20C thereon in a state in which the actual object 20A has already been placed on the display screen 10. For example, the information processing system 100 may associate, with one of the two actual objects in a predetermined relationship, a user associated with the other object. The predetermined relationship may be related to an orientation. As represented with the reference numeral 214, for example, the information processing system 100 recognizes that the credit card X is present in a direction in which the actual object 20B faces, associates the user X associated with the credit card X with the actual object 20B, and displays the display object 30B indicating the processing policy information. Also, the information processing system 100 recognizes that the credit card Y is present in a direction in which the actual object 20C faces, associates the user Y associated with the credit card Y with the actual object 20C, and displays the display object 30C indicating the processing policy information. Similar processing has already been performed on the actual object 20A and the display object 30A.

<4.2. Processing Policy Information Presenting Processing>

The information processing system 100 controls display of a display object on the basis of processing policy information of an actual object. Targets of control include details, the position, the size, the angle, the shape, the display range, and the like of the display object.

For example, the information processing system 100 controls details of the display object on the basis of the processing policy information. Specifically, the information processing system 100 may display display objects indicating that processing policy information has already been registered/has not yet been registered, display objects related to the associated user, or the like as represented with the reference numeral 221 or 222 in FIG. 13 or the reference numeral 225, 226, or 227 in FIG. 14. In this manner, the user can check whether or not processing policy information of the actual object is present, and in a case in which the processing policy information is present, the user can check details thereof.

For example, the information processing system 100 controls a display range of the display object on the basis of the processing policy information. Specifically, the information processing system 100 may control whether or not to cause the display range of the display object to be superimposed on the actual object on the basis of whether or not the user is associated therewith as represented with the reference numeral 223 in FIG. 13 and the reference numeral 228 in FIG. 14, which will be described later. If the display range of the display object is superimposed on the actual object, texture of the actual object is rewritten with the details of the display of the display object, and thus, there is a trend that visual recognition and sensing (including image recognition and the like) become difficult. Thus, the information processing system 100 can facilitate visual recognition and sensing of an actual object with no target of belonging by excluding the actual object with no target of belonging from the display range of the display object. Here, in a case in which a room in which the information processing system 100 is provided is bright, a black color may be displayed (that is, projected) alone in a certain region as processing of excluding the region from the display range of the display object. In contrast, in a case in which the room in which the information processing system 100 is provided is dark, a white color may be displayed alone in the certain region as the processing of excluding the region from the display range of the display object. Meanwhile, the information processing system 100 can make visual recognition difficult and prevent an unnecessary operation for belonging information in advance by causing the display range of the display object to be superimposed on the actual object which belongs to a user.

In another example, the information processing system 100 may control whether or not to cause a display range of a display object to be superimposed on a sensing target region of an actual object on the basis of whether or not a user has been associated therewith as represented with the reference numeral 224 in FIG. 13 and the reference numeral 228 in FIG. 14. The sensing target region is a region as a target of sensing (for example, imaging) for receiving a user operation or for image recognition or the like as will be described later with reference to FIG. 15 and the like, such as a bar code. Thus, the information processing system 100 can facilitate visual recognition and sensing of an actual object with no target of belonging by excluding the sensing target region of the actual object with no target of belonging from the display range of the display object. In addition, the information processing system 100 can also secure the size of the display range by causing the display range to be superimposed on a region other than the aforementioned sensing target region in the actual object. Meanwhile, the information processing system 100 can make visual recognition difficult and prevent an unnecessary operation for belonging information in advance by causing the display range of the display object to be superimposed on the sensing target region of the actual object which belongs to a user.

For example, the information processing system 100 associates and displays the display object indicating the processing policy information of the actual object with the actual object. For example, the information processing system 100 displays the display object indicating the associated user such that the display object is caused to be superimposed on the actual object or near the actual object. In this manner, the user can intuitively know the processing policy information of the actual object.

Hereinafter, an example of processing policy information presenting processing will be described with reference to FIGS. 13 and 14. The information processing system 100 executes processing described below alone or in combination.

FIG. 13 is a diagram for describing the processing policy information presenting processing according to the embodiment. FIG. 13 illustrates a display example in a case in which a book with a bar code 21 that is an actual object 20 with no target of belonging is placed on the display screen 10. The actual object 20 may be a book to be borrowed in a library, and the bar code 21 stores information for management in the library and is a sensing target for acquiring such information. As represented with the reference numeral 221 in FIG. 13, the information processing system 100 may not display any display object. Also, the information processing system 100 may display a display object 30 indicating that there is no target of belonging as represented with the reference numeral 222. In addition, the information processing system 100 may display a display object 30 by setting a range excluding the actual object 20 to be a display range as represented with the reference numeral 223. Also, the information processing system 100 may display a display object 30 by setting a range excluding the bar code 21 on the actual object 20 to be a display range as represented with the reference numeral 224.

FIG. 14 is a diagram for describing the processing policy information presenting processing according to the embodiment. FIG. 14 illustrates a display example in a case in which an actual object 20 that is a book with a bar code 21 and with a target of belonging is placed on the display screen 10. For example, the information processing system 100 may display a display object 30 indicating a user who is a target of belonging as represented with the reference numeral 225. Also, in a case in which a user who has already become a target of belonging of the actual object 20 performs an operation of causing the actual object 20 to belong to the user himself/herself again, the information processing system 100 may display a display object 30 indicating that the actual object 20 has already belonged to the user as represented with the reference numeral 226. Also, in a case in which a user Y performs an operation of causing an actual object 20 that has belonged to the user X to belong to the user Y himself/herself, the information processing system 100 may display a display object 30 indicating that the actual object 20 has already belonged to the user X as represented with the reference numeral 227. Also, the information processing system 100 may display the display object 30 by setting an entire range of the actual object 20 as a display range as represented with the reference numeral 228.

Note that the information processing system 100 may constantly display the display object 30 as described above at a timing at which the user touches the actual object 20 or the user tries to touch the actual object 20 and hovers the user's hand.

<4.3. Processing Policy Information Changing Operation Detection Processing>

The information processing system 100 detects a user operation of changing processing policy information and recognizes details of a change in the processing policy information that the user intends.

For example, the information processing system 100 may control the processing policy information in accordance with how to touch the actual object. Specifically, the information processing system 100 may recognize details of a change of applying or deleting processing policy information in accordance with the number of fingers with which the user taps the actual object, the shape of the user's hand, the angle, the figure created by the user's fingers, and the like.

Hereinafter, an example of an operation of applying processing policy information will be described with reference to FIGS. 15 to 19. The information processing system 100 executes processing described below alone or in combination.

FIG. 15 is a diagram for describing processing policy information changing operation detection processing according to the embodiment. FIG. 15 illustrates an example of an operation of selecting an actual object 20 that is a book with a bar code 21 for which processing policy information is to be changed in a case in which the actual object 20 is placed on the display screen 10. As represented with the reference numeral 231, 232, or 233, for example, the information processing system 100 may detect an operation of tracing a region as a target of sensing, such as the bar code 21, an operation of surrounding the region, or an operation of tapping the region as a selecting operation. The selecting operation may be recognized by an operation of setting the user who has made the selection to be a target of belonging. The information processing system 100 can specify the position of the bar code 21 early on the basis of such an operation and perform sensing at such a position as a target in a limited manner. Also, in a case in which a plurality of bar codes 21 are attached to one actual object 20, it is possible to recognize which of the bar codes 21 the user considers as a target. Also, as represented with the reference numeral 234, the information processing system 100 may detect an operation of tapping the actual object 20 itself as a selecting operation. The information processing system 100 can perform sensing targeted at the tapped actual object 20 or perform sensing limited to the bar code 21 attached to the tapped actual object 20 on the basis of such an operation.

Figure 17:
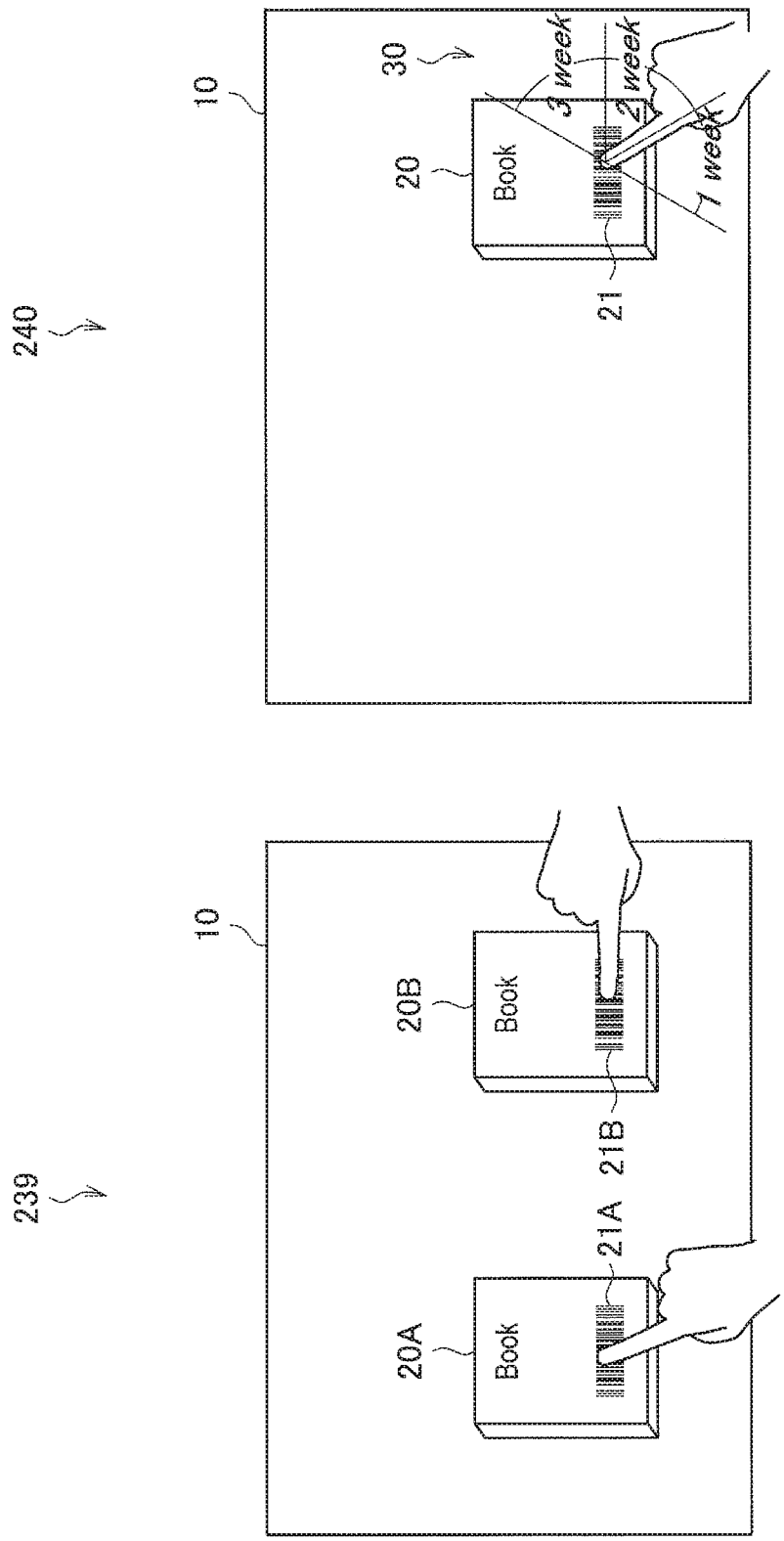
FIG. 17 is a diagram for describing processing policy information changing operation detection processing according to the embodiment.

FIGS. 16 and 17 are diagrams for describing processing policy information changing operation detection processing according to the embodiment. FIGS. 16 and 17 illustrate an example in which an application of processing policy information is recognized in response to a user operation. An example in which the information processing system 100 recognizes distinction between purchase and rental, a rental term, and permission or denial of joint purchase in response to a user operation is illustrated, for example.

Specifically, an example of an operation of changing processing policy information in a case in which an actual object 20 that is a book with a bar code 21 is placed on the display screen 10 is illustrated with the reference numerals 235, 236, and 237 in FIG. 16. As represented with the reference numeral 235, for example, applications of different processing policy information may be recognized in accordance with which of one or two the number of operating fingers is. For example, tapping of a bar code 21A of an actual object 20A with one of user's fingers may be recognized as indicating an intention of one-week rental, and tapping of a bar code 21B of an actual object 20B with two of user's fingers may be recognized as indicating an intention of two-week rental. As represented with the reference numeral 236, for example, applications of different processing policy information may be recognized in accordance with which of fingers or a palm an operation has been performed with. For example, tapping of the bar code 21A of the actual object 20A with fingers may be recognized as indicating an intention of purchase, and touching of the bar code 21B of the actual object 20B with a palm may be recognized as indicating an intention of rental. As represented with the reference numeral 237, for example, applications of different processing policy information may be recognized in accordance with a shape of a figure drawn with fingers. For example, surrounding of the bar code 21A of the actual object 20A with a circle may be recognized as indicating an intention of purchase, and surrounding of the bar code 21B of the actual object 20B with a triangle may be recognized as indicating an intention of rental. Meanwhile, an example of an operation of changing processing policy information in a case in which an actual object 20 that is food is placed on a display screen 10 is illustrated with the reference numeral 238 in FIG. 16. As represented with the reference numeral 238, applications of different processing policy information may be recognized in accordance with a credit card with which the actual object 20 has been touched. For example, touching of the actual object 20A with the credit card X may be recognized as indicating an intention of payment with the credit card X, and touching of the actual object 20B with the credit card Y may be recognized as indicating an intention of payment with the credit card Y.

Also, an example of an operation of changing processing policy information in a case in which an actual object 20 that is a book with a bar code 21 is placed on the display screen 10 is illustrated with the reference numerals 239 and 240 in FIG. 17. As represented with the reference numeral 239, for example, applications of different processing policy information may be recognized in accordance with an angle of operating fingers. For example, tapping of the bar code 21A of the actual object 20A from a lower side may be recognized as indicating an intention of one-week rental, and tapping of the bar code 21B of the actual object 20B from a lateral direction may be recognized as indicating an intention of week rental. Also, the information processing system 100 may display information indicating a relationship between how to touch the actual object and details of control performed on the processing policy information as auxiliary information. Specifically, a display object 30 indicating a relationship between an angle of fingers and a corresponding term of rental may be displayed when the fingers are brought into contact with the bar code 21 as represented with the reference numeral 240. In this manner, usability for the user is improved. Note that the angle of the fingers described herein may be an angle in a direction in parallel to the display screen 10 or may be an angle relative to a normal direction of the display screen 10.

Note the operation of changing the processing policy information described above with reference to FIGS. 16 and 17 may also be performed as the operation of selecting the actual object described above with reference to FIG. 15.

Next, an example of an operation of deleting processing policy information or an operation of canceling an operation that has once been performed will be described with reference to FIG. 18. The information processing system 100 executes processing described below alone or in combination.

FIG. 18 is a diagram for describing processing policy information changing operation detection processing according to the embodiment. FIG. 18 illustrates an example in which processing policy information of an actual object is deleted in response to a user operation or a change in the processing policy information is canceled in response to a user operation. For example, an operation of performing an operation that has once been performed again may be recognized as indicating an intention of canceling a change in accordance with a first operation and returning the change to the original state. In a case in which processing policy information of an actual object 20 has been changed by an operation of tracking a bar code 21, for example, the change may be canceled by an operation of tracing the bar code 21 again as represented with the reference numeral 241. Also, an operation performed on a cancel button 31 that is a type of a display object may be recognized as indicating an intention of deleting processing policy information as represented with the reference numeral 242. In a case in which an actual object 20 belongs to a user X, for example, the user X may be deleted from belonging information. Also, an operation of shaking a user's hand in a left-right direction while hovering the hand over the actual object 20 may be recognized as indicating an intention of deleting processing policy information as represented with the reference numeral 243. In a case in which the actual object 20 belongs to the user X, for example, the user X may be deleted from belonging information.

Here, in a case in which a user operation for changing the processing policy information is detected or predicted, the information processing system 100 may display auxiliary information. The auxiliary information may be information that is obtained by referring to the processing policy information and that indicates that the actual object has already been associated with another user or may be information that is obtained by referring to the body information and that indicates that there is no sufficient budget or no stock, or the like. For example, the information processing system 100 can prevent an increase in the number of processes due to unnecessary operations and inconvenience occurring due to the operations in advance by displaying the auxiliary information at timing at which the user changes or tries to change the processing policy information of the actual object.

Although a part of the exemplary case has been described above with reference to the reference numeral 240 in FIG. 17, further description will be given below with reference to FIG. 19. The information processing system 100 executes processing described below alone or in combination.

Figure 19:
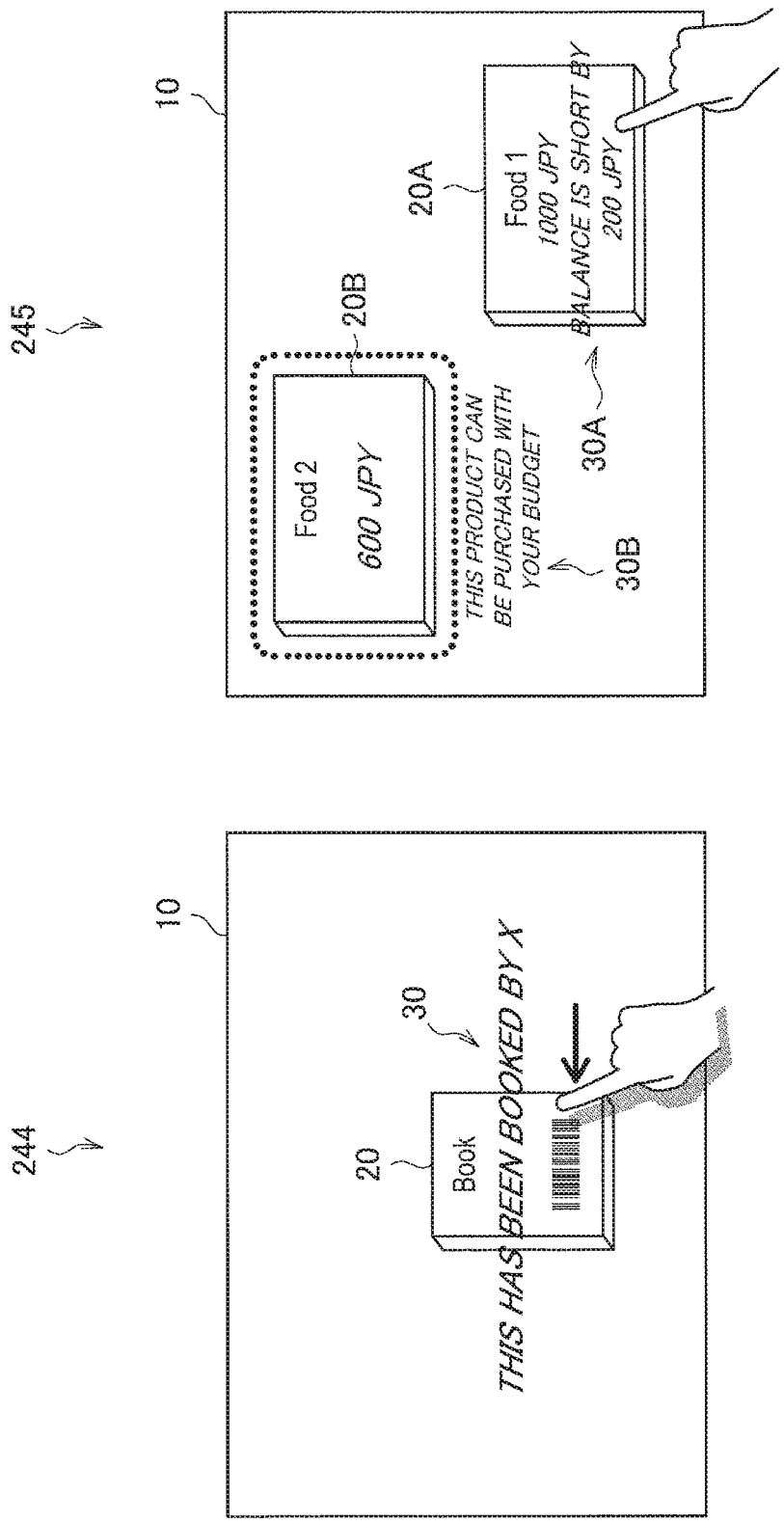
FIG. 19 is a diagram for describing processing policy information changing operation detection processing according to the embodiment.

FIG. 19 is a diagram for describing processing policy information changing operation detection processing according to the embodiment. FIG. 19 illustrates an example in which the auxiliary information is displayed in a case in which the user performs an operation of causing an actual object to belong to the user himself/herself. As represented with the reference numeral 244, for example, the information processing system 100 may display the display object 30 at a timing at which the user hovers the user's hand over the actual object 20 and tries to tap the actual object 20 in order to book the actual object 20 that is a book placed on the display screen 10. The display object 30 is auxiliary information indicating that the actual object has already been booked by another user, and it becomes not necessary for the user to unnecessarily touch the actual object 20 with reference to the auxiliary information. Also, as represented with the reference numeral 245, the display objects 30A and 30B may be displayed at a timing at which the user hovers the user's hand over an actual object 20A and tries to tap the actual object 20A in order to purchase the actual object 20A that is a food with a price of 1000 JPY. A display object 30A is auxiliary information indicating that budget is not enough to purchase the actual object 20A, and a display object 30B is auxiliary information indicating that it is possible to purchase an actual object 20B that is a food with a price of 600 JPY. It becomes not necessary for the user to unnecessarily touch the actual object 20A with reference to the auxiliary information, and the user can consider whether or not to purchase the actual object 20B.

<4.4. Processing Policy Information Change Registration Processing>

The information processing system 100 changes processing policy information stored in the processing policy information storage unit 150 in accordance with details of a change recognized on the basis of a user operation detected in the processing policy information changing operation detection processing. For example, the information processing system 100 performs control such that the details of the change recognized on the basis of the user operation are reflected as it is, or the details are reflected while a part of the details is changed, or the details are not reflected. Although the processing policy change registration processing is typically performed successively with the processing policy information changing operation detection processing, the processing policy change registration processing may be performed at a timing at which the user performs some fixing operation. Also, the information processing system 100 may display a display object indicating a result of the change.

For example, a case in which a second user has touched or is predicted to touch an actual object with which a first user has been associated will be considered. In that case, the information processing system 100 causes a display object indicating that the first user has been associated with the actual object to be displayed for the second user, and/or causes a display object related to an operation of the second user to be displayed for the first user. For example, the information processing system 100 displays a display object indicating that the actual object belongs to the first user for the second user as will be described later with reference to the reference numeral 252 in FIG. 20. Also, the information processing system 100 displays a display object indicating that the target of belonging of the actual object has been changed in response to the operation of the second user for the first user as will be described later with reference to the reference numeral 252 in FIG. 20. In this manner, it becomes possible for the first user to recognize a disadvantage that the target of belonging is changed or there may be a risk that the target of belonging is changed without any permission, which may occur due to the operation of the second user. This is also effective to prevent stealing.

Hereinafter, an example of processing policy information change registration processing will be described with reference to FIGS. 20 to 22. The information processing system 100 executes processing described below alone or in combination.

Figure 20:
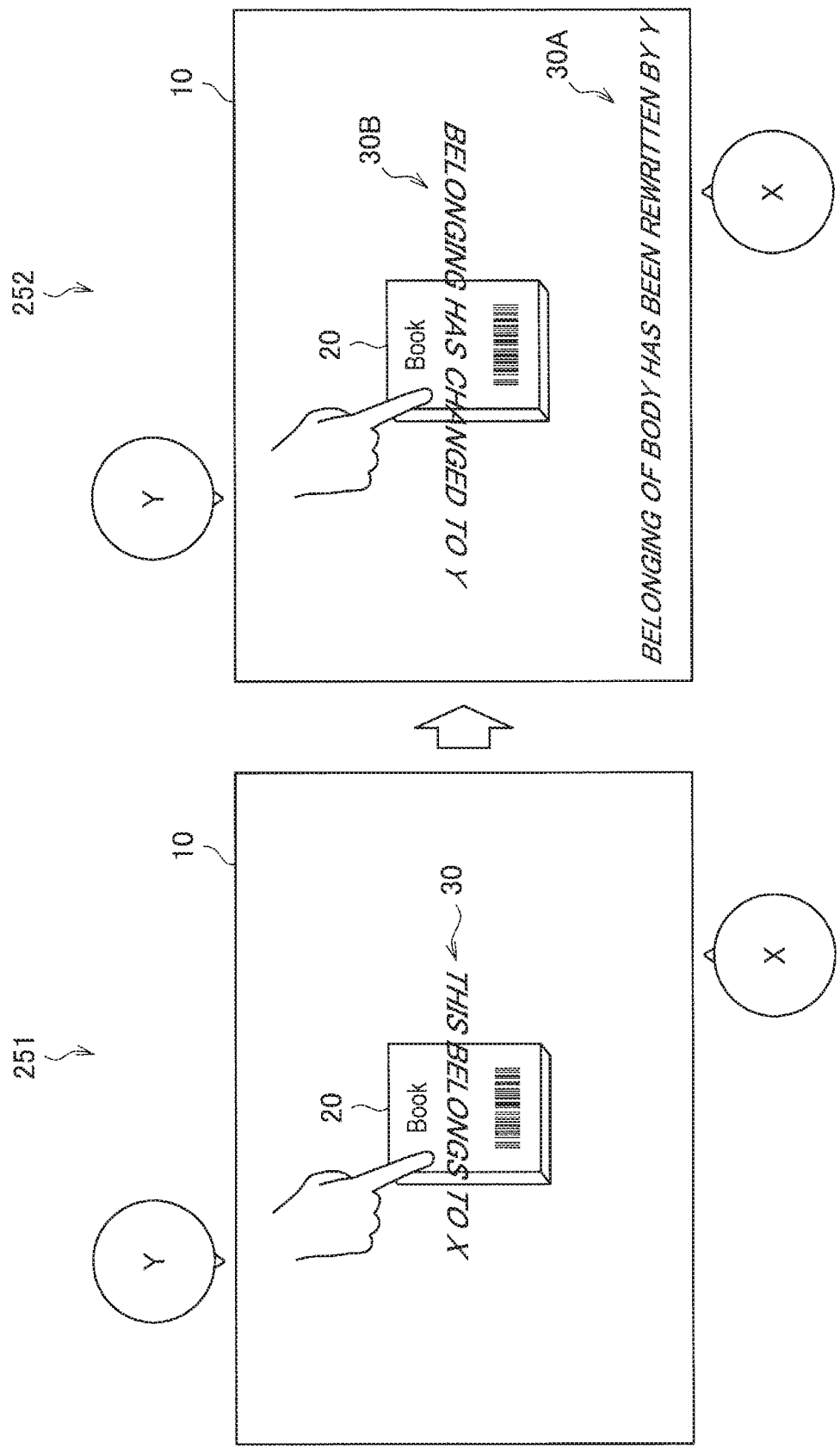
FIG. 20 is a diagram for describing processing policy information change registration processing according to the embodiment.
Figure 21:
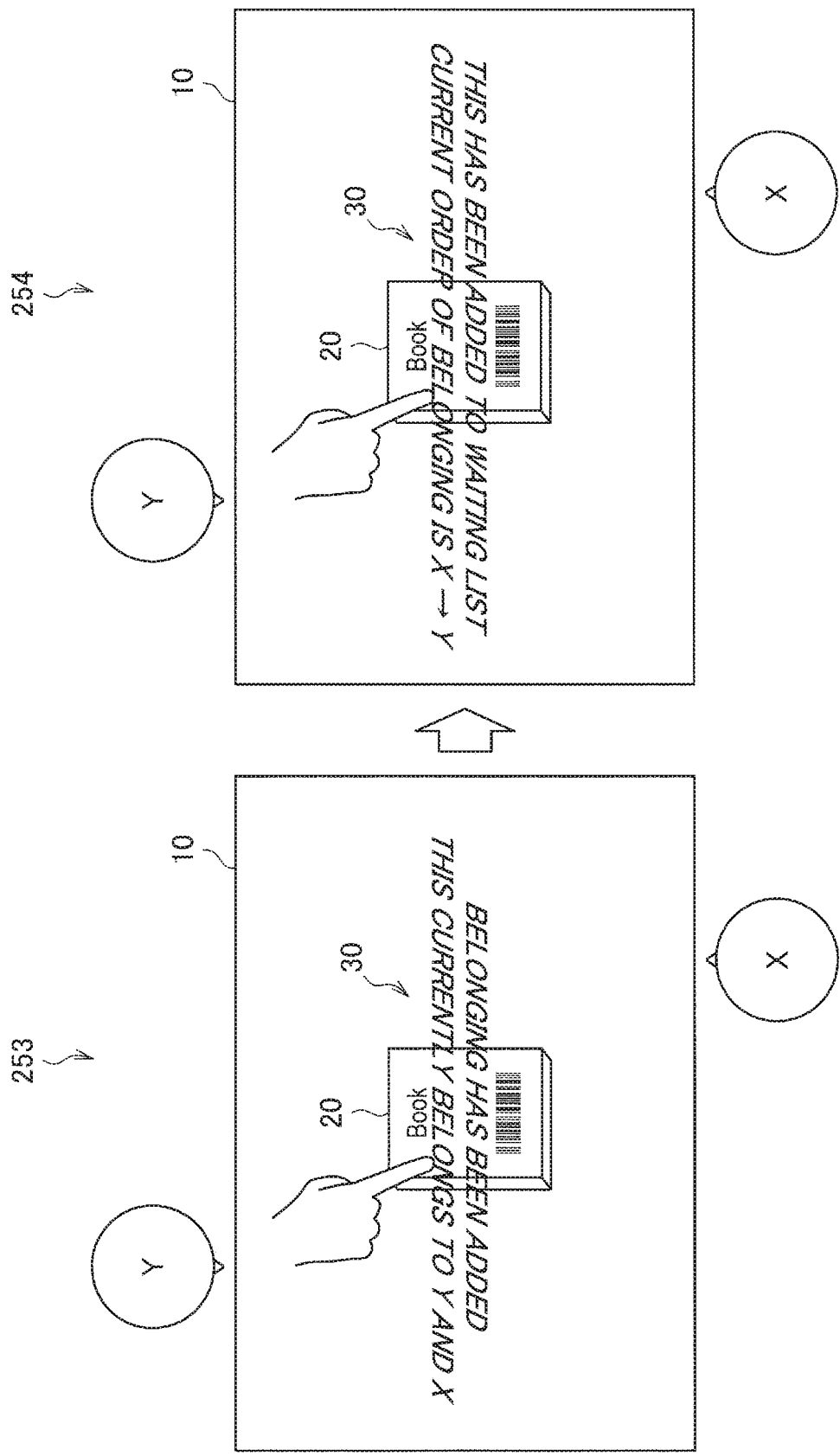
FIG. 21 is a diagram for describing processing policy information change registration processing according to the embodiment.
Figure 22:
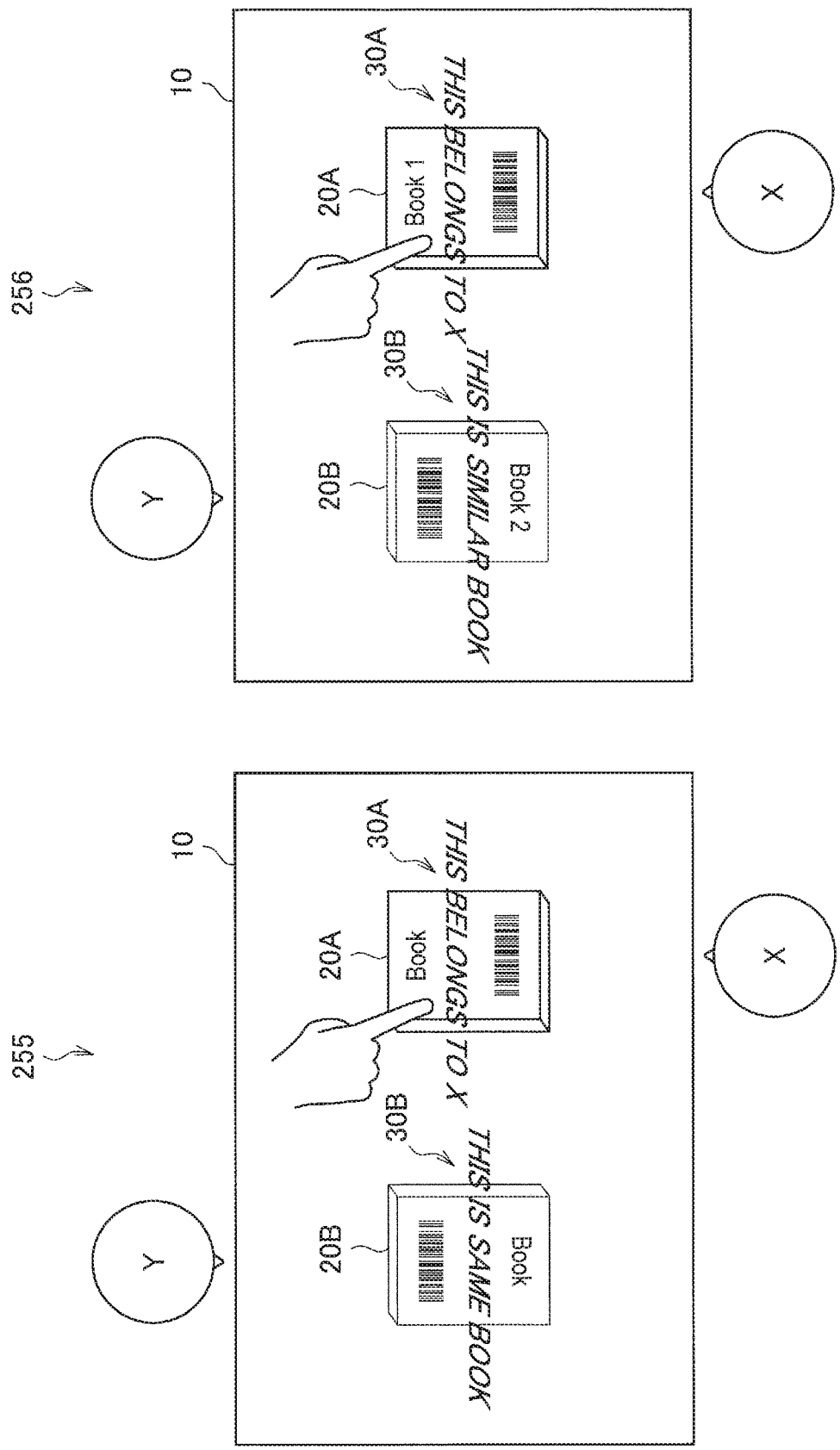
FIG. 22 is a diagram for describing processing policy information change registration processing according to the embodiment.

FIGS. 20 to 22 are diagrams for describing processing policy information change registration processing according to the embodiment. FIGS. 20 to 22 illustrate a display example in a case in which an operation of touching an actual object 20 that belongs to a user X in order to change a target of belonging to a user Y and fixing the change has been performed in a situation in which the actual object 20 is placed on the display screen 10.

As represented with the reference numeral 251 in FIG. 20, the information processing system 100 may display a display object 30 indicating that the actual object 20 has already belonged to the user X and an operation of changing the target of belonging is not accepted. In this case, the information processing system 100 does not accept an operation of changing the target of belonging of the actual object 20 and does not register a change in processing policy information. Such a criterion for registration may also be referred to as first-win.

As represented with the reference numeral 252 in FIG. 20, the information processing system 100 registers a change in the target of belonging and displays a display object 30A for providing a notification that a processing right has been lost for the user X and a display object 30B for providing a notification that the processing right has been obtained for the user Y. Such a criterion for registration may also be referred to as after-win.

As represented with the reference numeral 253 in FIG. 21, the information processing system 100 may register a change in belonging information (addition in this case) and display a display object 30 indicating that targets of belonging of the actual object 20 are the user X and the user Y.

As represented with the reference numeral 254 in FIG. 21, the information processing system 100 may register an addition to a waiting list for acquiring the processing right and display a display object 30 indicating that the user X has the processing right for the actual object 20 and the user Y is in the waiting list. If the user X performs an operation of canceling the processing right, for example, in this case, the processing right is shifted to the user Y, and the actual object 20 belongs to the user Y.

As represented with the reference numeral 255 in FIG. 22, the information processing system 100 may display a display object 30A indicating that the actual object 20A, on which the user Y performs the operation of changing the target of belonging, has already belonged to the user X and the operation of changing the target of belonging is not accepted. In addition, the information processing system 100 may display a display object 30B for guiding an actual object 20B that is the same object as the actual object 20A. In this case, the information processing system 100 does not accept an operation of changing the target of belonging of the actual object 20A and does not register a change in processing policy information.

As represented with the reference numeral 256 in FIG. 22, the information processing system 100 may display a display object 30A indicating that the actual object 20A, the target of belonging of which the user Y desires to change, has already belonged to the user X and the operation of changing the target of belonging is not accepted. In addition, the information processing system 100 may display a display object 30B for guiding an actual object 20B that is similar to the actual object 20A. In this case, the information processing system 100 does not accept an operation of changing the target of belonging of the actual object 20A and does not register a change in processing policy information.

<4.5. Processing Result Presenting Processing>

In a case in which a series of user operations have been fixed, the information processing system 100 displays display objects indicating a result of processing. For example, the information processing system 100 displays display objects on the basis of processing policy information and/or body information of all the actual objects located on the display screen.

Hereinafter, an example of processing result presenting processing will be described with reference to FIGS. 23 and 24. The information processing system 100 executes processing described below alone or in combination.

Figure 23:
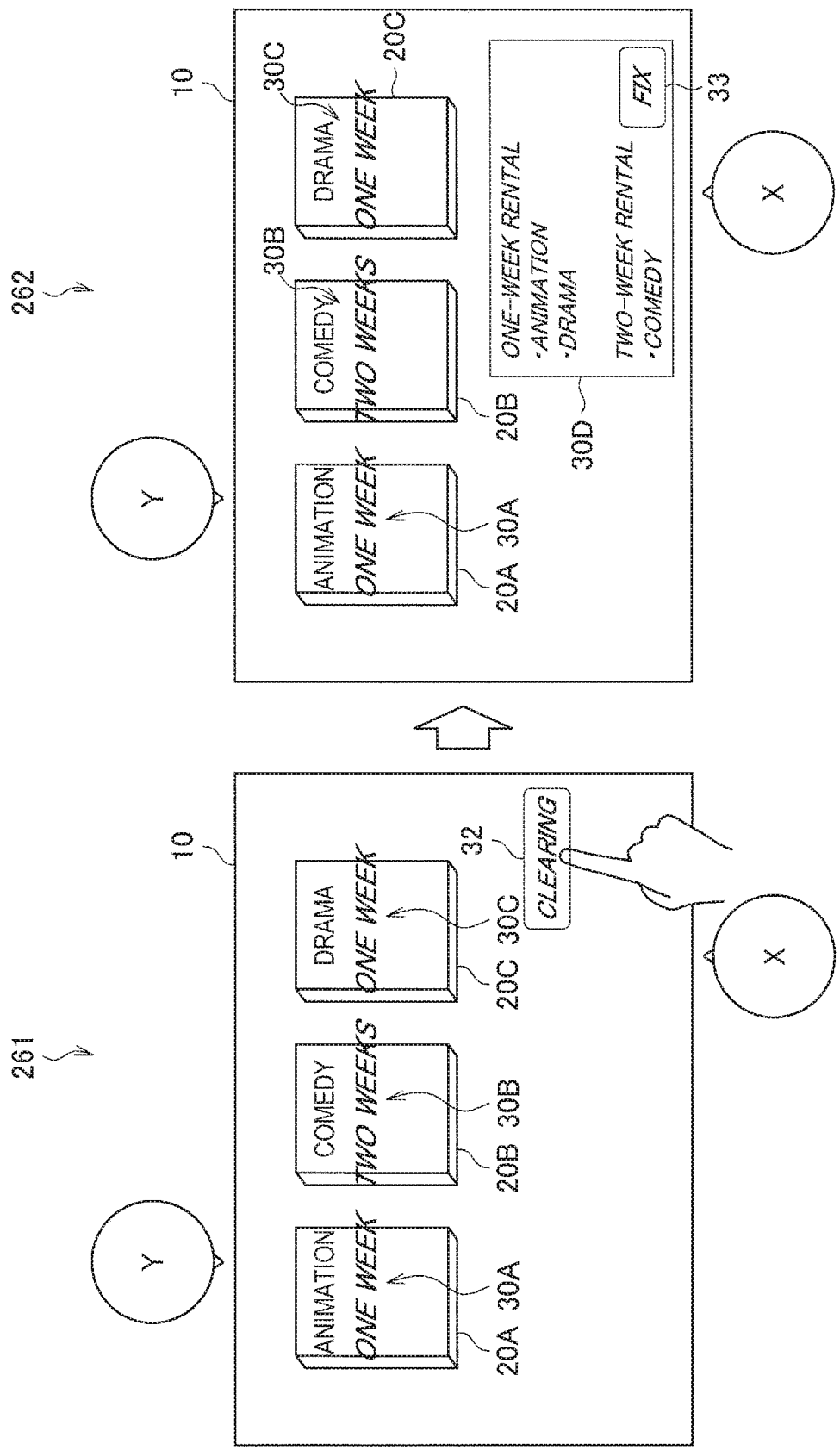
FIG. 23 is a diagram for describing processing result presenting processing according to the embodiment.

FIG. 23 is a diagram for describing processing result presenting processing according to the embodiment. As represented with the reference numeral 261 in FIG. 23, for example, actual objects 20A, 20B, and 20C are placed on the display screen 10. For the actual object 20A, information that the target of belonging is the user X and one-week rental is scheduled is registered as processing policy information, and a display object 30A indicating that the term of rental is one week is displayed. For the actual object 20B, information that the target of belonging is the user X and two-week rental is scheduled is registered as processing policy information, and a display object 30B indicating that the term of rental is two weeks is displayed. For the actual object 20C, information that the target of belonging is the user X and one-week rental is scheduled is registered as processing policy information, and a display object 30C indicating that the term of rental is one week is displayed. If the user X touches a clearing button 32 that is a type of a display object, the information processing system 100 recognizes that first processing policy information fixing operation has been performed and displays a display object 30D indicating a result of the processing as represented with the reference numeral 262. At that time, the information processing system 100 may estimate the position of the user X on the basis of the position of the root of the user's hand with which the clearing button 32 has been touched and display the display object 30D near the user's hand such that the user X can easily view and check the display object 30D. Also, the information processing system 100 may recognize the position of the actual object on the display screen 10 and display the display object 30D on a surface that is as flat as possible. If the user X touches a fixing button 33 that is a type of a display object, the information processing system 100 recognizes that second processing policy information fixing operation has been performed and displays a display object indicating rental fee payment information, for example. Thereafter, the user X can pay the rental fee and bring each actual object 20 home.

Figure 24:
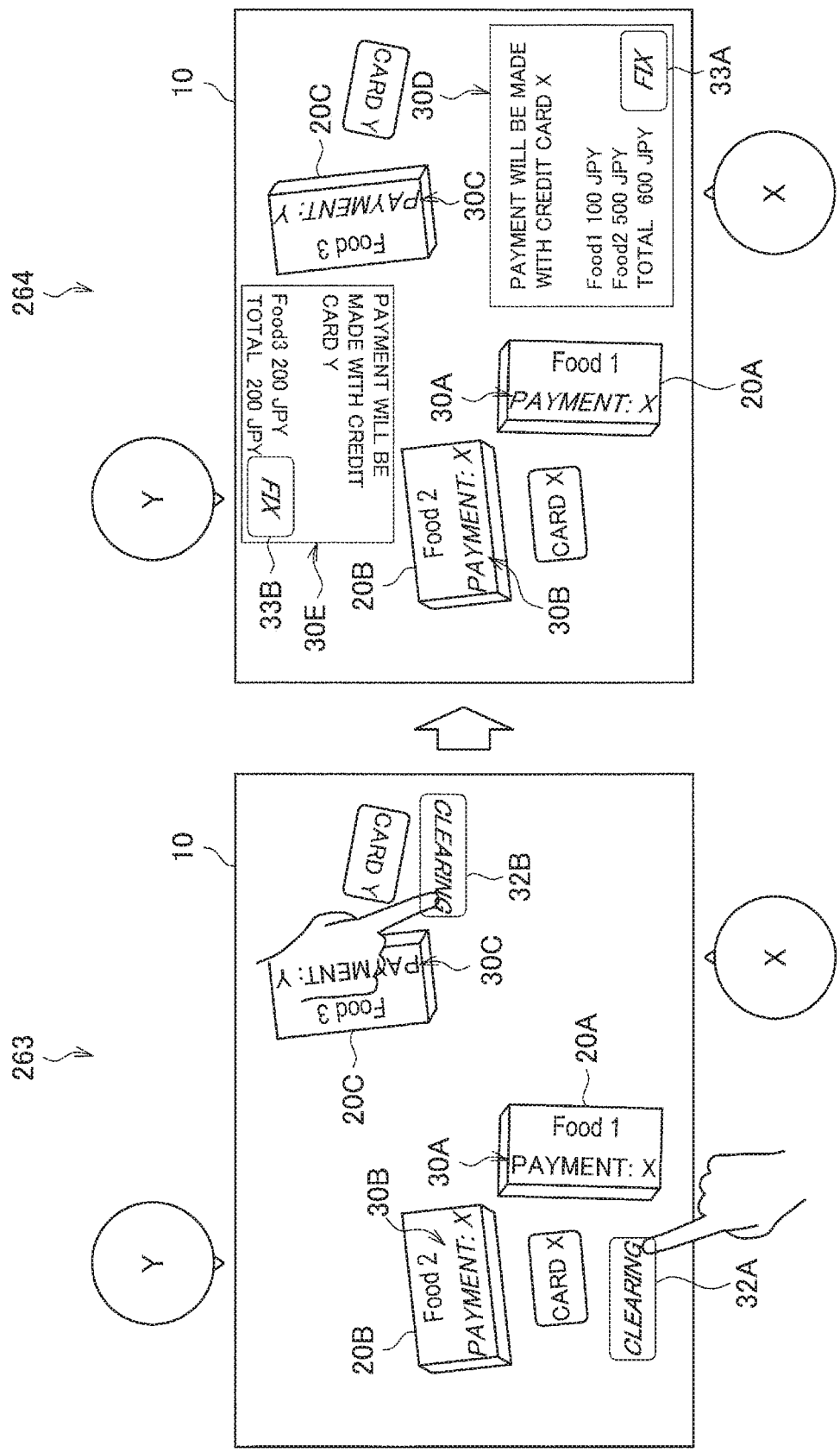
FIG. 24 is a diagram for describing processing result presenting processing according to the embodiment.

FIG. 24 is a diagram for describing processing result presenting processing according to the embodiment. As represented with the reference numeral 263 in FIG. 24, for example, actual objects 20A, 20B, and 20C are placed on the display screen 10. For the actual object 20A, information that the target of belonging is a credit card X (that is, the user X) and purchase is scheduled is registered as processing policy information, and a display object 30A indicating that the payment is performed with the credit card X is displayed. For the actual object 20B, information that the target of belonging is the credit card X (that is, the user X) and the purchase is scheduled is registered as the processing policy information, and a display object 30B indicating that the payment will be made with the credit card X is displayed. For the actual object 20A, information that the target of belonging is a credit card Y (that is, the user Y) and purchase is scheduled is registered as the processing policy information, and a display object 30C indicating that the payment will be made with the credit card Y is displayed. If the user X touches a displayed clearing button 32A, the information processing system 100 recognizes that a first processing policy information fixing operation has been performed and displays a display object 30D including each of the prices and a total price of the actual objects 20A and 20B, the target of belonging of which is the user X, near the hand of the user X as represented with the reference numeral 264. Also, if the user Y touches a displayed clearing button 32B, the information processing system 100 recognizes that a first processing policy information fixing operation has been performed and displays a display object 30E including a price and a total price of the actual object 20C, the target of belonging of which is the user Y, near the hand of the user Y as represented with the reference numeral 264. At that time, the information processing system 100 may display a display object indicating a result of the processing in a flat plane with a sufficient area near the credit card in the display screen in an orientation in accordance with the position of the user estimated on the basis of the position of the root of the hand with which the clearing button 32 has been touched. If the user X touches a fixing button 33A, the information processing system 100 recognizes that a second processing policy information fixing operation has been performed and displays a display object indicating payment information, for example. Thereafter, the user X can pay the total price and bring the actual objects 20A and 20B home. Similarly, if the user Y touches the fixing button 33B, the information processing system 100 recognizes a second processing policy information fixing operation has been performed and displays a display object indicating payment information, for example. Thereafter, the user Y can pay the TOTAL PRICE and bring THE actual object 20C home.

<<5. Specific Examples>>

Hereinafter, application examples of the information processing system 100 according to the embodiment will be specifically described.

<5.1. First Specific Example>

This specific example is an exemplary case in which the information processing system 100 is applied to a self-register in a supermarket and a plurality of persons perform clearing processing.

Here, it is assumed that the information processing system 100 performs each processing as follows. In the processing policy information generation processing, the information processing system 100 generates processing policy information indicating that a user who has placed an actual object on the display screen 10 is regarded as a target of belonging. In the processing policy information changing operation detection processing, the information processing system 100 detects tapping with one of the user's fingers as an operation of adding or changing the target of belonging, detects tapping with two of the user's fingers as an operation for addition to a waiting list, detects touching with the user's palm as an operation of requesting recommendation of another product in the same category, and detects repeating of the same operation again as a canceling operation. In the processing result presenting processing, the information processing system 100 displays a display object indicating a result of the processing near the user's hand.

Hereinafter, a state of clearing processing will be described in a time series manner with reference to FIGS. 25 to 38. FIGS. 25 to 38 are diagrams for describing the first specific example of the information processing system 100 according to the embodiment. Processing policy information finally registered in the processing policy information storage unit 150 in such clearing processing is illustrated in Table 2 below.

TABLE 2

Processing policy information when clearing processing ends

| Actual object | Processing policy information |
|---|---|
| Food 1 | Purchaser: A |
| Food 2 | Purchaser: B |
| Food 3 | Purchaser: Shared by A and B |
| Food 4 | Purchaser: B |
| Food 5 | Purchaser: None |
| Food 6 | Purchaser: A |

Figure 25:
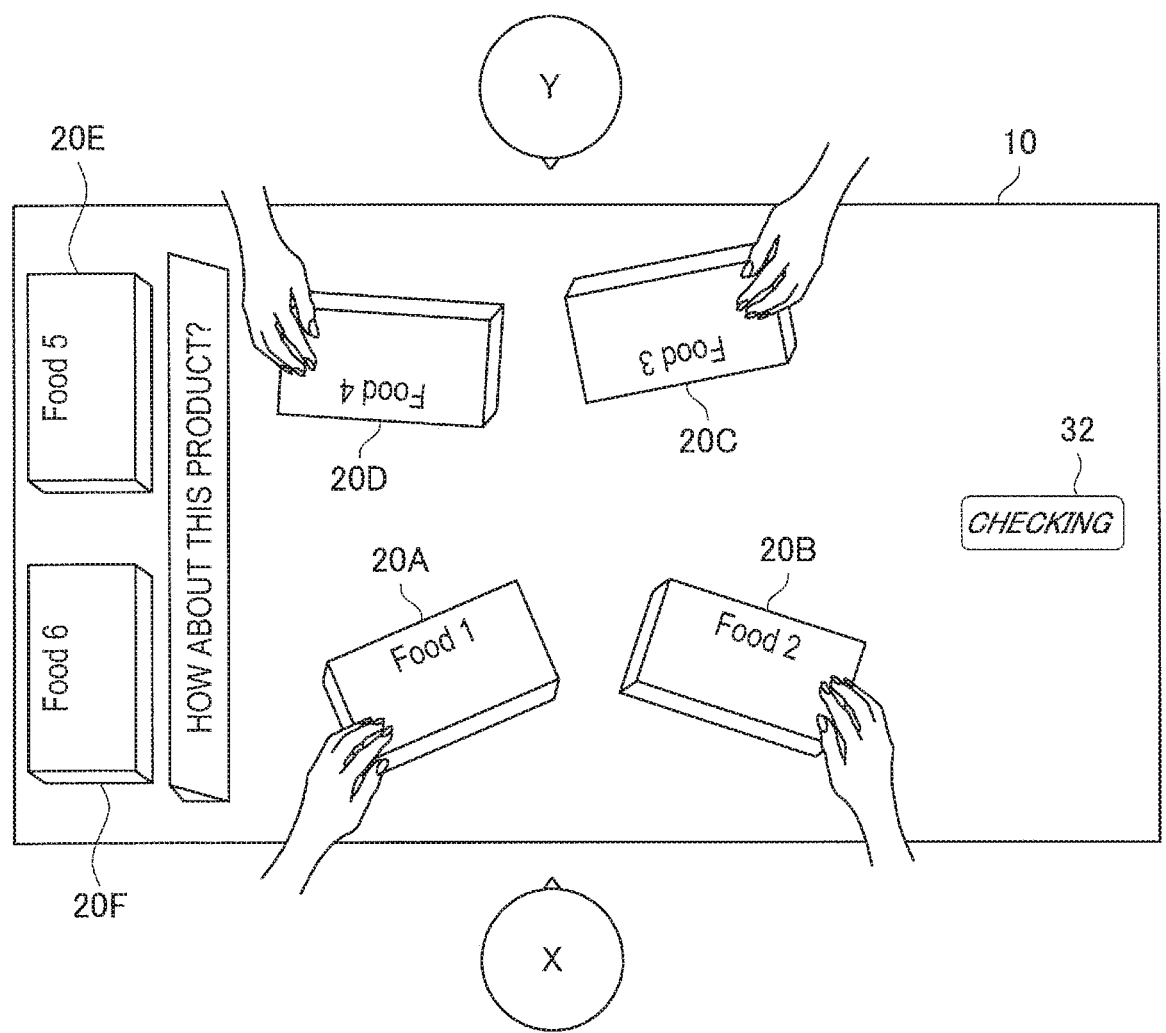
FIG. 25 is a diagram for describing a first specific example of the information processing system according to the embodiment.

As illustrated in FIG. 25, it is assumed that a user X has placed actual objects 20A and 20B on the display screen 10 and the user Y has placed actual objects 20C and 20D. In addition, actual objects 20E and 20F are placed in advance on the display screen 10 as products of recommendation. Note that all the actual objects 20A to 20F are products. Also, the information processing system 100 displays a checking button 32 for checking (that is, clearing).

Figure 26:
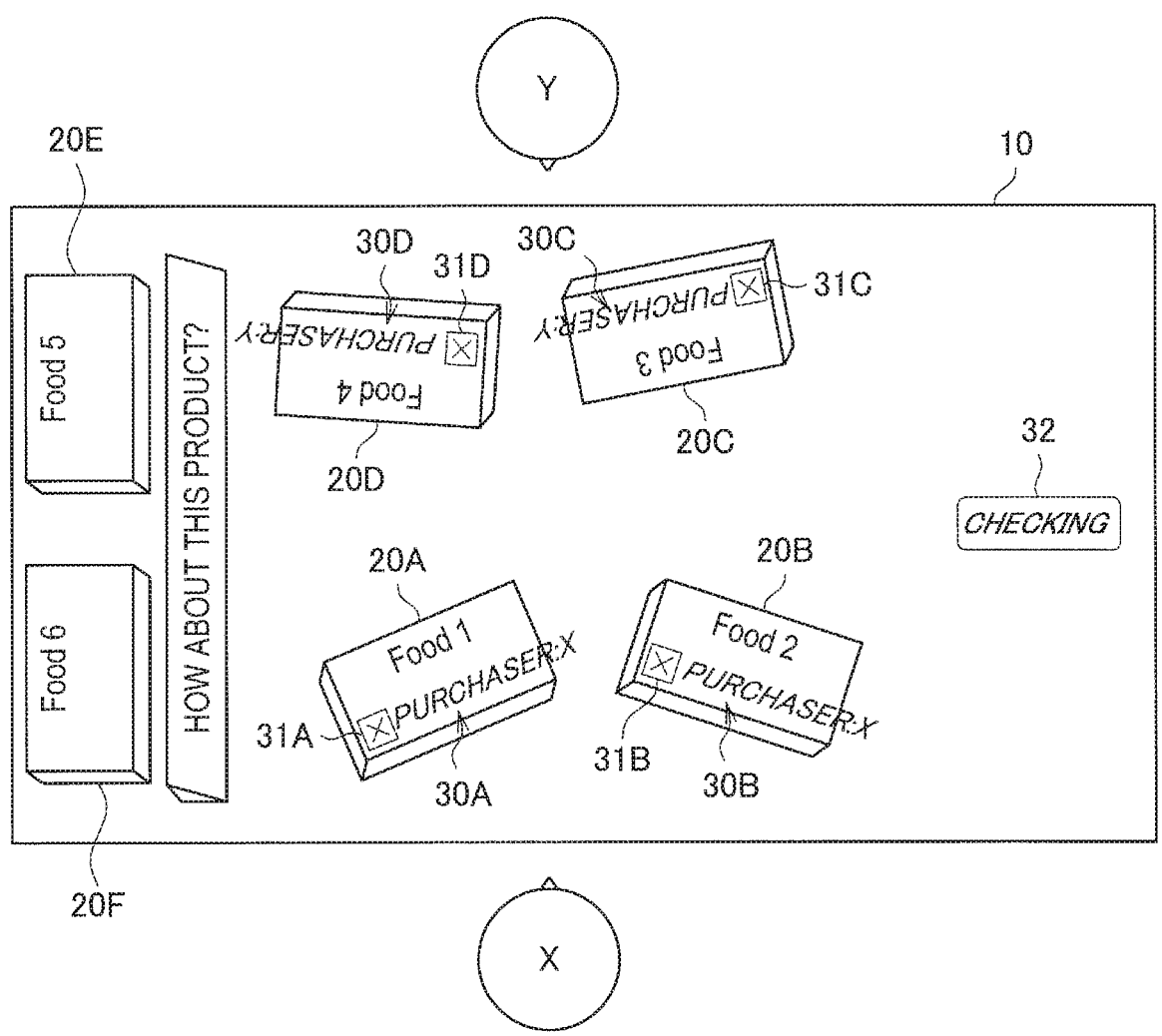
FIG. 26 is a diagram for describing a first specific example of the information processing system according to the embodiment.

Then, the information processing system 100 generates processing policy information indicating that the user who has placed the product 20 is regarded as a target of belonging (that is, a purchaser) in the processing policy information generation processing and presents the processing policy information in the processing policy information presenting processing. Specifically, the information processing system 100 generates processing policy information indicating that the target of belonging of the products 20A and 20B is the user X and displays display objects 30A and 30B indicating that the target of belonging is the user X as illustrated in FIG. 26. Also, the information processing system 100 generates processing policy information indicating that the target of belonging of the products 20B and 20C is the user Y and displays display objects 30C and 30D indicating that the target of belonging is the user Y. In addition, the information processing system 100 also displays cancel buttons 31A to 31D for deleting the targets of belonging in relation to the products 20A to 20D with the targets of belonging.

Figure 27:
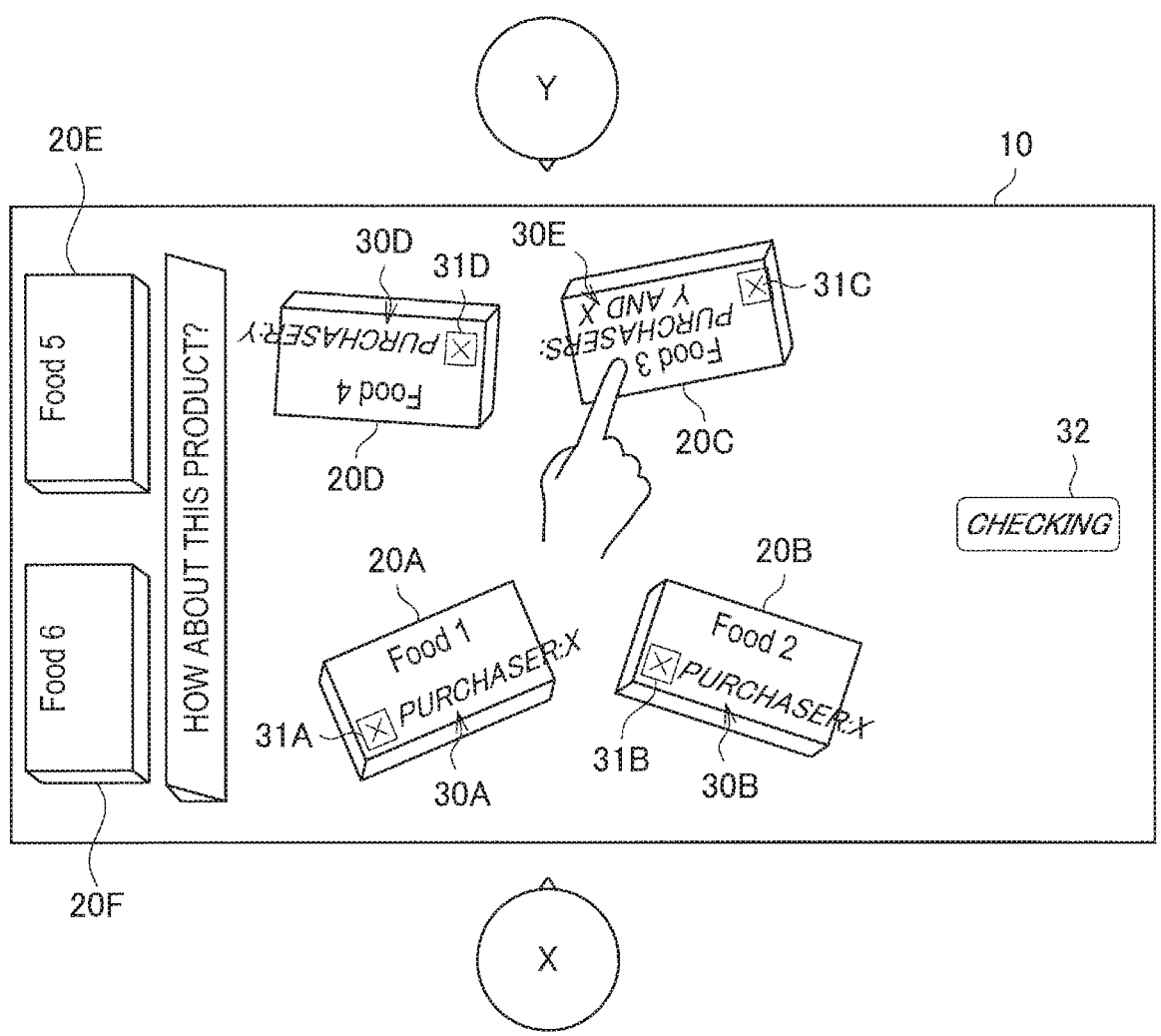
FIG. 27 is a diagram for describing a first specific example of the information processing system according to the embodiment.

Next, the user X taps the product 20C with one of the user's fingers as illustrated in FIG. 27. Then, the information processing system 100 adds the user X to the target of belonging of the product 20C and displays a display object 30E indicating that the targets of belonging of the product 20C are the user Y and the user X.

Figure 28:
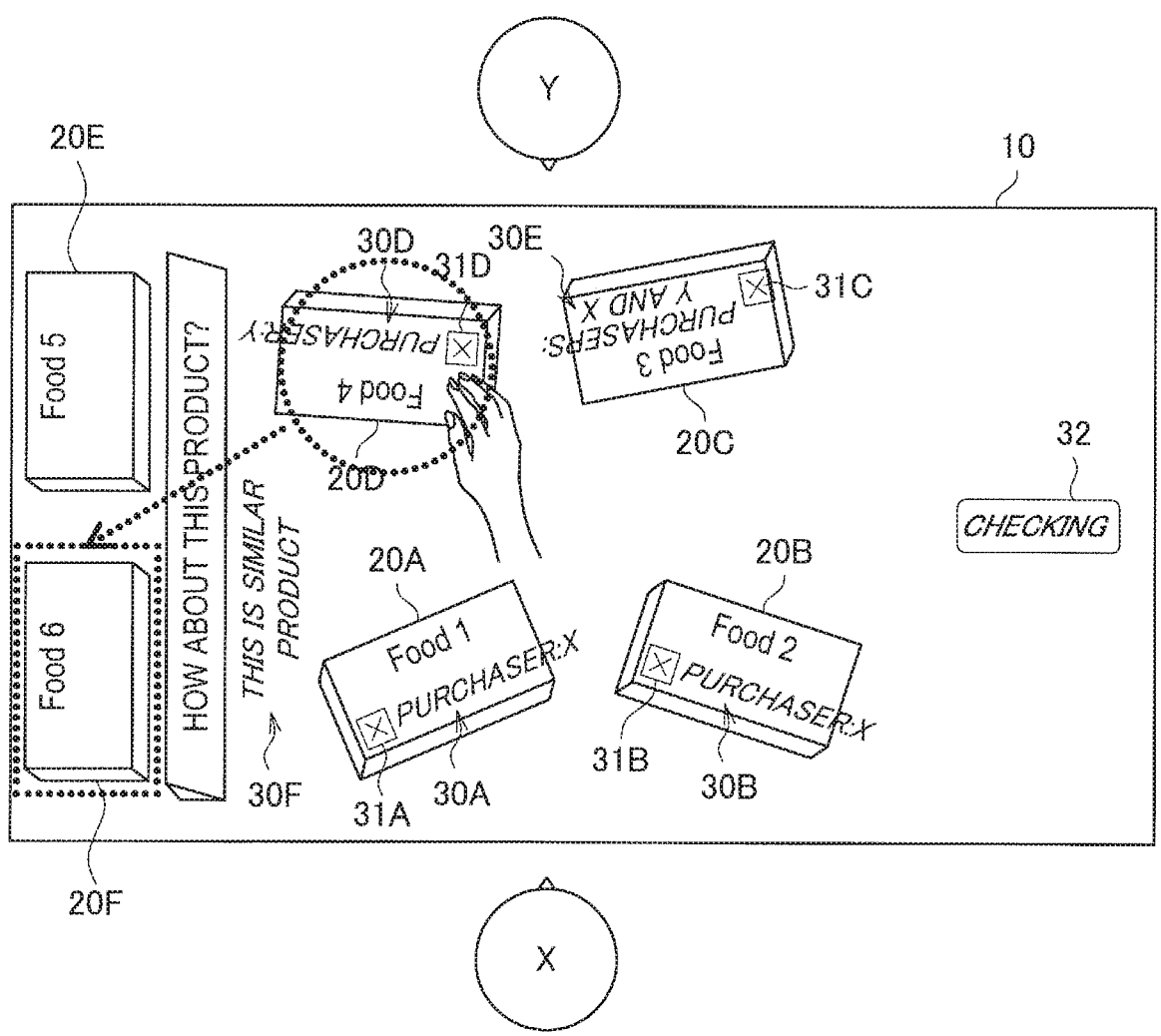
FIG. 28 is a diagram for describing a first specific example of the information processing system according to the embodiment.

Next, the user touches the product 20D with the user's palm as illustrated in FIG. 28. Then, the information processing system 100 displays a display object 30F for recommending a product 20F that is a similar product in the same category as that of the product 20C.

Figure 29:
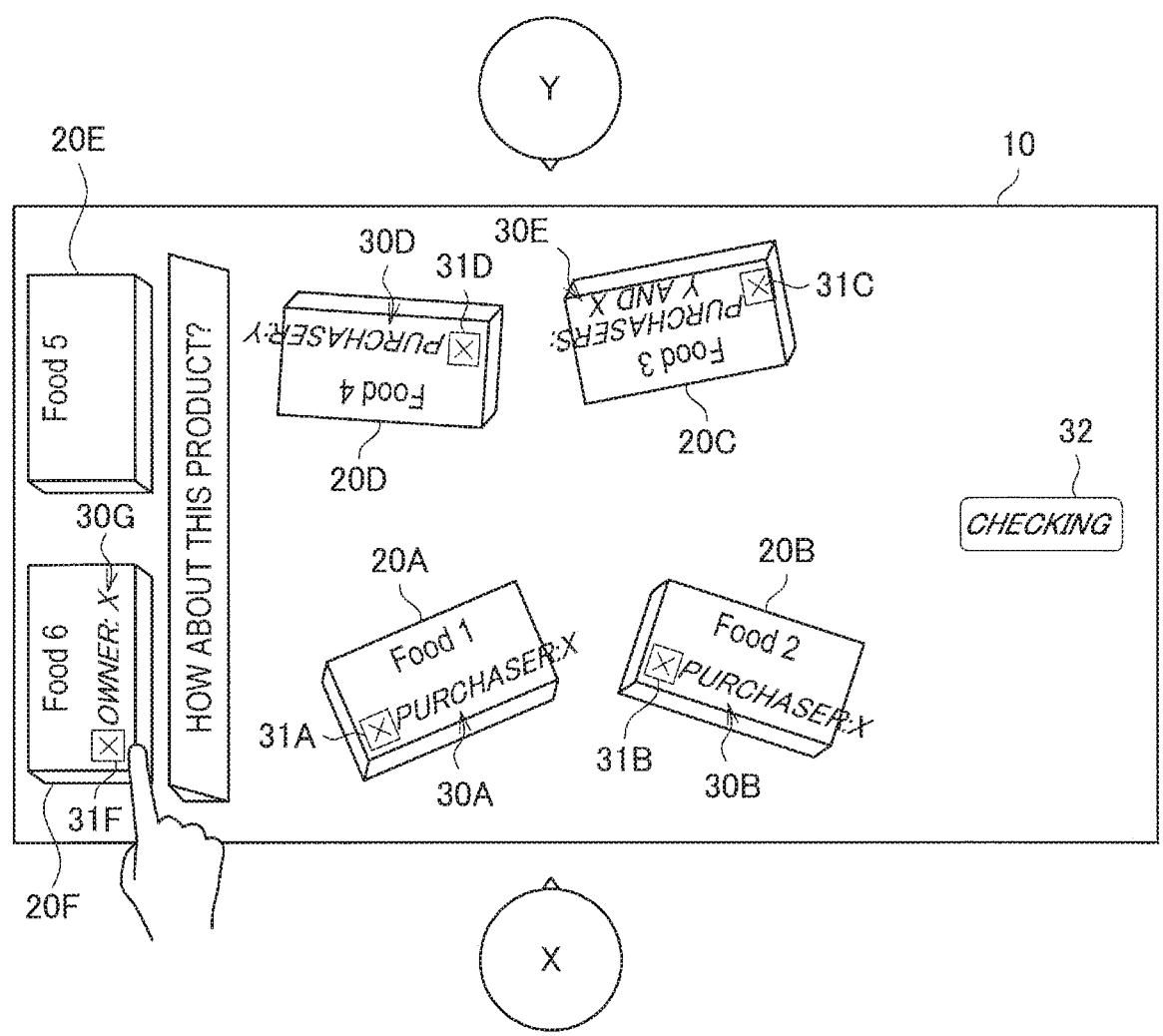
FIG. 29 is a diagram for describing a first specific example of the information processing system according to the embodiment.

Next, the user X taps the recommended product 20F with one of the user's fingers as illustrated in FIG. 29. Then, the information processing system 100 generates processing policy information indicating that the target of belonging of the product 20F is the user X and displays a display object 30G indicating that the target of belonging of the product 20F is the user X and a cancel button 31F.

Figure 30:
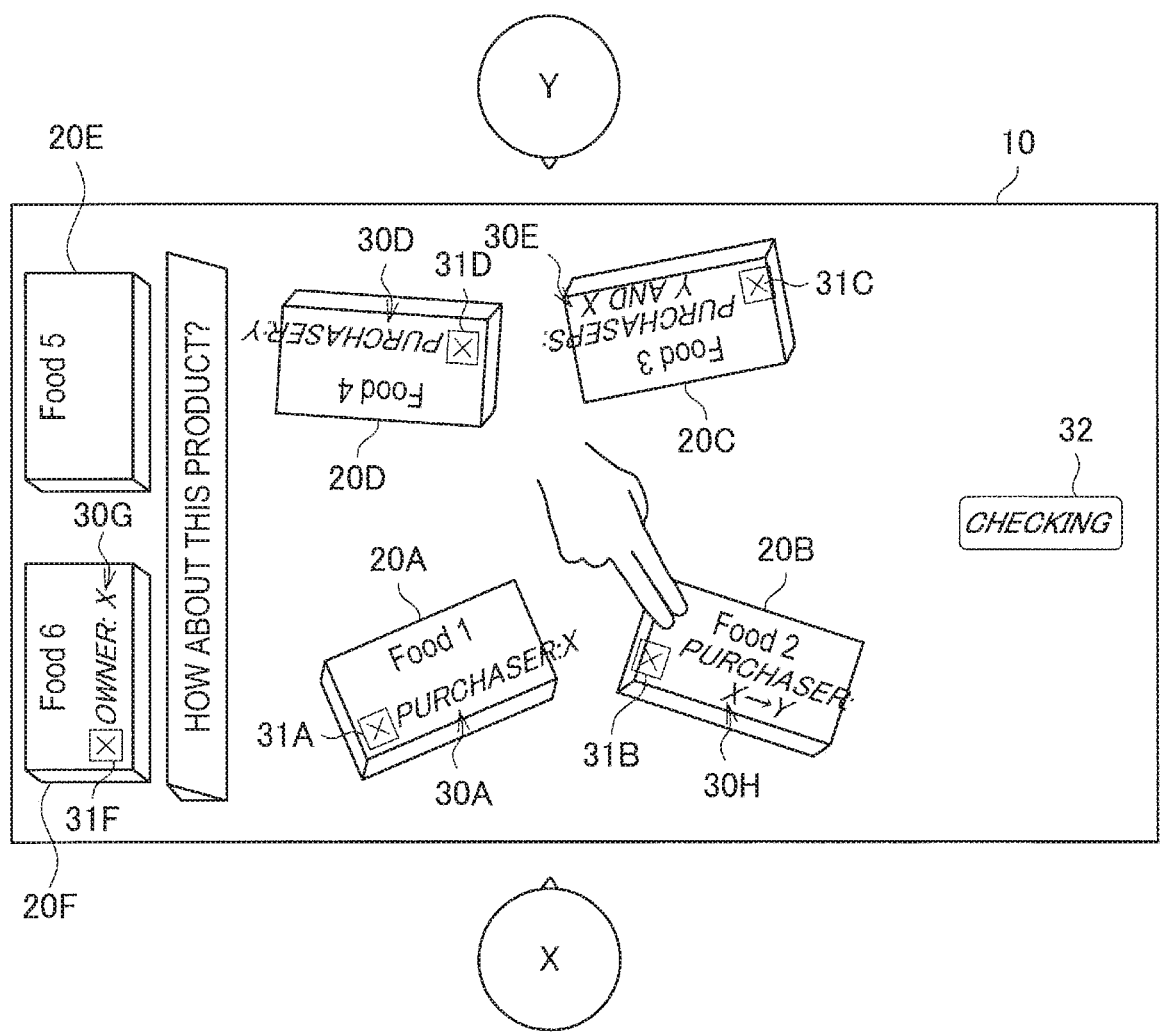
FIG. 30 is a diagram for describing a first specific example of the information processing system according to the embodiment.

Next, the user Y taps the product 20B that the user Y desires to get if the user X will not buy with two of the user's fingers as illustrated in FIG. 30. Then, the information processing system 100 adds the user Y to a waiting list for a processing right (that is, a purchasing right) for the product 20B and displays a display object 30H indicating that the right of purchasing the product 20F is owned by the user X and the user Y is in the waiting list.

Figure 31:
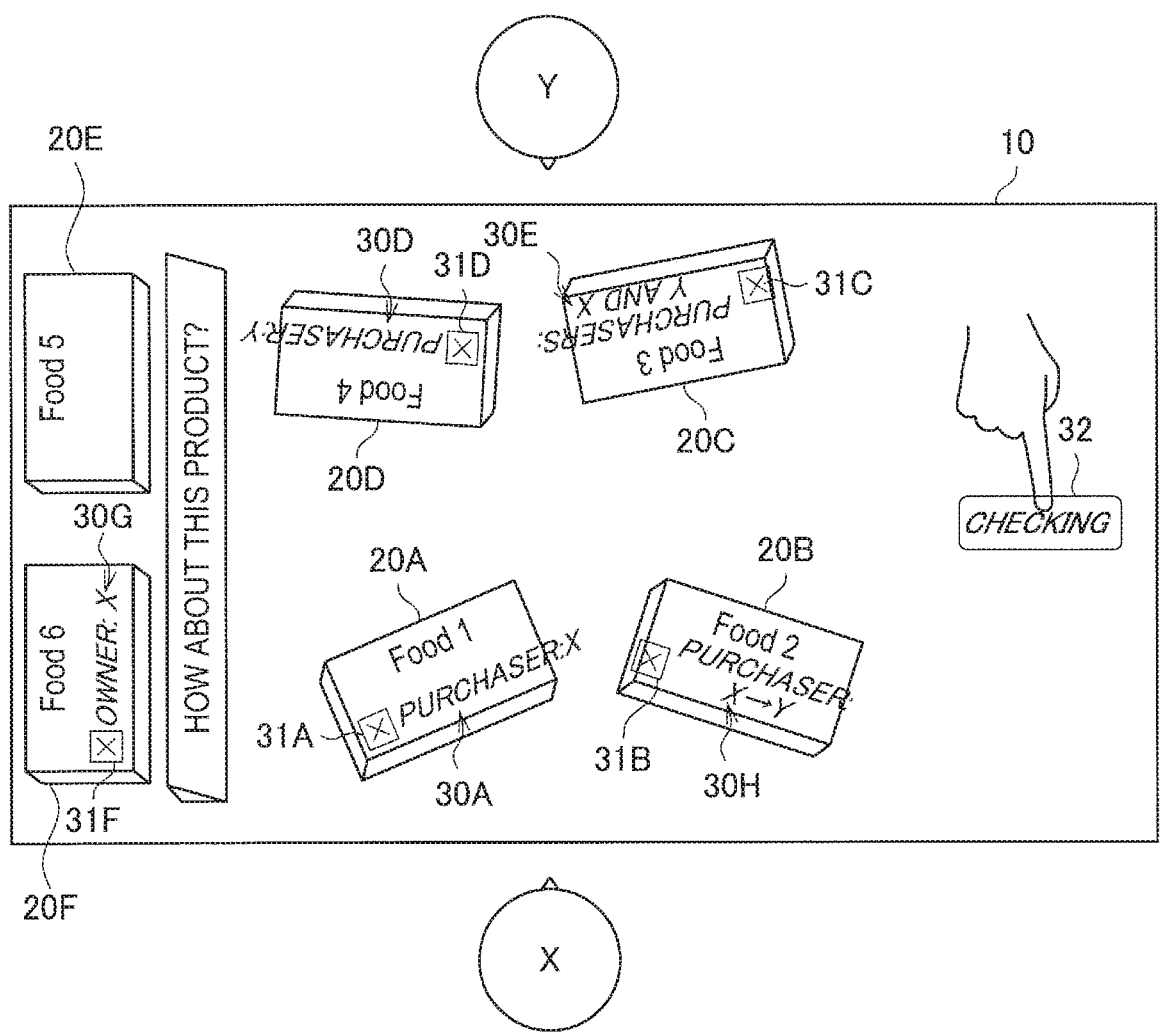
FIG. 31 is a diagram for describing a first specific example of the information processing system according to the embodiment.
Figure 32:
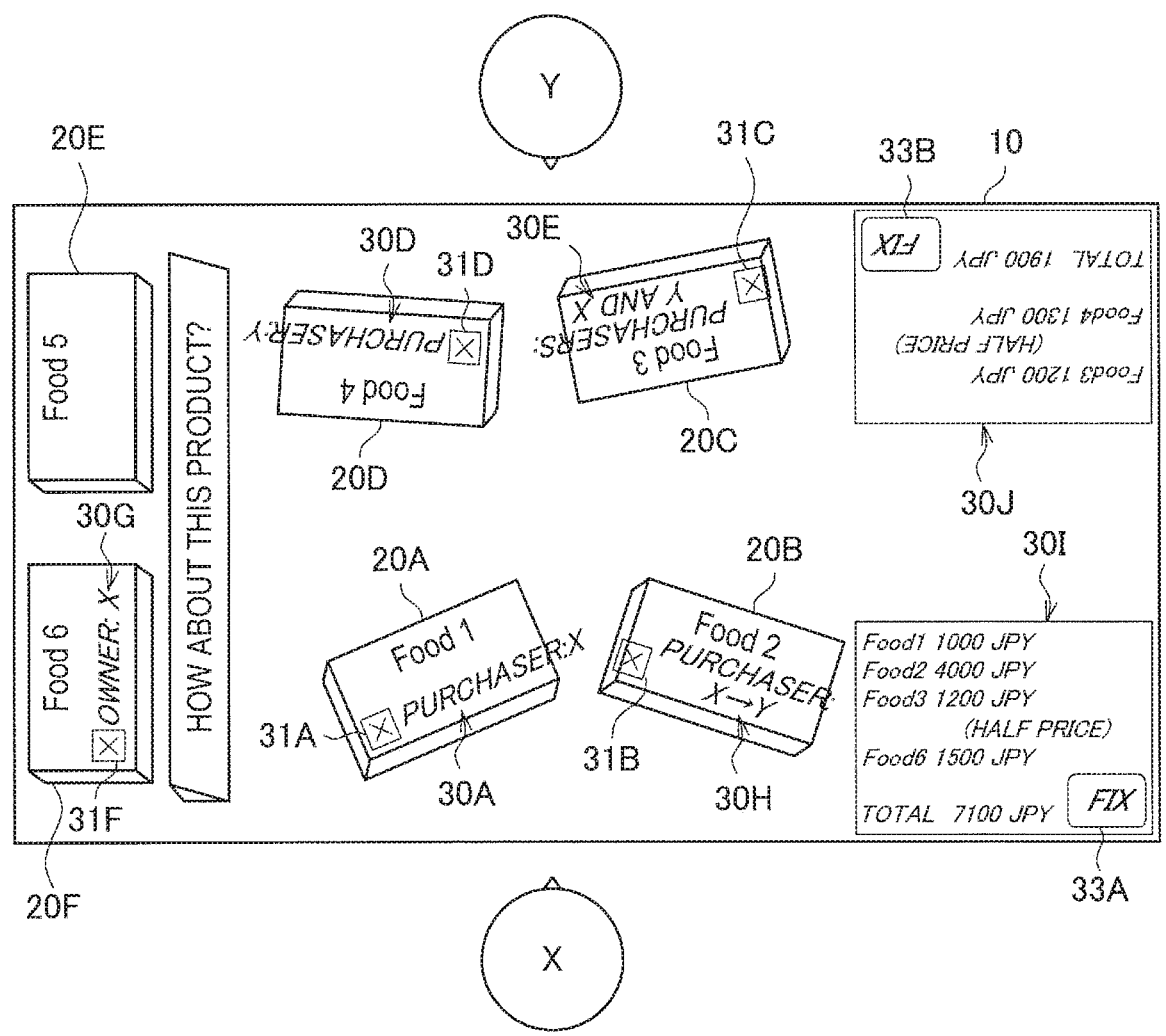
FIG. 32 is a diagram for describing a first specific example of the information processing system according to the embodiment.

Next, if the user Y taps the checking button 32 as illustrated in FIG. 31, the information processing system 100 recognizes that a first processing policy information fixing operation has been performed and displays display objects 30I and 30J indicating a result of processing near the hand of each user as illustrated in FIG. 32. Specifically, the information processing system 100 refers to processing policy information and body information and displays a display object 30I including each of prices and a total price of the products 20A, 20B, 20C, and 20F, the target of belonging of which is the user X, near the hand of the user X. In addition, the information processing system 100 refers to processing policy information and body information and displays a display object 30J including each of prices and a total price of the products 20C and 20D, the target of belonging of which is the user Y, near the hand of the user Y. Note that since the targets of belonging of the product 20C is both the user X and the user Y, and the product 20C will be joint-purchased, each user is claimed to pay a half price. Also, the information processing system 100 displays fixing buttons 33A and 33B for fixing the purchase.

Figure 33:
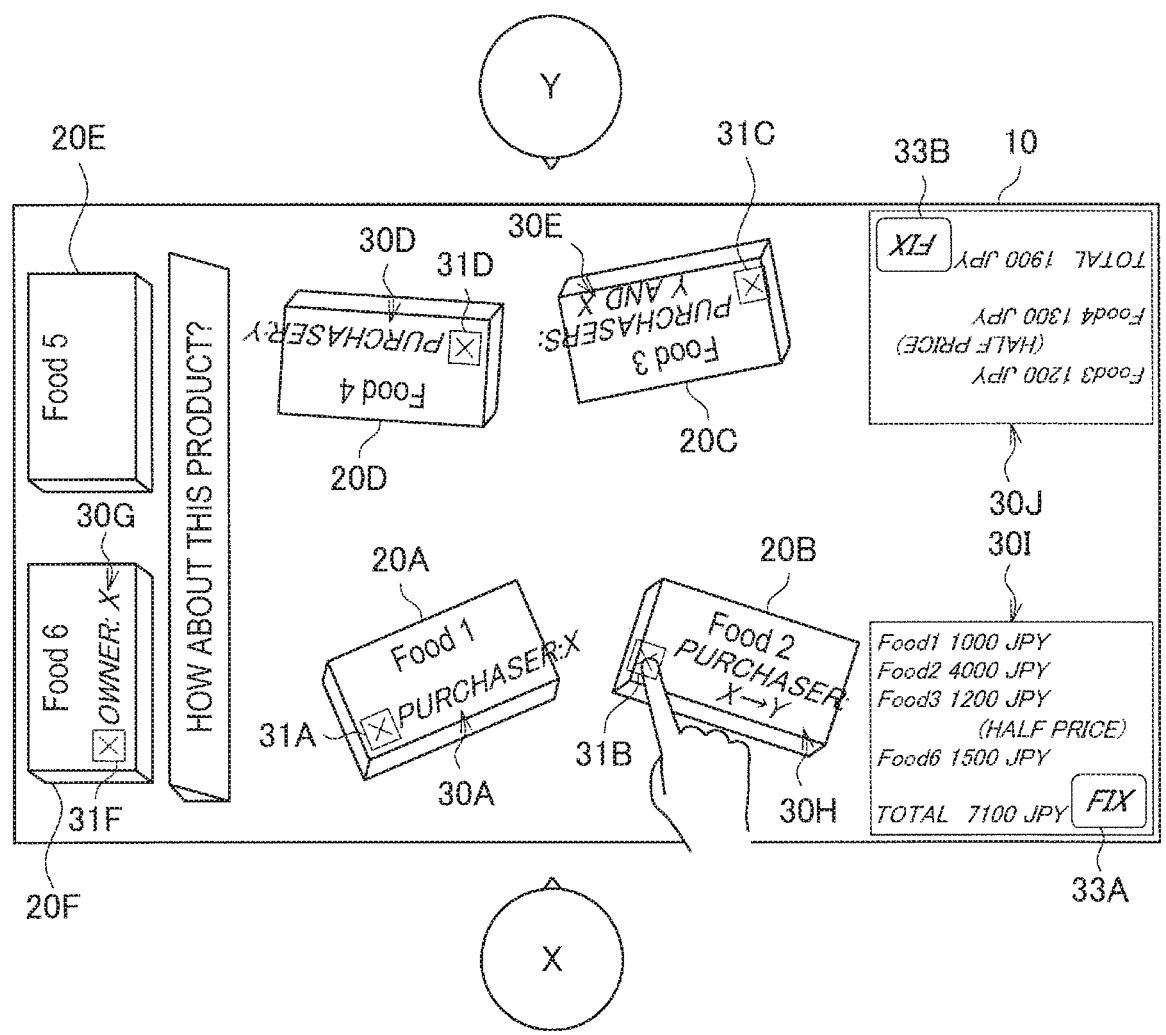
FIG. 33 is a diagram for describing a first specific example of the information processing system according to the embodiment.
Figure 34:
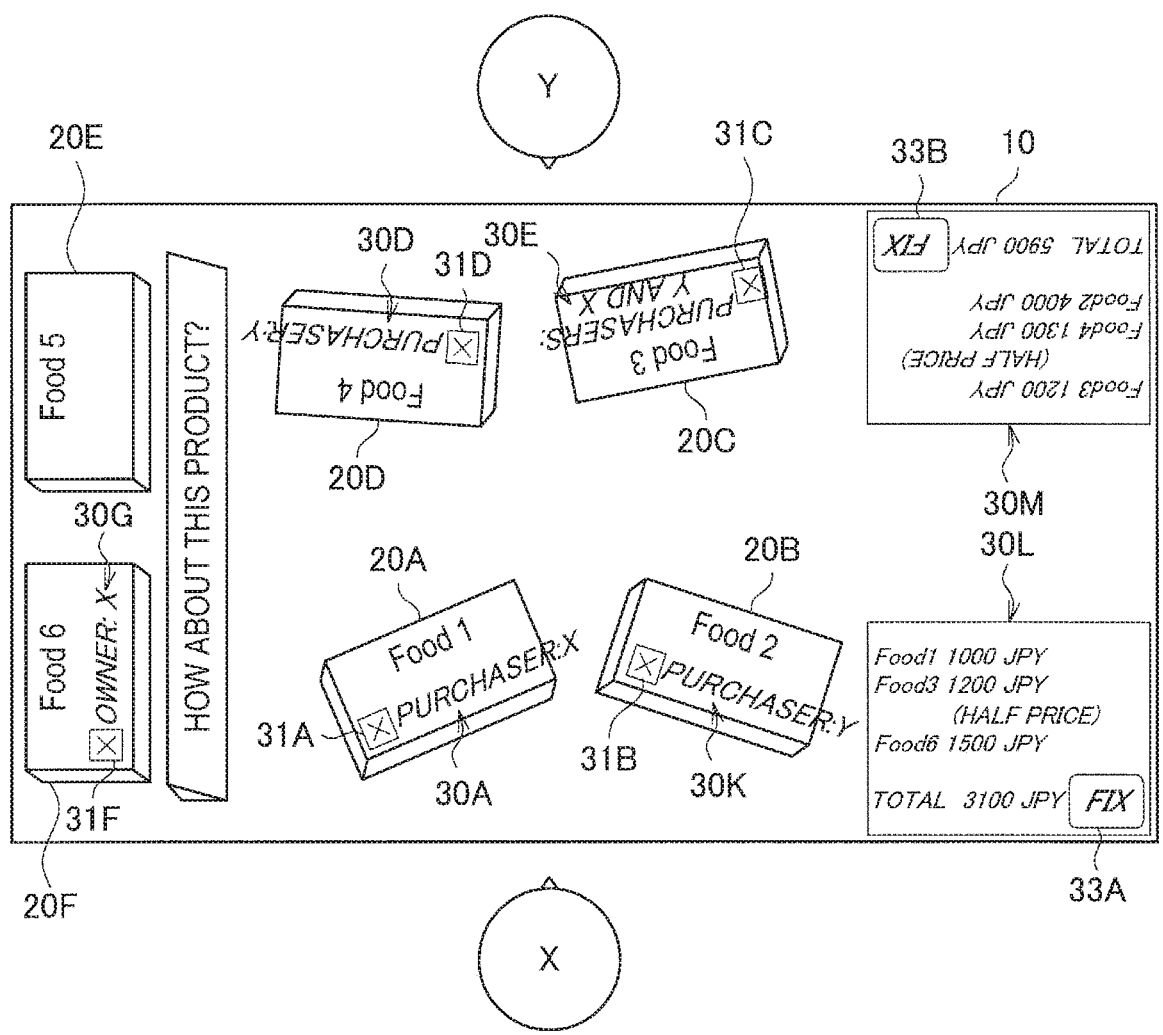
FIG. 34 is a diagram for describing a first specific example of the information processing system according to the embodiment.

Then, the user X taps the cancel button 31B for canceling the purchase of the product 20B as illustrated in FIG. 33. Then, the information processing system 100 upgrades the user Y in the waiting list to a purchaser, changes the target of belonging of the product 20B to the user Y, and displays a display object 30K indicating that the target of belonging of the product 20B is the user Y as illustrated in FIG. 34. Also, the information processing system 100 updates the display object 30I to a display object 30L and updates the display object 30J to a display object 30M with such a change in the target of belonging.

Figure 35:
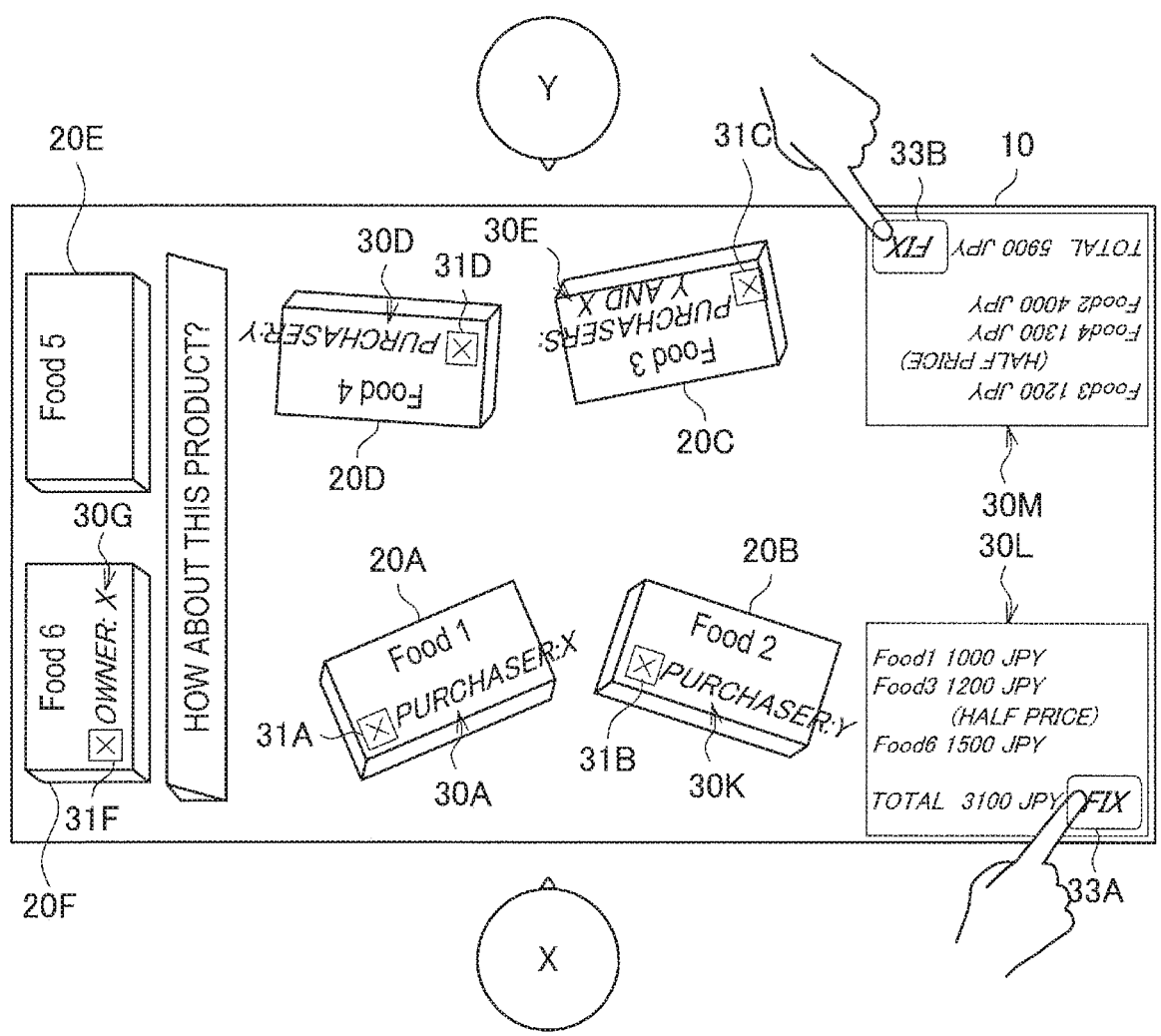
FIG. 35 is a diagram for describing a first specific example of the information processing system according to the embodiment.
Figure 36:
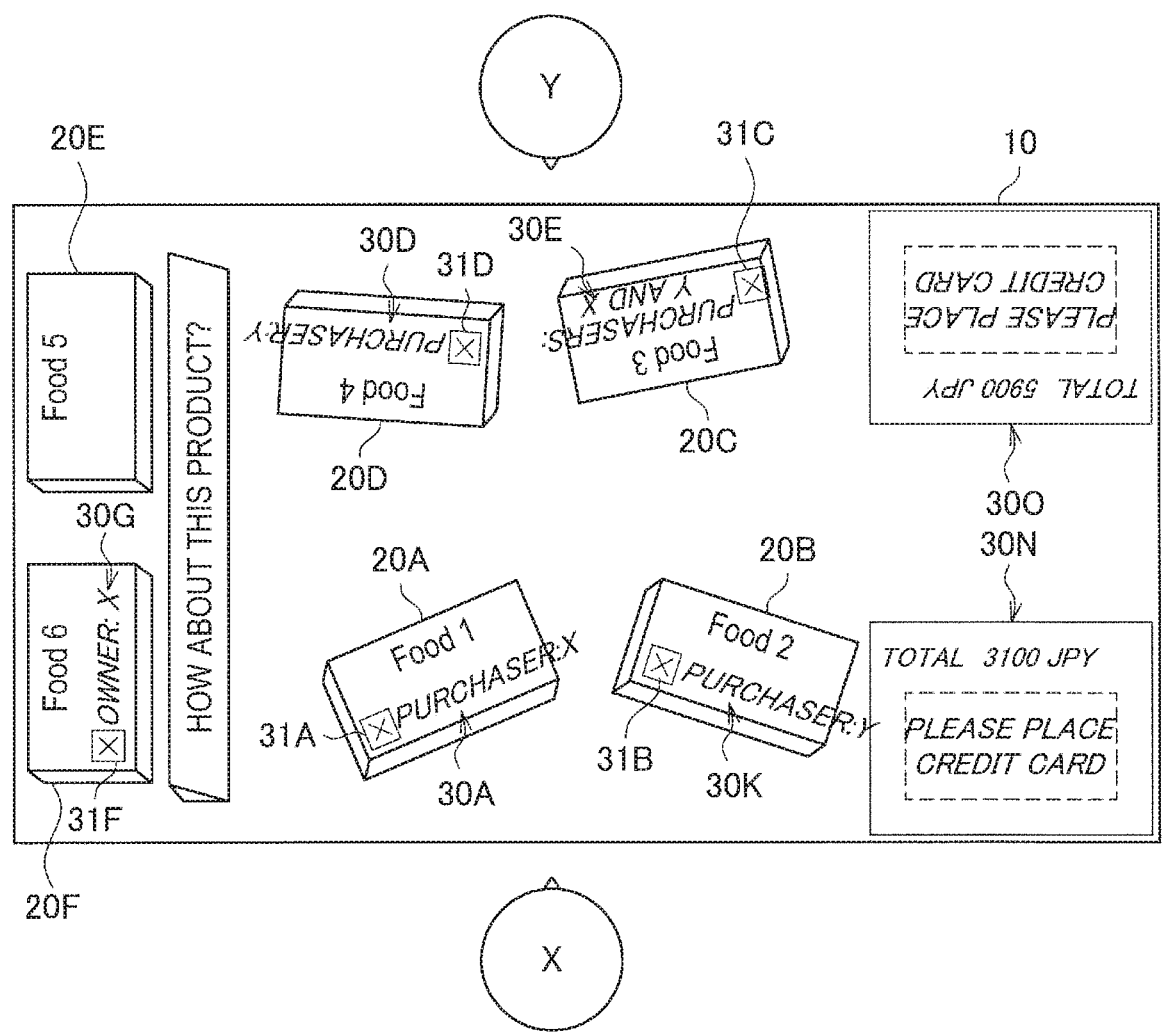
FIG. 36 is a diagram for describing a first specific example of the information processing system according to the embodiment.

Next, the user X taps the fixing button 33A, and the user Y taps the fixing button 33B as illustrated in FIG. 35. Then, the information processing system 100 recognizes that a second processing policy information fixing operation has been performed and displays display objects 30N and 30O for providing an instruction for placing credit cards near the hand of each user as illustrated in FIG. 36.

Figure 37:
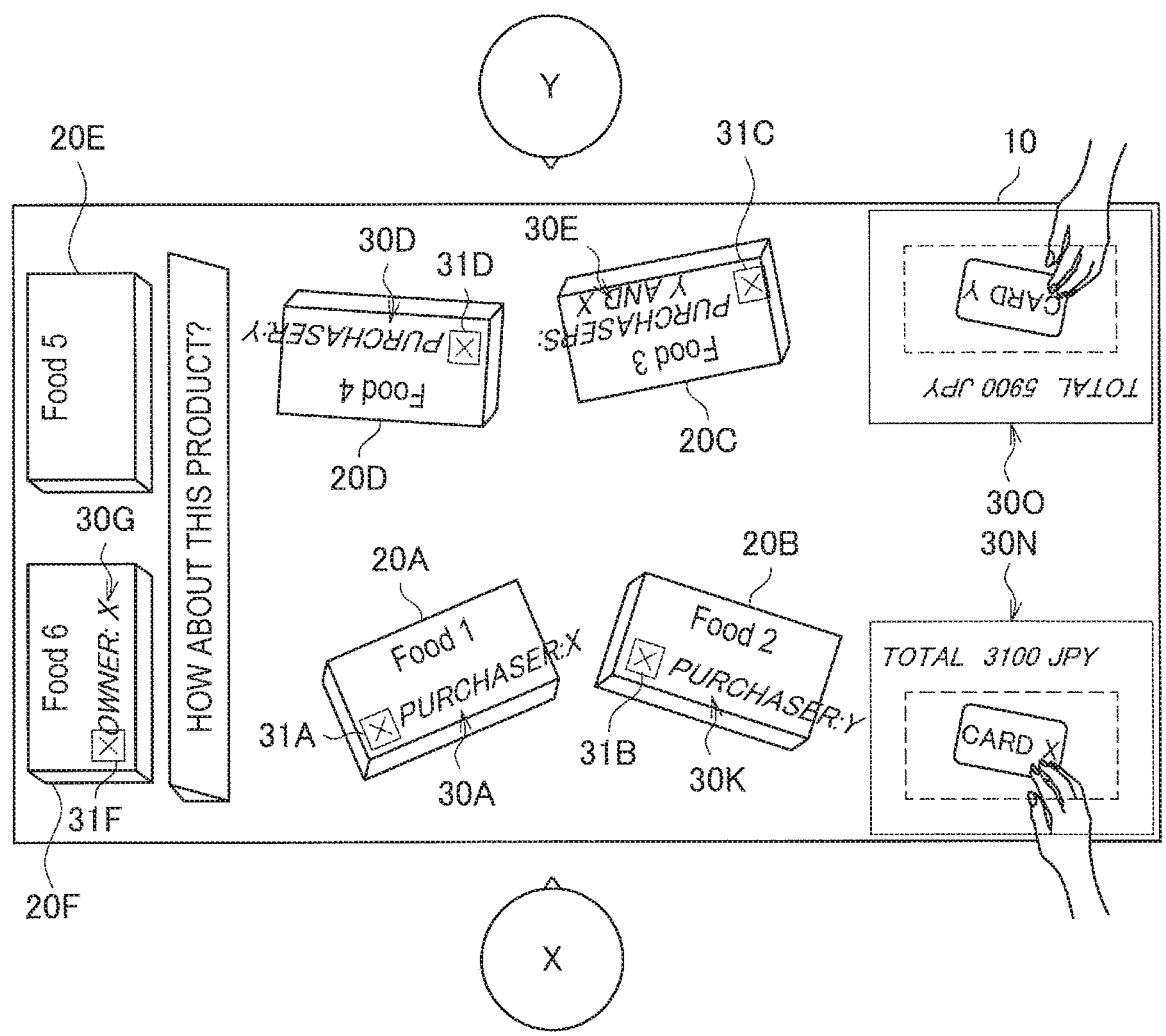
FIG. 37 is a diagram for describing a first specific example of the information processing system according to the embodiment.

Then, the user X places the credit card X at a designated position in the display object 30N, and the user Y places the credit card Y at a designated position in the display object 30O as illustrated in FIG. 37. Then, the information processing system 100 performs clearance processing related to the products 20 that belongs to each user.

Figure 38:
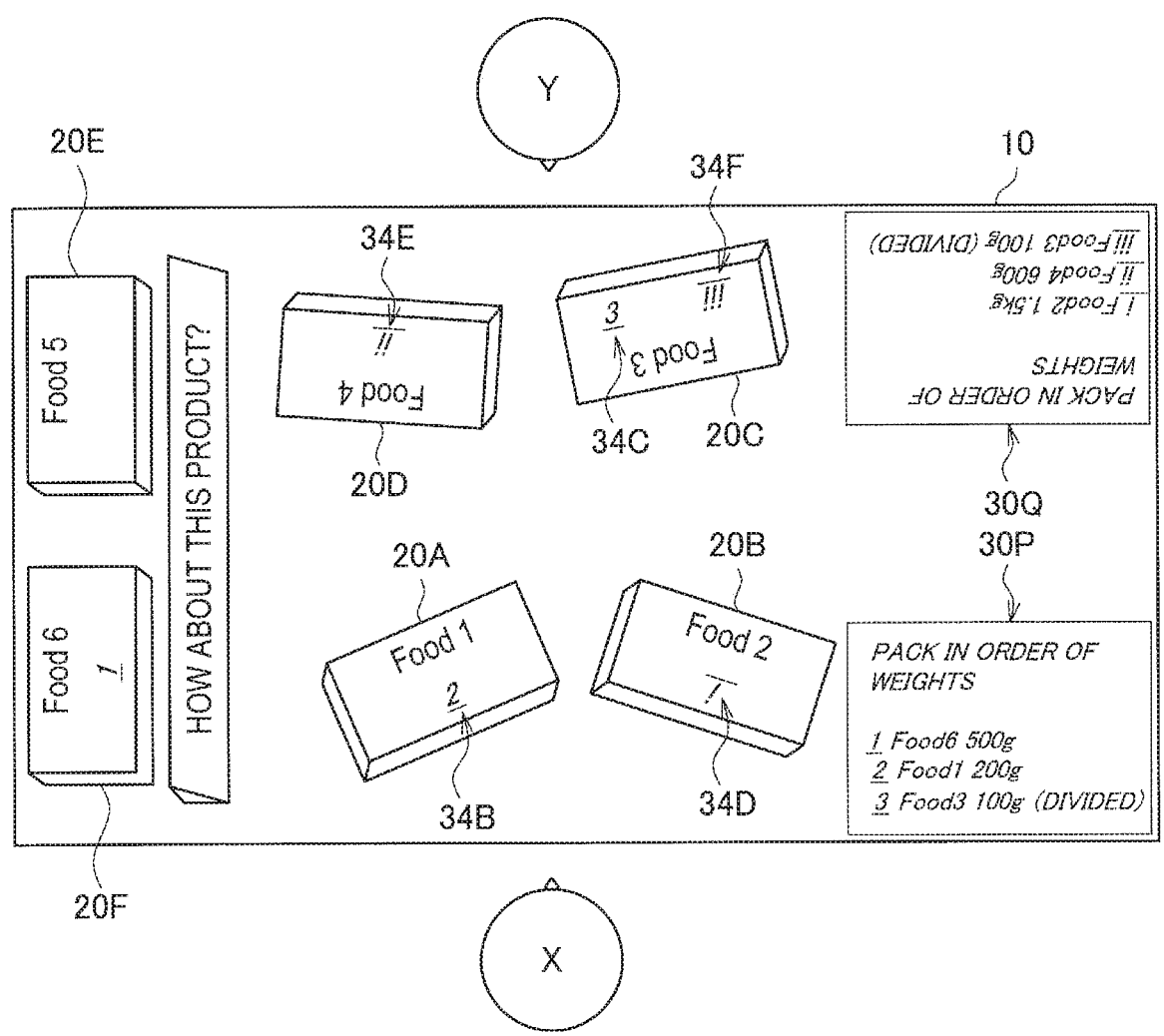
FIG. 38 is a diagram for describing a first specific example of the information processing system according to the embodiment.

Thereafter, the information processing system 100 refers to body information and displays display objects 30P, 30Q, and 34A to 34F indicating an order of packing on the basis of the weight of each product 20 with reference to the body information as illustrated in FIG. 38. Specifically, the information processing system 100 displays a display object 30P comprehensively indicating the packing order and display objects 34A to 34C indicating the first to third packing orders for the individual products 20 for the user X. In addition, the information processing system 100 displays a display object 30Q comprehensively indicating the packing order and display objects 34D and 34F indicating the first to third packing orders for the individual products 20 for the user Y.

<5.2. Second Specific Example>

This specific example is an exemplary case in which the information processing system 100 is applied to a book self-lending service in a library and a plurality of persons perform lending processing. Note that the information processing system 100 can similarly be applied to a rental shop for CDs, DVDs, or the like rather than the library.

Here, it is assumed that the information processing system 100 performs each processing as follows. In the processing policy information generation processing, the information processing system 100 generates processing policy information indicating that there is no target of belonging at the time at which the actual object is placed on the display screen 10. In the processing policy information changing operation detection processing, the information processing system 100 detects an operation of tracing an actual object with one of the user's fingers as an operation of adding or changing the destination of belonging or an operation of addition to a waiting list, detects an operation of tracing an actual object with two of the user's fingers as an operation of requesting searching for the same book, and detects hovering as an operation of requesting display of an operation guidance or a message in accordance with a situation of the book. In the processing result presenting processing, the information processing system 100 displays a display object indicating a result of the processing near the user's hand.

Hereinafter, a state of lending processing will be described in a time series manner with reference to FIGS. 39 to 50. FIGS. 39 to 50 are diagrams illustrating a second specific example of the information processing system 100 according to the embodiment. Processing policy information finally registered in the processing policy information storage unit 150 in such lending processing is illustrated in Table 3 below.

TABLE 3

Processing policy information when lending processing ends

| Actual object | Processing policy information |
| --- | --- |
| Book 1 | Borrowed by A |
| Book 2 | Borrowed by A |
| Book 3 | Borrowed by B |
| Book 4 (first book) | Borrowed by B |
| Book 4 (second book) | Borrowed by A |
| Book 5 | Not borrowed |
| Book 6 | Not borrowed |

Figure 39:
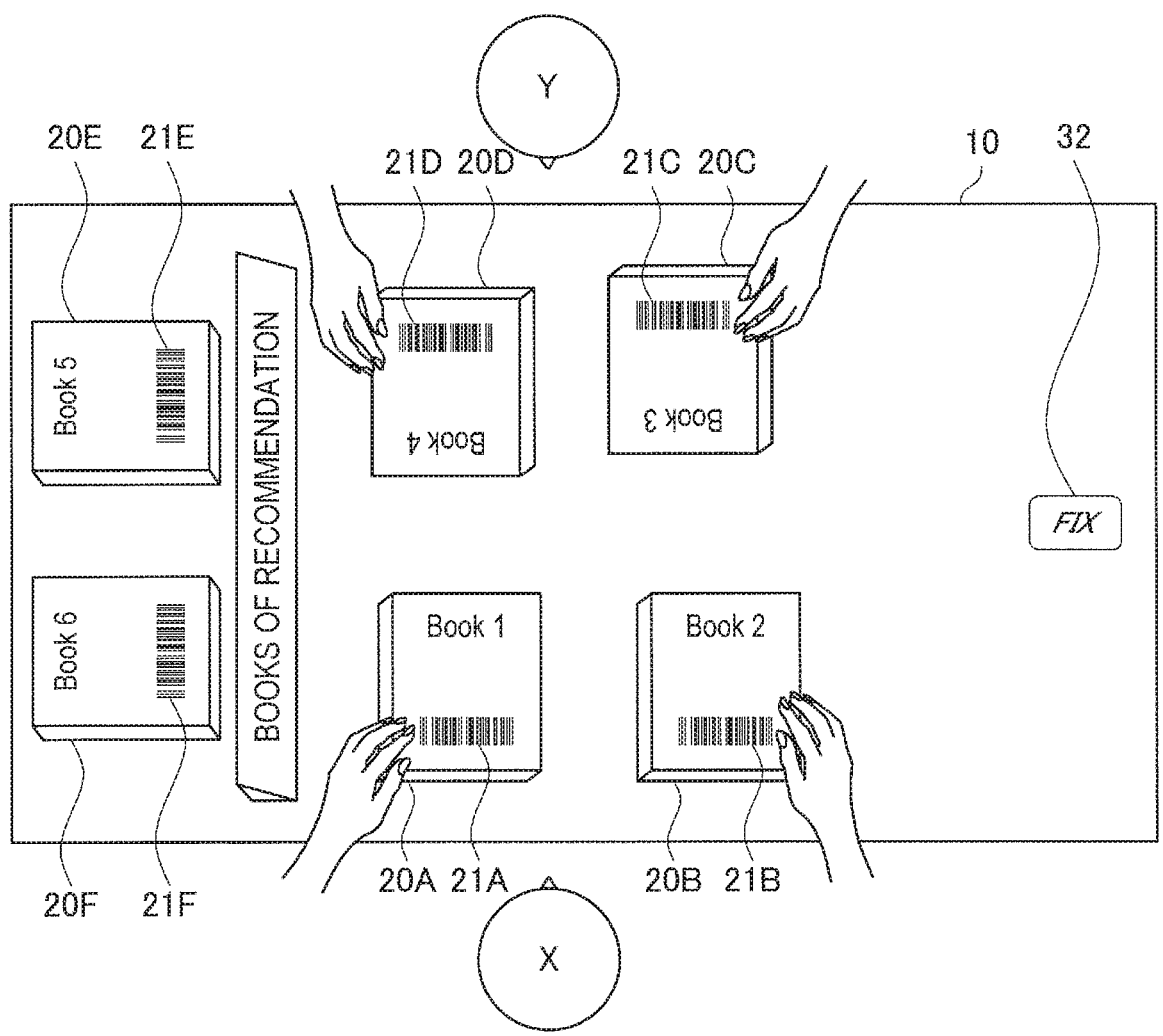
FIG. 39 is a diagram illustrating a second specific example of the information processing system according to the embodiment.

As illustrated in FIG. 39, it is assumed that a user X has placed actual objects 20A and 20B on the display screen 10 and the user Y has placed actual objects 20C and 20D. In addition, actual objects 20E and 20F are placed in advance on the display screen 10 as books of recommendation. Note that all the actual objects 20A to 20F are books and bar codes 21A to 21F are attached thereto. Also, the information processing system 100 displays a fixing button 32 for fixing lending.

Figure 40:
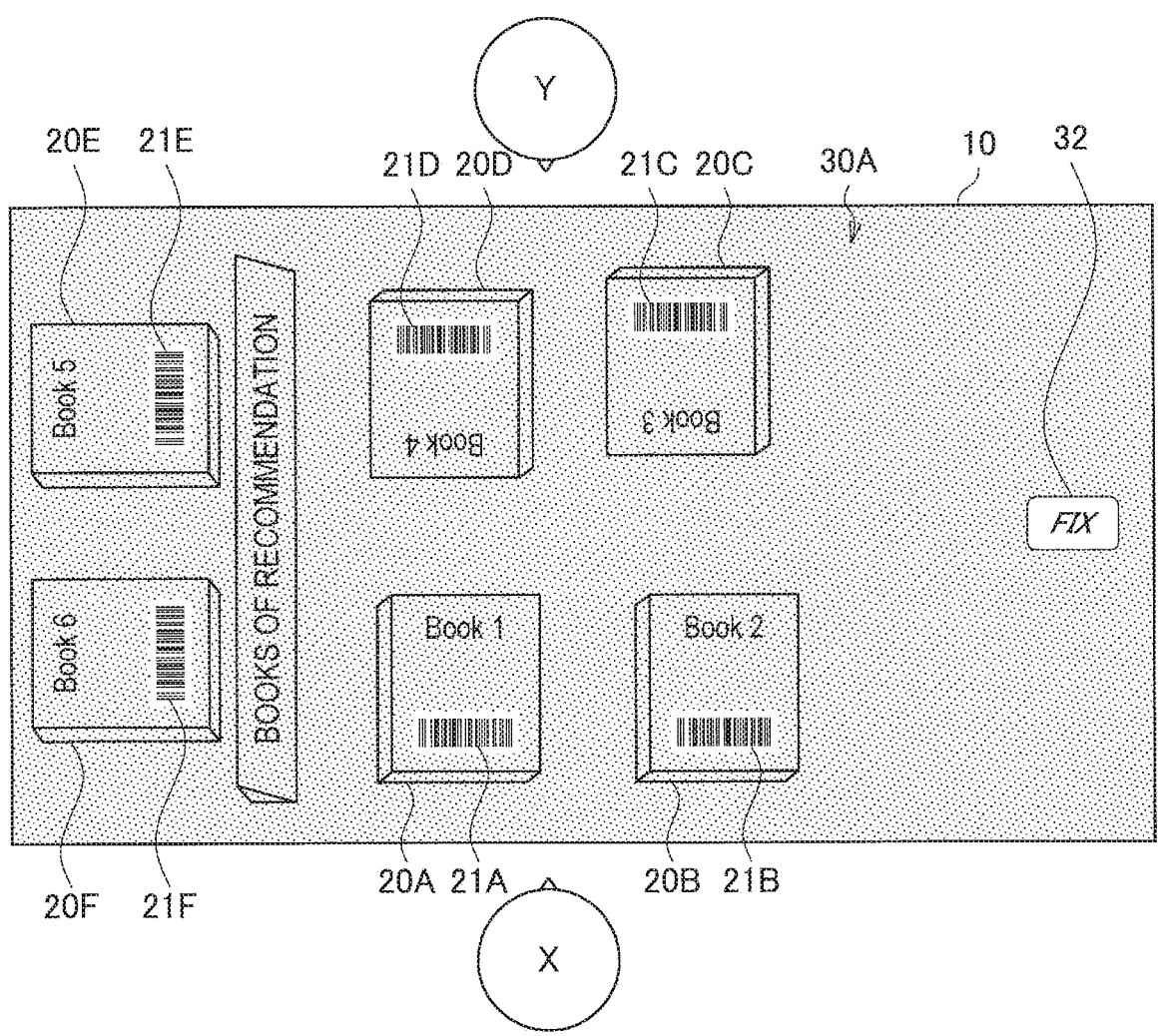
FIG. 40 is a diagram for describing a second specific example of the information processing system according to the embodiment.

Then, the information processing system 100 generates processing policy information indicating that there are no targets of belonging (that is, persons who borrows the actual objects) in the processing policy information generation processing and represents the processing policy information in the processing policy information presenting processing. Specifically, the information processing system 100 displays a display object 30A with a display range set over the entire range of the display screen 10 excluding the bar codes 21A to 21F of the books 20A to 20F with no targets of belonging as illustrated in FIG. 40. In a case in which a room is bright, for example, the information processing system 100 displays a black color alone in regions corresponding to the bar codes 21A to 21F while displaying arbitrary information that the library side desires to notify the user, such as an operation instruction and event information, in a range excluding the bar codes 21A to 21F. In this manner, it becomes easier for the user to visually recognize the bar codes 21A to 21F. Note that the display object 30A has a meaning as a background and may be rewritten with another display object (for example, a fixing button 32). Note that although the background such as the display object 30A and the display object such as the fixing button 32 rewritten on the background are displayed in a synthesized manner as one display object, description will be given on the assumption that the background and the fixing button 32 are displayed separately in the specification.

Figure 41:
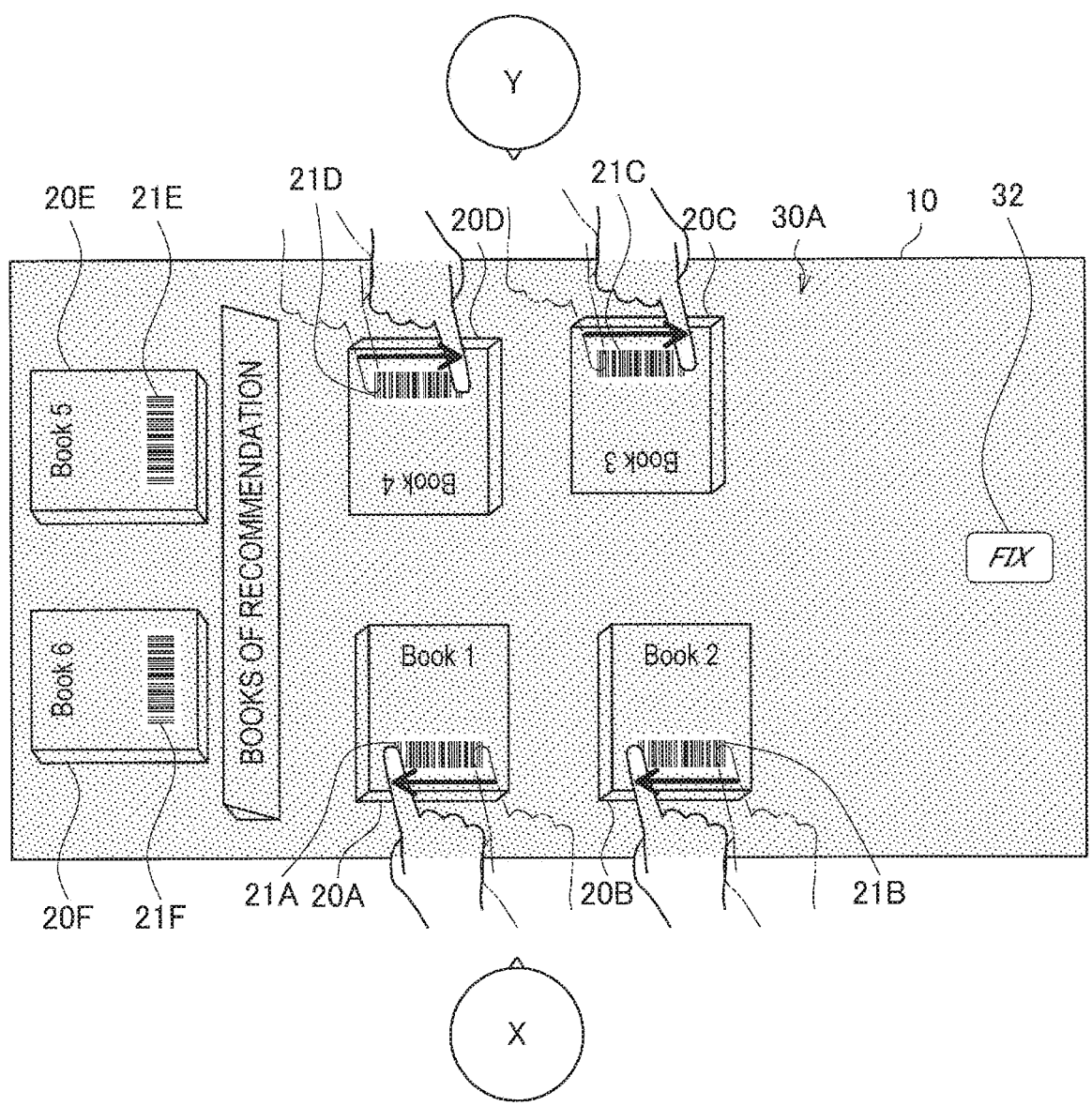
FIG. 41 is a diagram for describing a second specific example of the information processing system according to the embodiment.
Figure 42:
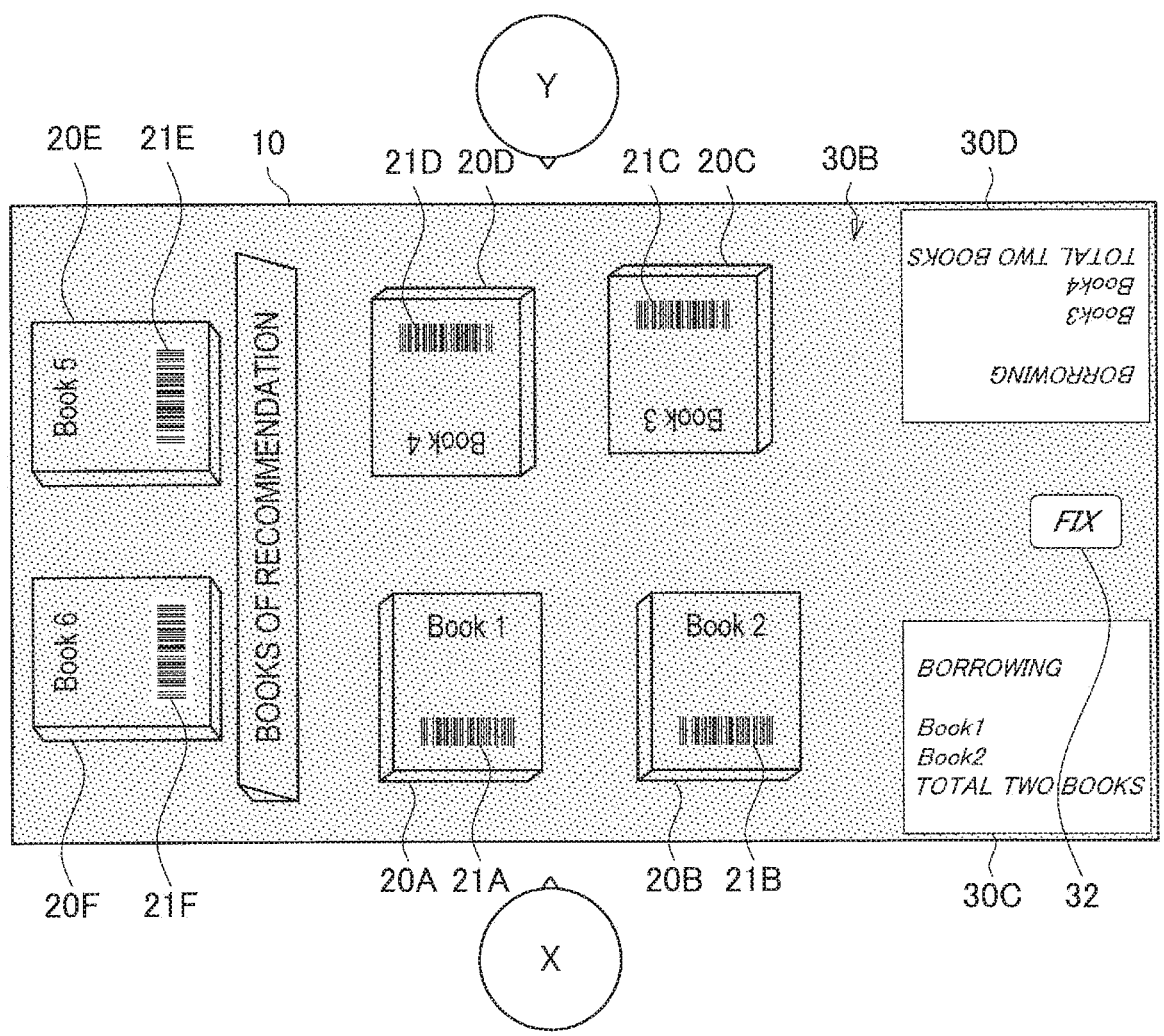
FIG. 42 is a diagram for describing a second specific example of the information processing system according to the embodiment.

Next, the user X traces the bar codes 21A and 21B of the books 20A and 20B with one of the user's fingers, and the user Y traces the bar codes 21C and 21D of the books 20C and 20D with one of the user's fingers as illustrated in FIG. 41. Then, the information processing system 100 displays, as a background, a display object 30B with a display range set over the entire range of the display screen 10 excluding the bar codes 21E and 21F of the books 20E and 20F with no targets of belonging as illustrated in FIG. 42. Also, the information processing system 100 displays a display object 30C indicating a list of books 20 that the user X will borrow by regarding the target of belonging of the books 20A and 20B as the user X. Also, the information processing system 100 displays a display object 30D indicating a list of books 20 that the user Y will borrow by regarding the target of belonging of the books 20C and 20D as the user Y.

Figure 43:
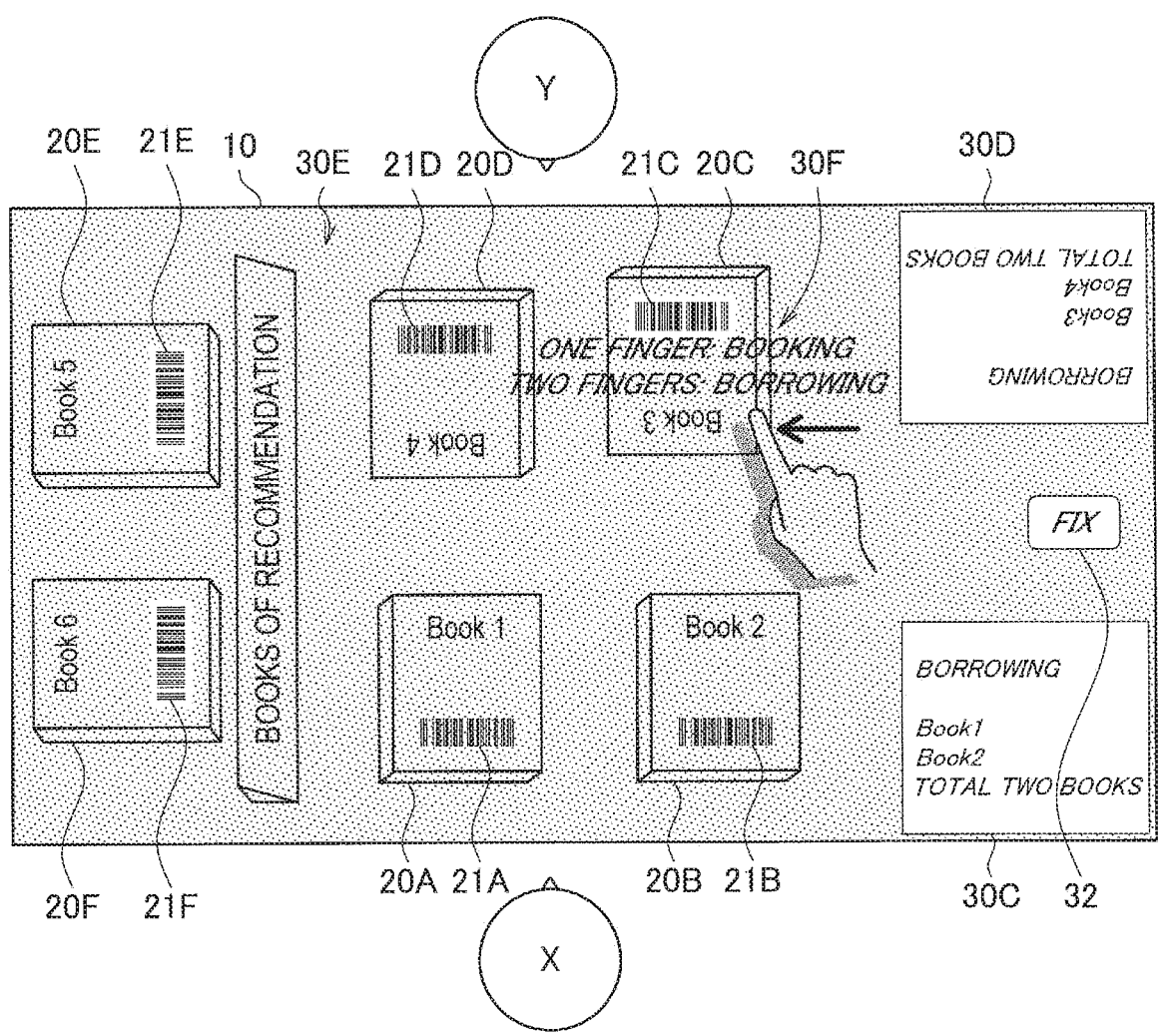
FIG. 43 is a diagram for describing a second specific example of the information processing system according to the embodiment.

Then, the user X stretches the user's hand to try to operate the book 20C for which the user Y has already been registered as the target of belonging and performs a hovering operation as illustrated in FIG. 43. Then, the information processing system 100 changes the background to a display object 30E, projection of which to the bar code 21C of the book 20C has been released and displays a display object 30F indicating an operation guidance.

Figure 44:
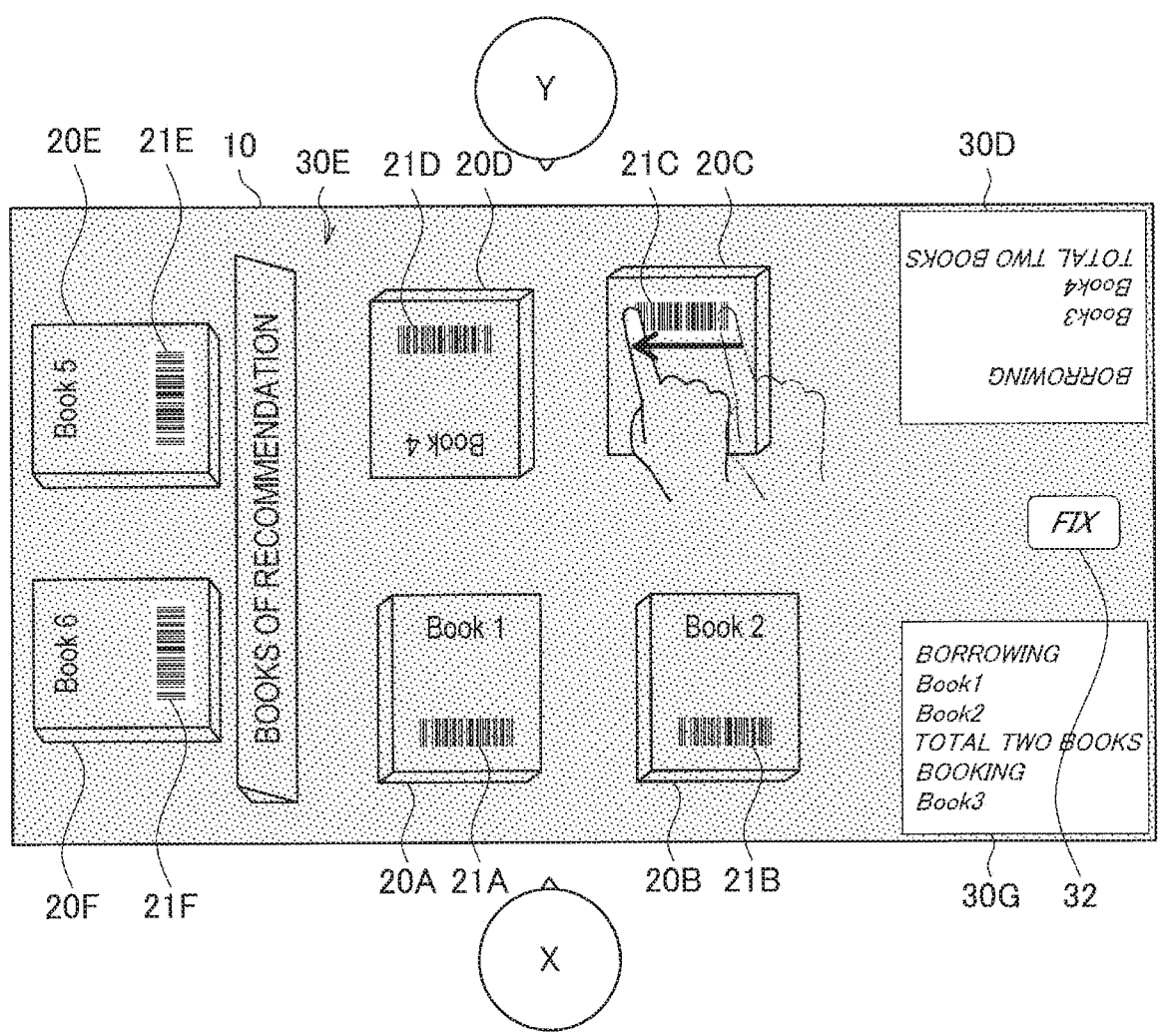
FIG. 44 is a diagram for describing a second specific example of the information processing system according to the embodiment.

Next, the user X traces the bar code 21C of the book 20C with one of the user's fingers as illustrated in FIG. 44. Then, the information processing system 100 associates the user X as a person who has booked the book 20C and displays a display object 30G indicating a list of books that the user X will borrow or has booked.

Figure 45:
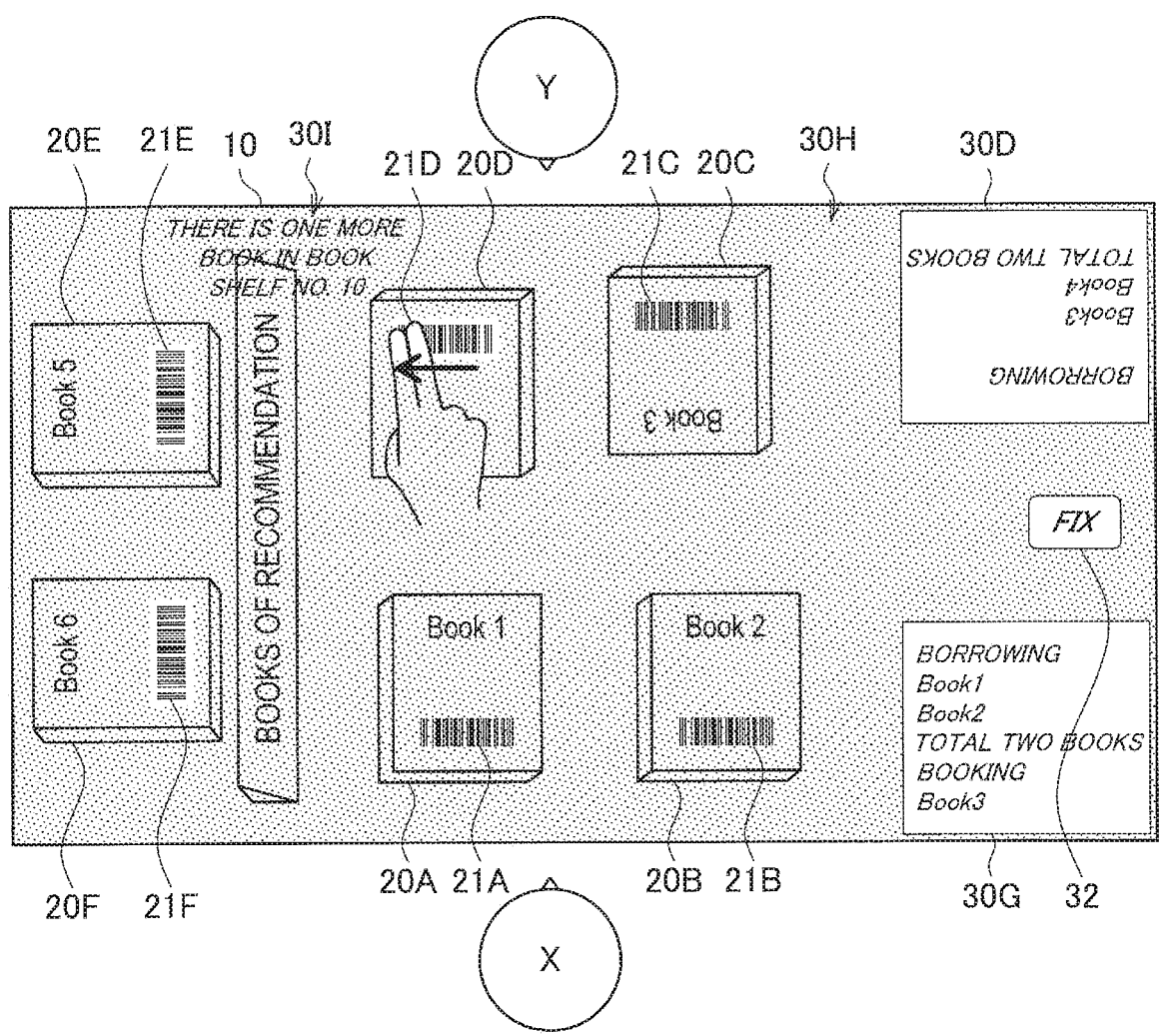
FIG. 45 is a diagram for describing a second specific example of the information processing system according to the embodiment.

Then, the user X traces the bar code 21D of the book 20D for which the use Y has already been registered as a target of belonging with two of the user's fingers as illustrated in FIG. 45. Then, the information processing system 100 displays a display object 30I indicating a book shelf in which the same book as the book 20D is present. Note that the information processing system 100 changes the background to a display object 30H, projection of which to the bar code 21D has been released, at a time at which the user X stretches the user's hand to try to operate the book 20D and performs a hovering operation.

Figure 46:
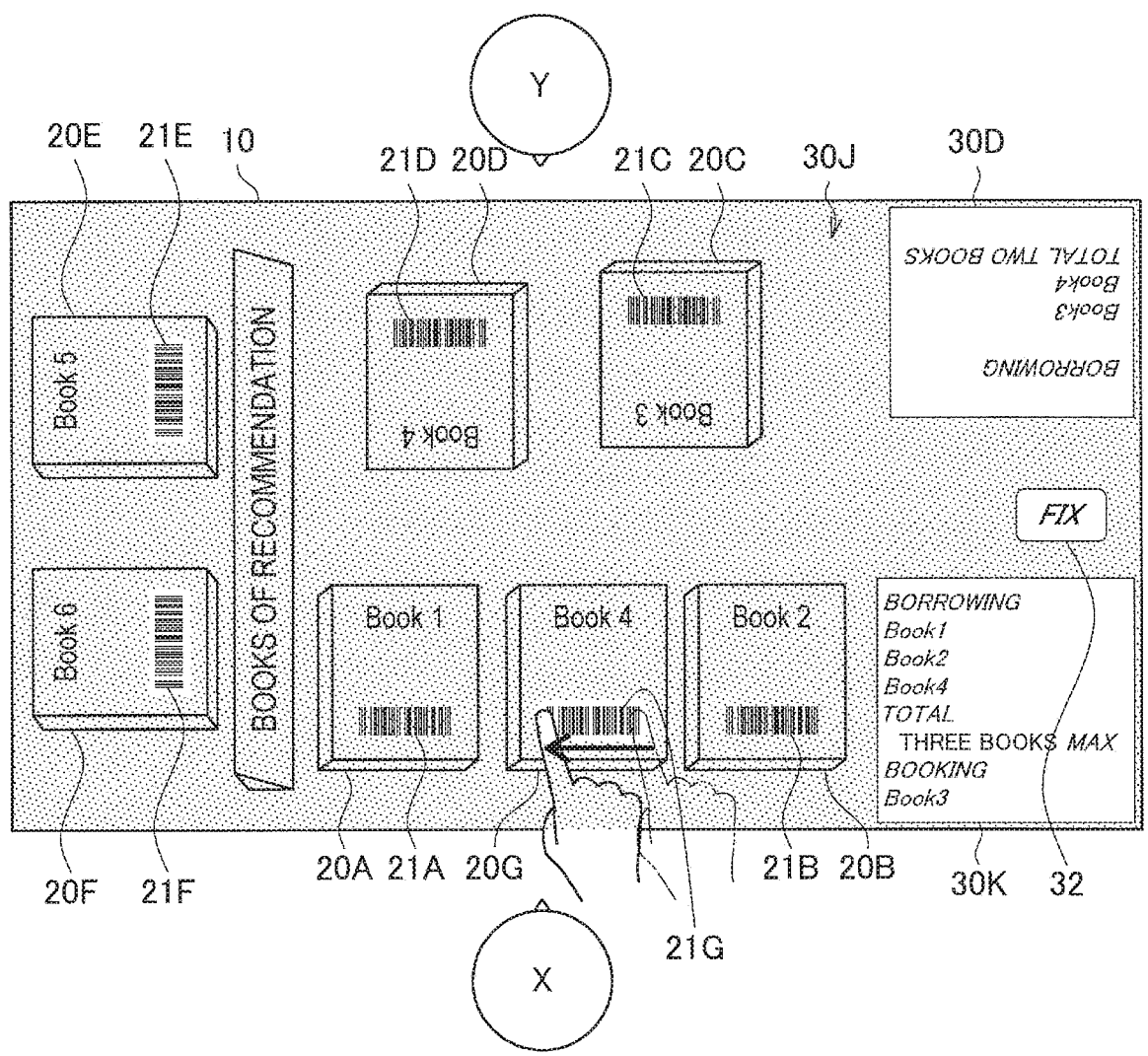
FIG. 46 is a diagram for describing a second specific example of the information processing system according to the embodiment.

Next, the user places a book 20G that is a second book "Book 4" on the display screen 10 as illustrated in FIG. 46. Then, the information processing system 100 generates processing policy information indicating that there is no target of belonging at a time at which the book 20G is placed on the display screen 10 and changes the background to a display object 30J, a projection of which to the bar code 21G has been released. Then, the user traces the bar code 21G of the book 20G with one of the user's fingers. Then, the information processing system 100 sets the target of belonging of the book 20G to be the user X and displays a display object 30K indicating a list of books 20 that the user X will borrow or has booked. Here, the number of books that the user X will borrow has reached three, which is a limit number of books to be borrowed.

Figure 47:
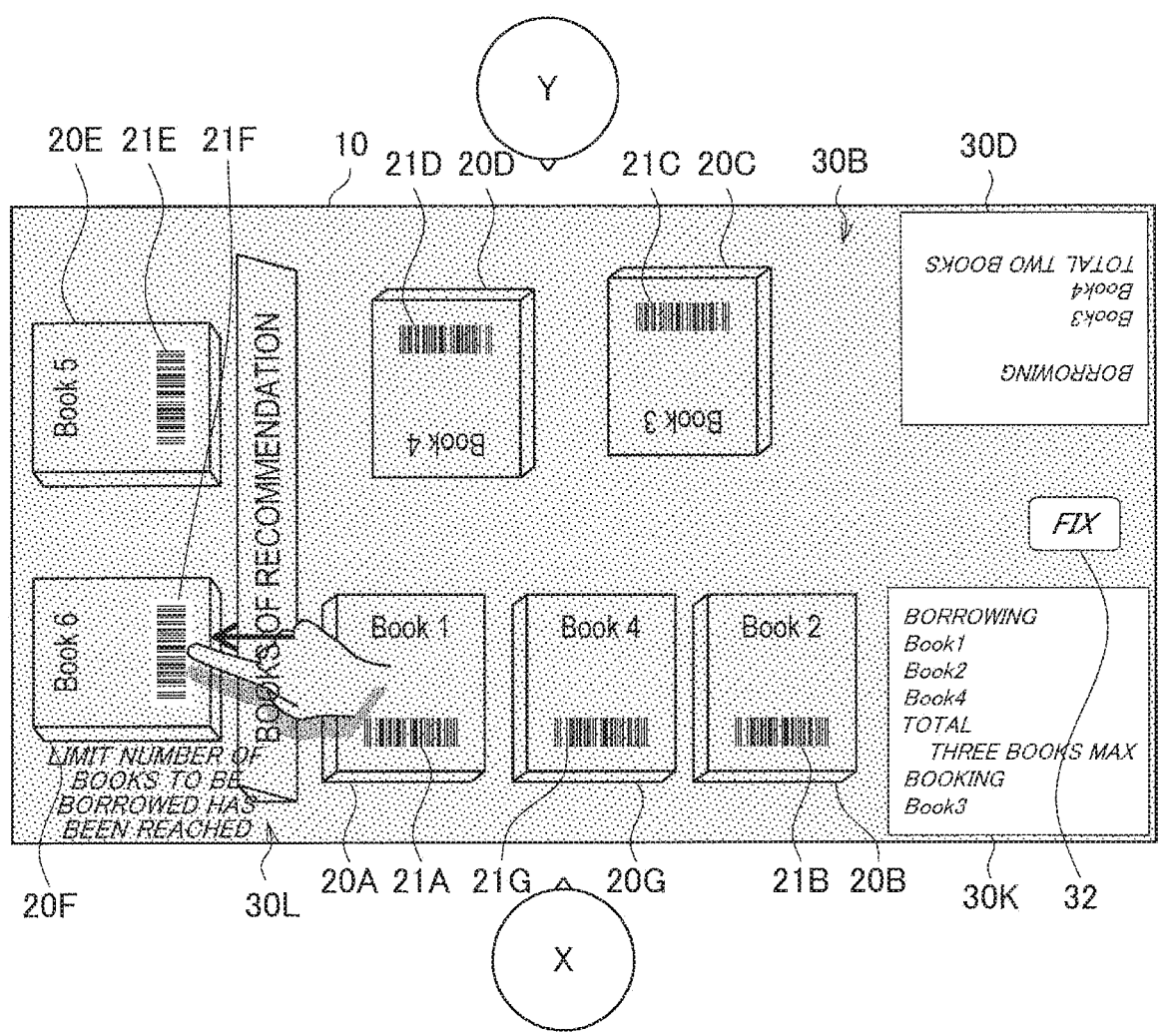
FIG. 47 is a diagram for describing a second specific example of the information processing system according to the embodiment.

Then, the user X stretches the user's hand to try to operate the book 20F and performs a hovering operation as illustrated in FIG. 47. Then, the information processing system 100 displays a display object 30L indicating that the number of books to be borrowed by the user X has reached the limit number of books to be borrowed. Also, the information processing system 100 displays, as the background, the display object 30B with the display range set over the entire range of the display screen 10 excluding the bar codes 21E and 21F of the books 20E and 20F with no targets of belongings at the current time.

Figure 48:
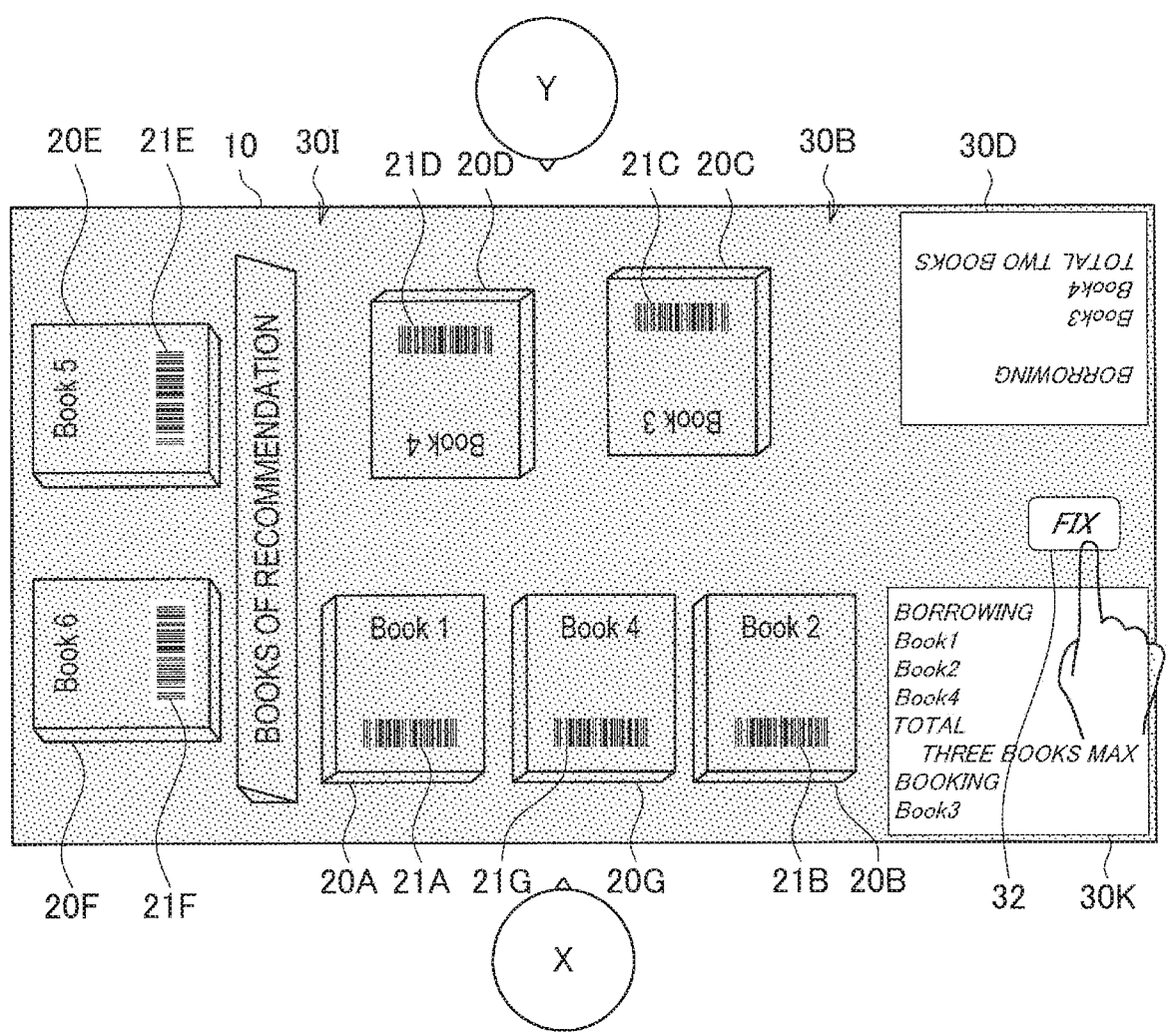
FIG. 48 is a diagram for describing a second specific example of the information processing system according to the embodiment.
Figure 49:
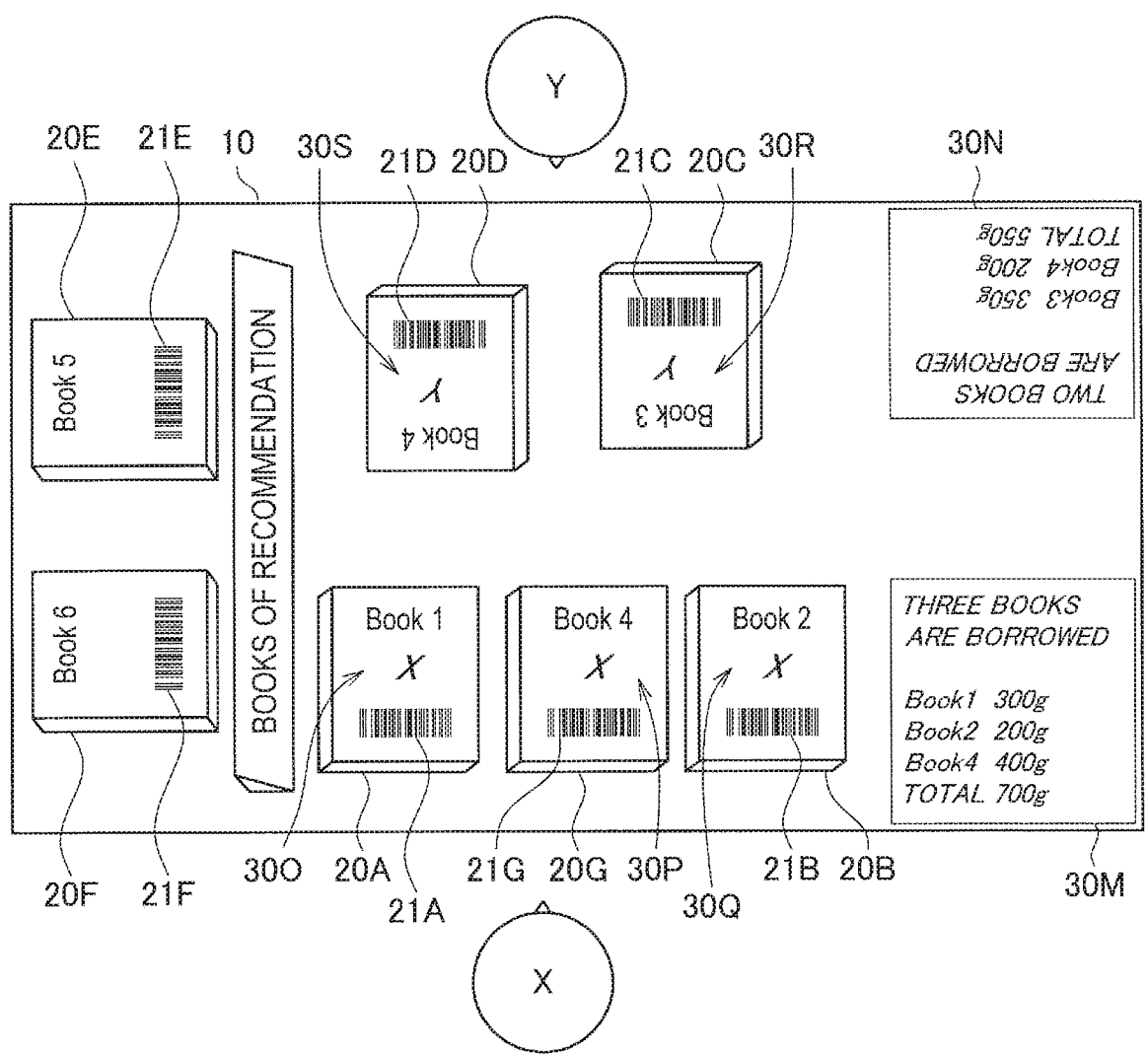
FIG. 49 is a diagram for describing a second specific example of the information processing system according to the embodiment.

Next, the user X taps the fixing button 32 as illustrated in FIG. 48. Then, the information processing system 100 recognizes that the processing policy information fixing operation has been performed, deletes the background, and displays a display object 30M indicating a result of the processing of lending the books to the user X and a display object 30N indicating a result of the processing of lending the books to the user Y near the hands of the respective users as illustrated in FIG. 49. At that time, the information processing system 100 refers to the body information and displays the weights of the respective books 20 in the display objects 30M and 30N. In addition, the information processing system 100 displays display objects 30O, 30P, and 30Q indicating that the books 20A, 20G, and 20B will be borrowed by the user X. Also, the information processing system 100 displays a display objects 30R and 30S indicating that the books 20C and 20D will be borrowed by the user Y.

Figure 50:
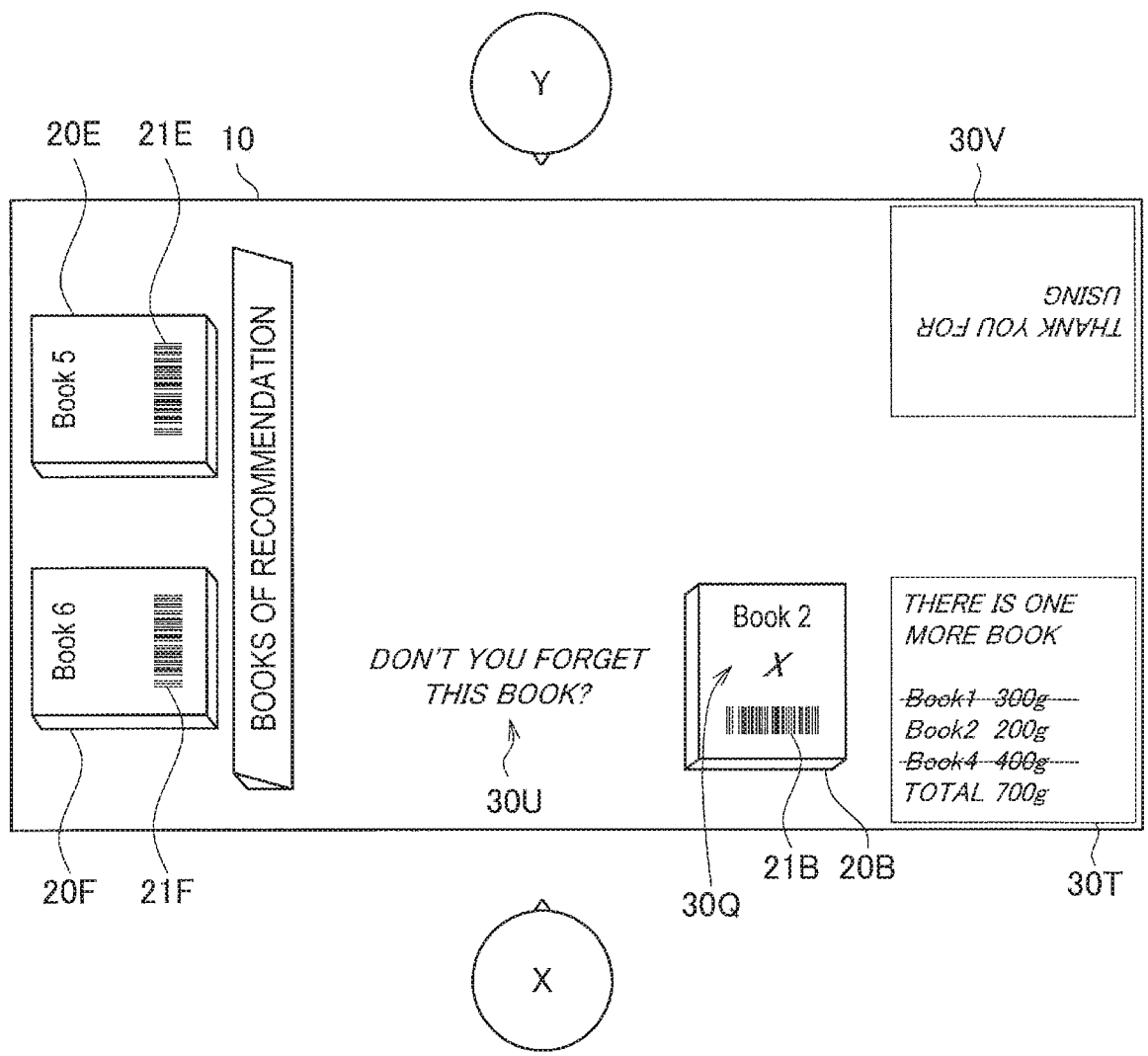
FIG. 50 is a diagram for describing a second specific example of the information processing system according to the embodiment.

Then, the books 20A and 20G that have been borrowed by the user X disappear from the display screen 10 as illustrated in FIG. 50. Then, the information processing system 100 determines that the user X has brought the books 20A and 20G and displays a display object 30T obtained by deleting the books 20A and 20G from the list of books borrowed by the user X. Also, the information processing system 100 displays, for the user X, a display object 30U for issuing an alert to bring the remaining book 20B. Also, the books 20C and 20D that have been borrowed by the user Y disappear from the display screen 10 as illustrated in FIG. 50. Then, the information processing system 100 determines that the user Y has brought the books 20C and 20D and displays a display object 30V indicating that all the books to be borrowed by the user Y have been brought by the user Y.

<<6. Example of Hardware Configuration>>

Figure 51:
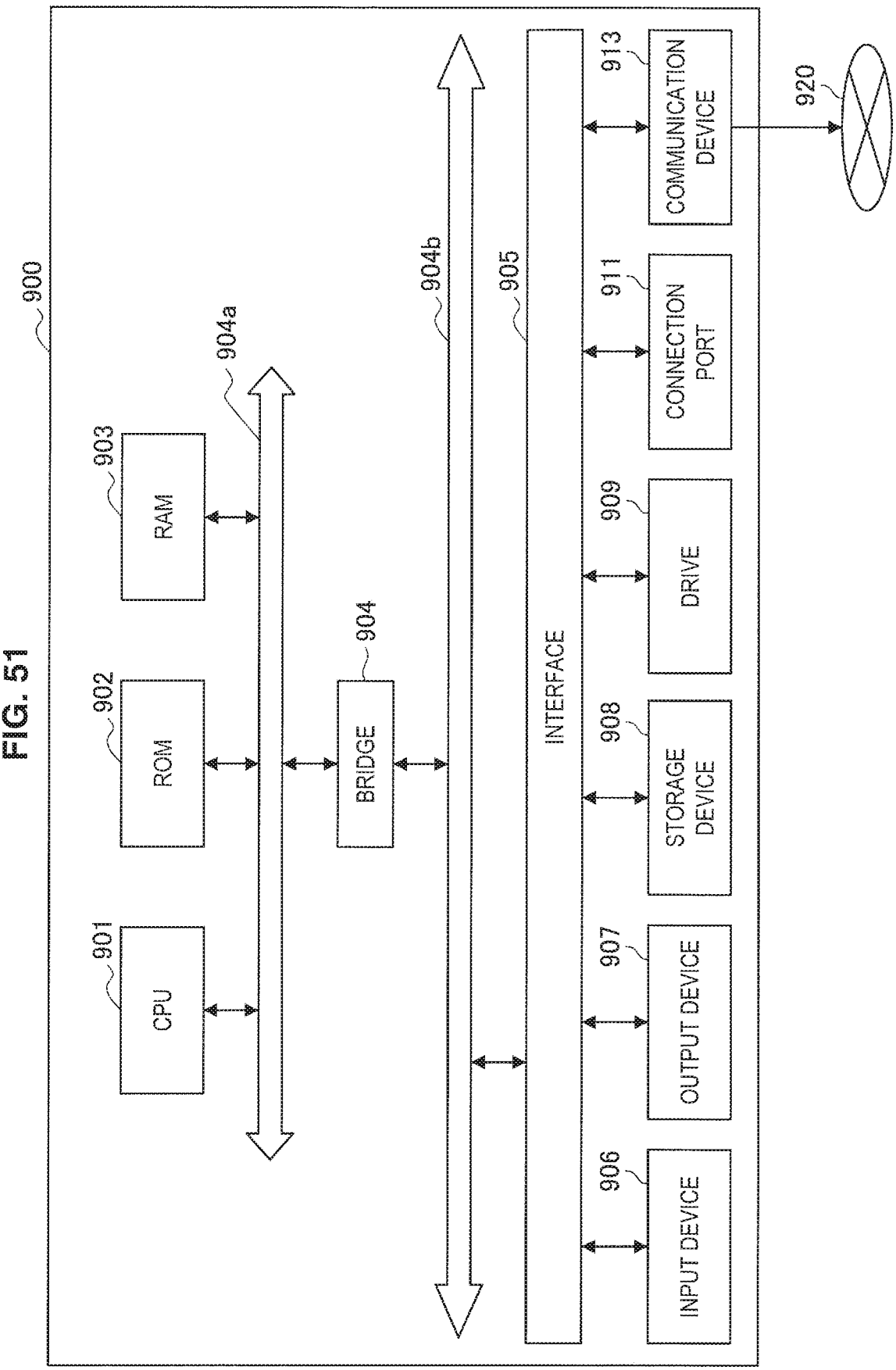
FIG. 51 is a block diagram illustrating an example of a hardware configuration of an information processing apparatus according to the embodiment.

Finally, a hardware configuration of an information processing apparatus according to the embodiments will be described with reference to FIG. 51. FIG. 51 is a block diagram illustrating an example of the hardware configuration of the information processing apparatus according to the embodiment. Note that an information processing apparatus 900 illustrated in FIG. 51 can realize the information processing system 100 described above with reference to FIGS. 1 to 4, for example. Information processing performed by the information processing system 100 according to the embodiments is realized by cooperation between software and hardware, which will be described later.

As illustrated in FIG. 51, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as an electric circuit, a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the control unit 120 illustrated in FIG. 4, for example. For example, the CPU 901 controls processing policy information of an actual object stored in the storage device 908 on the basis of information input from the input device 906 and controls the output device 907 such that the output device 907 displays a display object in accordance with the processing policy information.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in one bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906. In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The input device 906 may form the input unit 110 illustrated in FIGS. 1 to 4, for example. In the embodiment, the input device 906 receives a user operation and information related to an actual object on the display screen.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The output device 907 may form the output unit 130 illustrated in FIGS. 1 to 4, for example. In the embodiment, the output device 907 displays a display object in accordance with the processing policy information of the actual object on the basis of the control performed by the CPU 901.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the processing policy information storage unit 150 and the body information storage unit 160 illustrated in FIG. 4, for example. In the embodiment, the storage device 908 stores processing policy information and body information of each actual object.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

<<7. Conclusion>>

The embodiment of the disclosure has been described above in detail with reference to FIGS. 1 to 51. As described above, the information processing system 100 controls processing policy information that includes identification information of a user who is associated with an actual object on a body surface on which a display object is displayed and that indicates a processing policy for the actual object in accordance with a user operation performed on the actual object. Then, the information processing system 100 controls display of the display object on the basis of the processing policy information of the actual object. The processing policy information includes at least the identification information of the user who is associated with the actual object and is controlled in accordance with a user operation performed on the actual object, and the display of the display object is controlled on the basis of the processing policy information. Therefore, the information processing system 100 can realize interaction among a plurality of users, display objects, and actual objects. In addition, the users can intuitively operate the processing policy information by directly operating the actual objects. Also, the information processing system 100 can separately execute various kinds of processing for realizing the aforementioned display and can thus construct a flexible system in accordance with an application target.

In addition, the information processing system 100 associates a user who has touched an actual object with the actual object. In this manner, the user can cause the actual object to belong to the user himself/herself through an easy and intuitive operation and can simply perform an operation for purchase, rental, or the like.

Also, the information processing system 100 controls whether or not to cause a display range of a display object to be superimposed on an actual object on the basis of whether or not the user has been associated with the actual object. In this manner, the information processing system 100 can explicitly indicate presence of an actual object with no target of belonging for the user, and the user can easily determine whether or not to perform an operation. Further, the information processing system 100 may control whether or not to cause the display range of the display object to be superimposed on a sensing target region of the actual object on the basis of whether or not the user has been associated with the actual object. In this manner, the information processing system 100 can improve accuracy of sensing, efficiently use a projection area, and cause the user's attention to focus only on the actual object to be operated.

Also, the information processing system 100 presents auxiliary information in a stage in which hovering is being performed before the user operation is performed. In this manner, it is possible to prevent an increase in the number of processes due to unnecessary operations and a variety of inconvenience occurring due to the dependent operation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Also, each apparatus described in the specification may be realized as an independent apparatus, or a part or entirety thereof may be realized as different devices. For example, the control unit 120, the processing policy information storage unit 150, and the body information storage unit 160 in the functional configuration example of the information processing system 100 illustrated in FIG. 4 may be provided in an apparatus, such as a server, which is connected to the input unit 110 and the output unit 130 via a network or the like. In that case, information from the input unit 110 is transmitted to the apparatus such as the server via the network or the like, the control unit 120 performs processing on the information from the input unit 110, and information to be output by the output unit 130 is sent from the apparatus such as the server to the output unit 130 through the network or the like.

Further, the processes described using the flowcharts in this specification need not be necessarily executed in the described order. Several process steps may be executed in parallel. Further, an additional process step may be employed, and some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a processing policy information control unit that controls processing policy information that includes identification information of a user associated with an actual object on a body surface on which a display object is displayed and that indicates a processing policy for the actual object in accordance with a user operation performed on the actual object; and a display control unit that controls display of the display object on a basis of the processing policy information for the actual object.

(2)

The information processing apparatus according to (1), in which the processing policy information control unit associates a user who has touched the actual object with the actual object.

(3)

The information processing apparatus according to (2), in which the processing policy information control unit controls the processing policy information in accordance with how the actual object has been touched.

(4)

The information processing apparatus according to (3), in which the display control unit causes information indicating a relationship between how the actual object has been touched and a detail of control of the processing policy information to be displayed.

(5)

The information processing apparatus according to any one of (1) to (4), in which the processing policy information control unit associates a user who corresponds to an orientation of the actual object with the actual object.

(6)

The information processing apparatus according to any one of (1) to (5), in which the processing policy information control unit associates a user who is located at a shortest distance from the actual object with the actual object.

(7)

The information processing apparatus according to any one of (1) to (6), in which the processing policy information control unit associates one of the two actual objects in a predetermined relationship with a user who has been associated with another actual object.

(8)

The information processing apparatus according to any one of (1) to (7), in which in a case in which a second user has touched or is predicted to touch the actual object with which a first user has been associated, the display control unit causes a display object indicating that the first user has been associated with the actual object to be displayed and/or causes a display object related to an operation of the second user to be displayed for the first user.

(9)

The information processing apparatus according to any one of (1) to (8), in which the display control unit controls a display range of the display object on a basis of the processing policy information.

(10)

The information processing apparatus according to (9), in which the display control unit controls whether or not to cause the display range of the display object to be superimposed on the actual object on a basis of whether or not the user has been associated with the actual object.

(11)

The information processing apparatus according to (9), in which the display control unit controls whether or not to cause the display range of the display object to be superimposed on a sensing target region of the actual object on a basis of whether or not the user has been associated with the actual object.

(12)

The information processing apparatus according to any one of (1) to (11), in which the display control unit controls display of the display object on a basis of body information indicating a feature of the actual object.

(13)

The information processing apparatus according to any one of (1) to (12), in which the processing policy information includes identification information of a user who has a processing right for the actual object as identification information of the user who is associated with the actual object.

(14)

The information processing apparatus according to (13), in which the processing policy information includes identification information of a user who is waiting for acquisition of the processing right for the actual object as identification information of the user who is associated with the actual object.

(15)

The information processing apparatus according to (13) or (14), in which the processing right is a right of purchasing the actual object.

(16)

The information processing apparatus according to (13) or (14), in which the processing right is a right of renting the actual object.

(17)

The information processing apparatus according to (16), in which the processing policy information includes information indicating a term of validity of the processing right.

(18)

The information processing apparatus according to any one of (1) to (17), in which the processing policy information includes information indicating a user operation to be validated or invalidated among user operations performed on the actual object.

(19)

An information processing method that is executed by a processor, including:

controlling processing policy information that includes identification information of a user associated with an actual object on a body surface on which a display object is displayed and that indicates a processing policy for the actual object in accordance with a user operation performed on the actual object; and controlling display of the display object on a basis of the processing policy information for the actual object.

(20)

A program causing a computer to function as:

a processing policy information control unit that controls processing policy information that includes identification information of a user associated with an actual object on a body surface on which a display object is displayed and that indicates a processing policy for the actual object in accordance with a user operation performed on the actual object; and a display control unit that controls display of the display object on a basis of the processing policy information for the actual object.

REFERENCE SIGNS LIST

10 display screen
20 actual object
30 display object
100 information processing system
110 input unit
120 control unit
121 processing policy information control unit
123 display control unit
130 output unit
140 table
150 processing policy information storage unit
160 body information storage unit

The invention claimed is:

1. An information processing apparatus, comprising:
a processing policy information control unit configured to control processing policy information based on a user operation on a first actual object on a body surface, wherein
the processing policy information includes identification information of a first user of a plurality of users,
the first user is associated with the first actual object, and
the processing policy information indicates a processing policy for the first actual object; and
a display control unit configured to control display of a first display object on the body surface and a second display object on the body surface based on a touch operation of a second user of the plurality of users on the first actual object, wherein
the first display object indicates the first user is associated with the first actual object, and
the second display object is related to the touch operation of the second user.

2. The information processing apparatus according to claim 1, wherein
the processing policy information control unit is further configured to associate the first user with the first actual object based on a touch operation of the first user on the first actual object.

3. The information processing apparatus according to claim 2, wherein the processing policy information control unit is further configured to control the processing policy information based on how the touch operation of the first user is performed on the first actual object.

4. The information processing apparatus according to claim 3, wherein the display control unit is further configured to control display of information indicating a relationship between how the touch operation of the first user is performed on the first actual object and a detail of the control of the processing policy information.

5. The information processing apparatus according to claim 1, wherein the processing policy information control unit is further configured to associate the first user with the first actual object based on an orientation of the first actual object with respect to the first user.

6. The information processing apparatus according to claim 1, wherein
the processing policy information control unit is further configured to associate the first user with the first actual object, and
the first user among the plurality of users is at a shortest distance from the first actual object.

7. The information processing apparatus according to claim 1, wherein
the processing policy information control unit is further configured to associate a second actual object with the first user,
the second actual object is in a specific relationship with the first actual object, and
the second actual object is on the body surface.

8. The information processing apparatus according to claim 1, wherein the display control unit is further configured to control a display range of the first display object based on the processing policy information.

9. The information processing apparatus according to claim 8, wherein the display control unit is further configured to superimpose the display range of the first display object on the first actual object based on the association of the first user with the first actual object.

10. The information processing apparatus according to claim 8, wherein the display control unit is further configured to superimpose the display range of the first display object on a sensing target region of the first actual object based on the association of the first user with the first actual object.

11. The information processing apparatus according to claim 1, wherein the display control unit is further configured to control the display of the first display object based on body information indicating a feature of the first actual object.

12. The information processing apparatus according to claim 1, wherein the identification information indicates the first user that has a processing right for the first actual object.

13. The information processing apparatus according to claim 12, wherein the identification information indicates the first user that is in a waiting list for acquisition of the processing right for the first actual object.

14. The information processing apparatus according to claim 12, wherein the processing right is a right to purchase the first actual object.

15. The information processing apparatus according to claim 12, wherein the processing right is a right to rent the first actual object.

16. The information processing apparatus according to claim 15, wherein the processing policy information further includes information indicating a term of validity of the processing right.

17. The information processing apparatus according to claim 1, wherein the processing policy information further includes information indicating the user operation is one of validated or invalidated.

18. An information processing method, comprising:
controlling, by a processor, processing policy information based on a user operation on an actual object on a body surface, wherein
the processing policy information includes identification information of a first user of a plurality of users,
the first user is associated with the actual object, and
the processing policy information indicates a processing policy for the actual object; and
controlling, by the processor, display of a first display object on the body surface and a second display object on the body surface based on a touch operation of a second user of the plurality of users on the actual object, wherein
the first display object indicates the first user is associated with the actual object, and
the second display object is related to the touch operation of the second user.

19. A non-transitory computer-readable medium having stored thereon computer-executable instructions which, when executed by a processor, cause the processor to execute operations, the operations comprising:
controlling processing policy information based on a user operation on an actual object on a body surface, wherein
the processing policy information includes identification information of a first user of a plurality of users,
the first user is associated with the actual object, and
the processing policy information indicates a processing policy for the actual object; and
controlling display of a first display object on the body surface and a second display object on the body surface based on a touch operation of a second user of the plurality of users on the actual object, wherein
the first display object indicates the first user is associated with the actual object, and
the second display object is related to the touch operation of the second user.

20. An information processing apparatus, comprising:
a processing policy information control unit configured to control processing policy information based on a user operation on an actual object on a body surface, wherein
the processing policy information includes identification information of a user that has a processing right for the actual object and information indicating a term of validity of the processing right,
the processing right corresponds to a right to rent the actual object, and
the processing policy information indicates a processing policy for the actual object; and
a display control unit configured to control display of a display object on the body surface based on the processing policy information.

* * * * *